United States Patent [19]
Matsubara et al.

[11] Patent Number: 5,831,642
[45] Date of Patent: Nov. 3, 1998

[54] INK JET RECORDING METHOD AND APPARATUS

[75] Inventors: Miyuki Matsubara, Tokyo; Hiromitsu Hirabayashi, Yokohama; Shigeyasu Nagoshi; Atsushi Arai, both of Kawasaki; Yuji Akiyama; Takayuki Murata, both of Yokohama; Hitoshi Sugimoto, Kawasaki; Kiichiro Takahashi, Yokohama, all of Japan

[73] Assignee: Canon Kabushiki Kaisha, Tokyo, Japan

[21] Appl. No.: 824,837

[22] Filed: Mar. 26, 1997

Related U.S. Application Data

[63] Continuation of Ser. No. 510,030, Aug. 1, 1995, abandoned, which is a continuation of Ser. No. 921,231, Jul. 29, 1992, abandoned.

[30] Foreign Application Priority Data

| Aug. 2, 1991 | [JP] | Japan | 3-194114 |
| Aug. 2, 1991 | [JP] | Japan | 3-194130 |
| Oct. 21, 1991 | [JP] | Japan | 3-272693 |
| Dec. 20, 1991 | [JP] | Japan | 3-338610 |

[51] Int. Cl.⁶ ............................ B41J 2/205; B41J 2/21
[52] U.S. Cl. .............................. 347/9; 347/15; 347/41; 347/43
[58] Field of Search ............................... 347/9, 12, 14, 347/15, 40, 41, 42

[56] References Cited

U.S. PATENT DOCUMENTS

| 4,313,124 | 1/1982 | Hara . | |
| 4,345,262 | 8/1982 | Shirato et al. . | |
| 4,459,600 | 7/1984 | Sato et al. . | |
| 4,463,359 | 7/1984 | Ayata et al. . | |
| 4,558,333 | 12/1985 | Sugitani et al. . | |
| 4,622,561 | 11/1986 | Koike . | |
| 4,723,129 | 2/1988 | Endo et al. . | |
| 4,740,796 | 4/1988 | Endo et al. . | |
| 4,748,453 | 5/1988 | Lin et al. | 347/41 |
| 4,963,882 | 10/1990 | Hickman | 347/41 |
| 4,967,203 | 10/1990 | Doan et al. | 347/41 |
| 5,142,374 | 8/1992 | Tajika et al. | 347/15 X |
| 5,359,355 | 10/1994 | Nagoshi et al. | 347/9 |

FOREIGN PATENT DOCUMENTS

| 59-123670 | 7/1984 | Japan | B41J 3/04 |
| 59-138461 | 8/1984 | Japan | B41J 3/04 |
| 60-214670 | 10/1985 | Japan | B41J 3/04 |
| 60-214671 | 10/1985 | Japan | B41J 3/04 |
| WO87006529 | 11/1987 | WIPO | B41J 3/02 |
| WO90014957 | 12/1990 | WIPO | B41J 2/04 |

*Primary Examiner*—Joseph W. Hartary
*Attorney, Agent, or Firm*—Fitzpatrick, Cella, Harper & Scinto

[57] ABSTRACT

Image data is thinned out by using thinning patterns having arrays not synchronized with an image data array according to an area gradation method at the same duty, and the resulting thinned image data is divisionally recorded on a predetermined area of a recording medium by using different record areas of a recording head while a scan operation is performed a plurality of number of times. The thinning patterns are formed such that substantially equal quantities of an ink are implanted in a plurality of number of times of the divisional recording.

74 Claims, 83 Drawing Sheets

FIG. 11
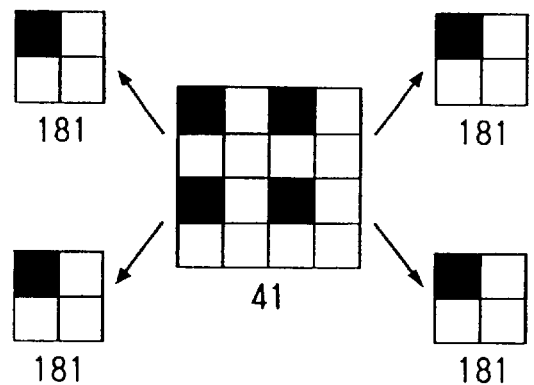
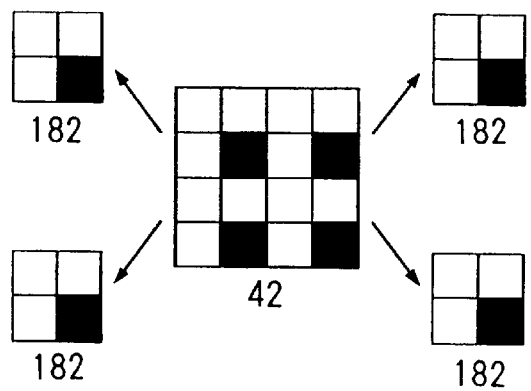
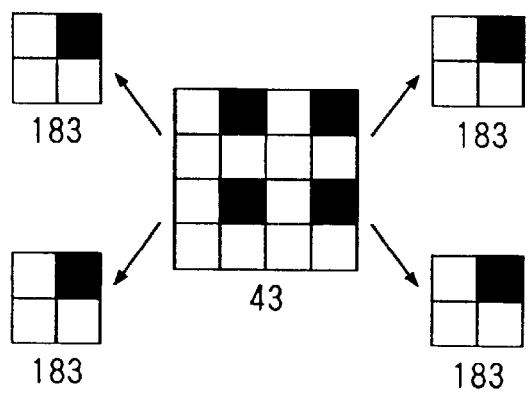
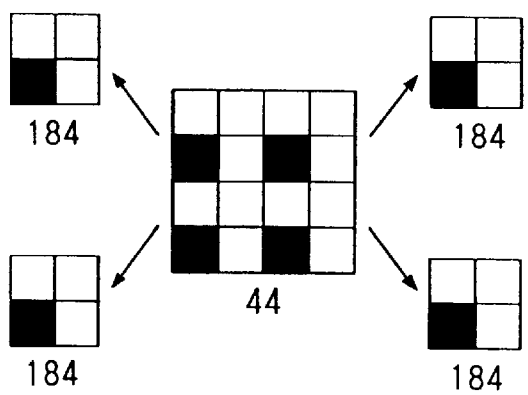

FIG. 20
BASIC MASK ① 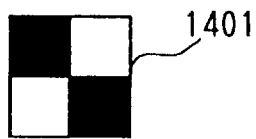
1401
MASK BLOCK 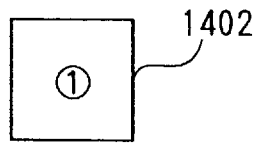
1402
ONE PERIOD 
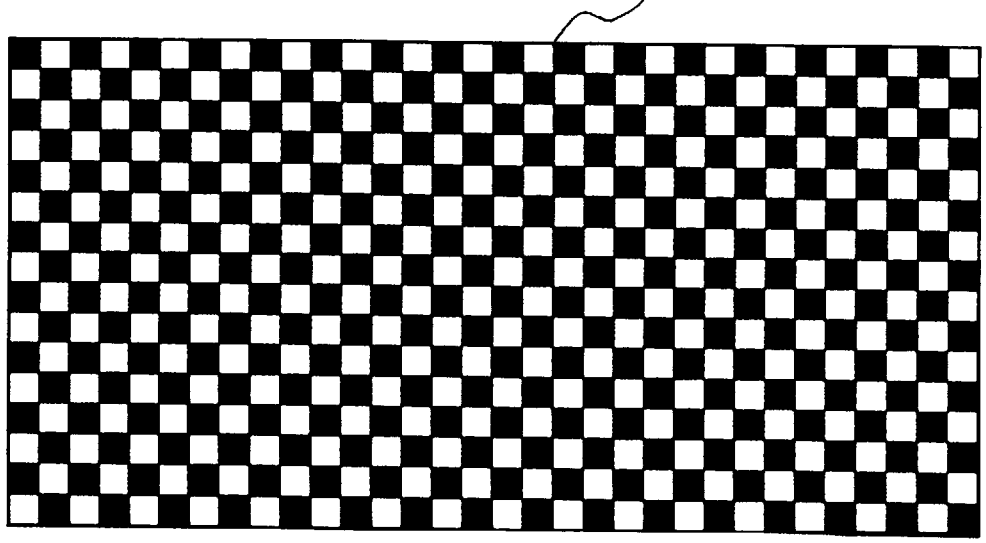
1403

FIG. 24
BASIC MASK ① 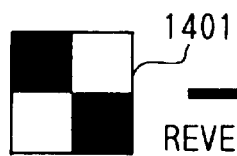 BASIC MASK ② 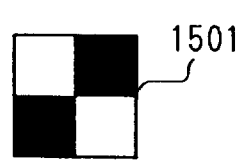
REVERSION
PARALLEL
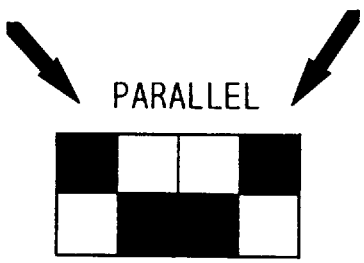
MASK BLOCK 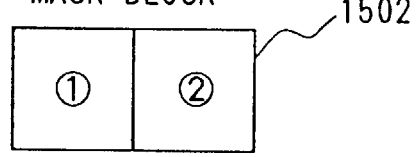
ONE PERIOD 
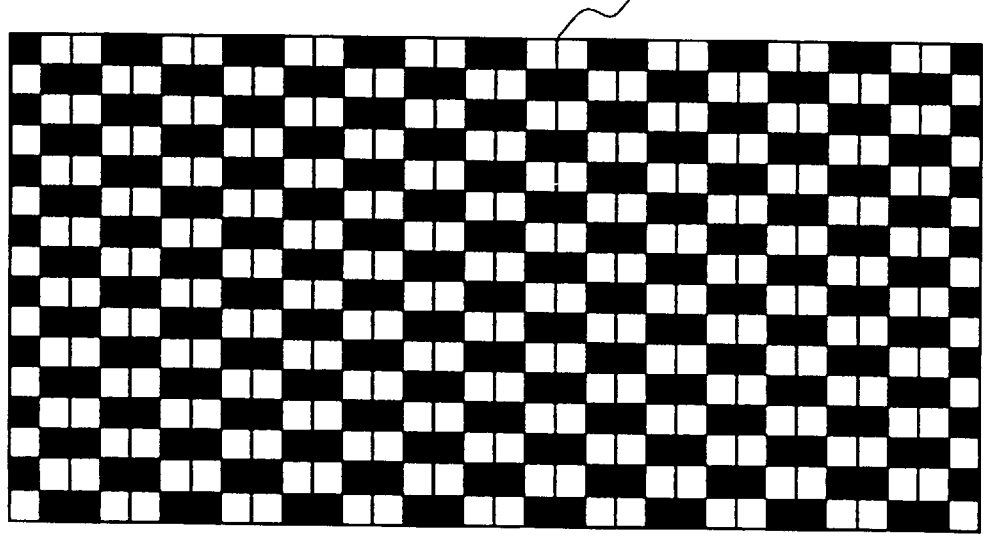

FIG. 31

BINARIZING PATTERN

THINNING PATTERN 501 (FOR 1ST PASS)

502 (FOR 2ND PASS)

1ST PASS PRINT

2ND PASS PRINT

FIG. 32
BINARIZING PATTERN
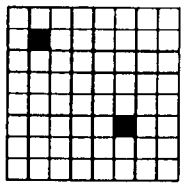
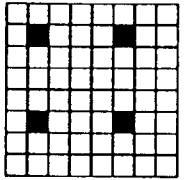
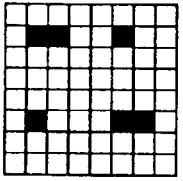
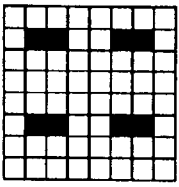
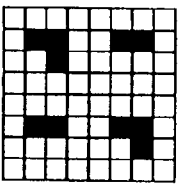
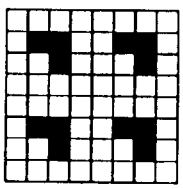
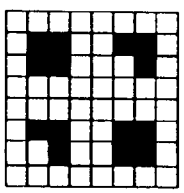
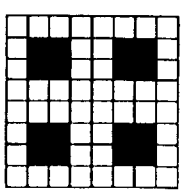
THINNING PATTERN
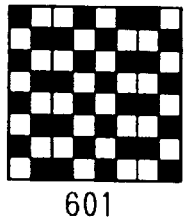
601 (FOR 1ST PASS)
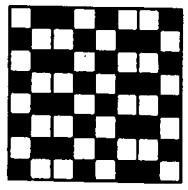
602 (FOR 2ND PASS)
1ST PASS PRINT
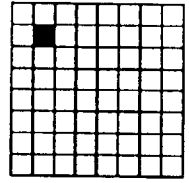
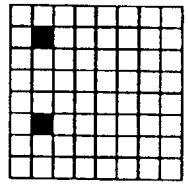
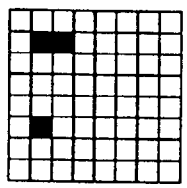
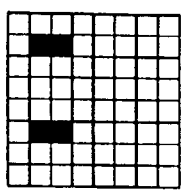
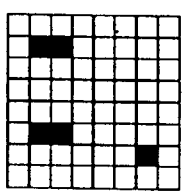
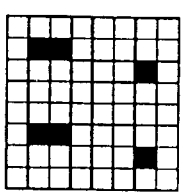
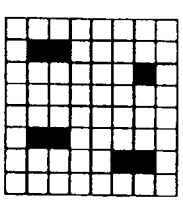
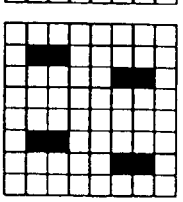
2ND PASS PRINT
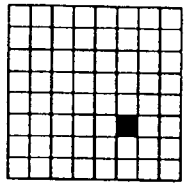
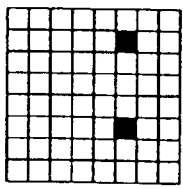
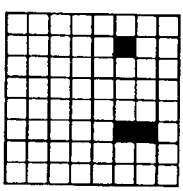
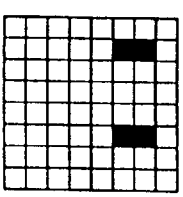
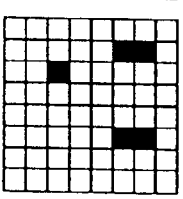
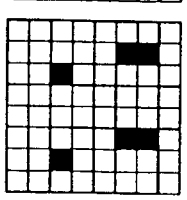
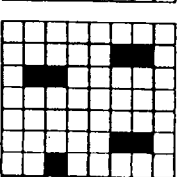
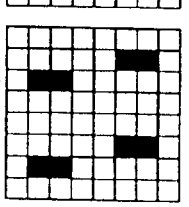

FIG. 33
BINARIZING PATTERN
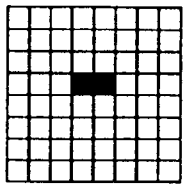
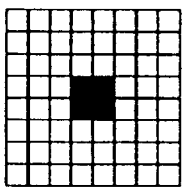
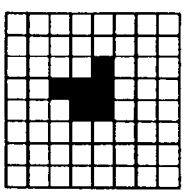
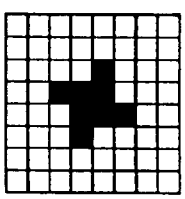
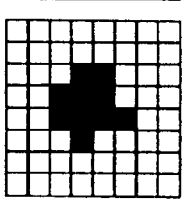
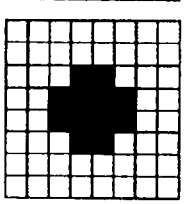
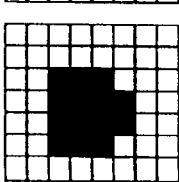
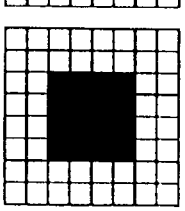
THINNING PATTERN
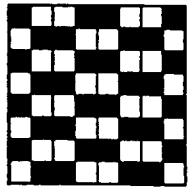
701
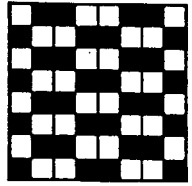
702
1ST PASS PRINT
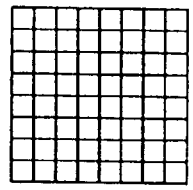
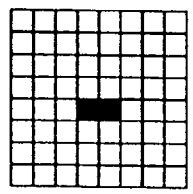
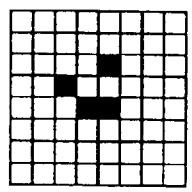
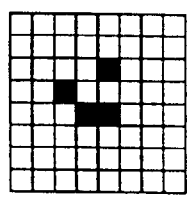
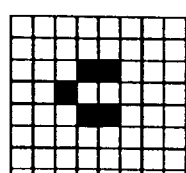
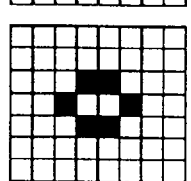
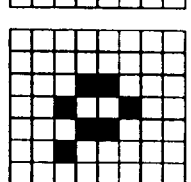
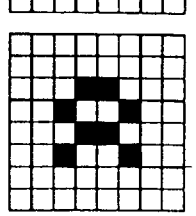
2ND PASS PRINT
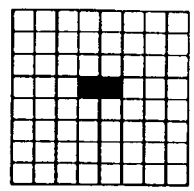
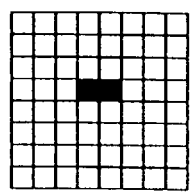
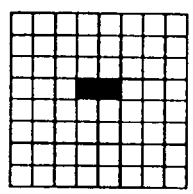
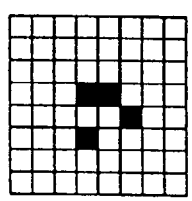
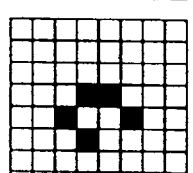
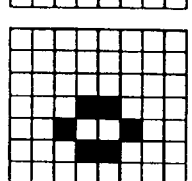
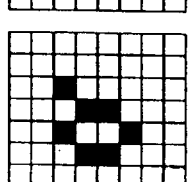
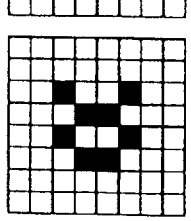

FIG. 34
BINARIZING PATTERN
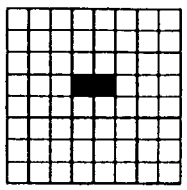
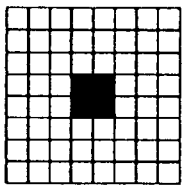
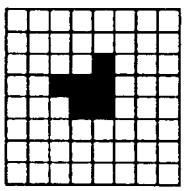
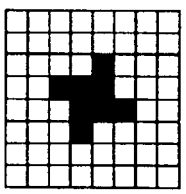
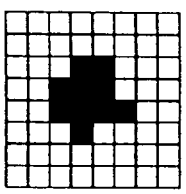
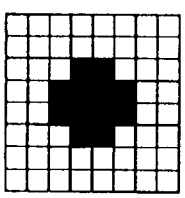
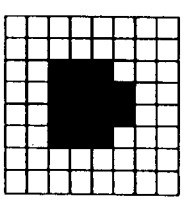
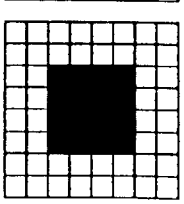
THINNING PATTERN
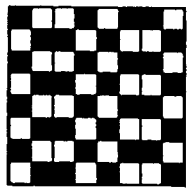
801
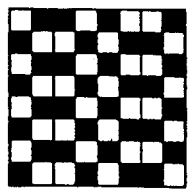
802
1ST PASS PRINT
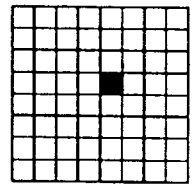
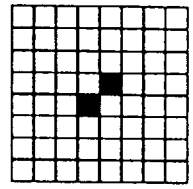
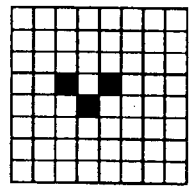
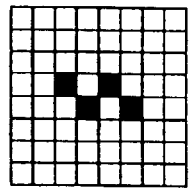
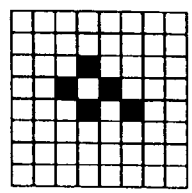
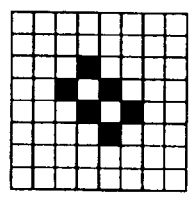
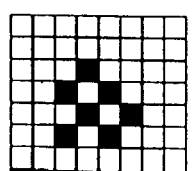
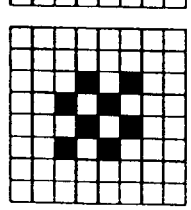
2ND PASS PRINT
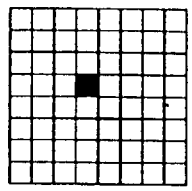
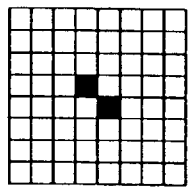
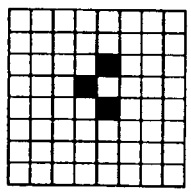
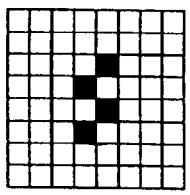
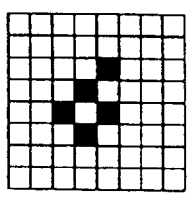
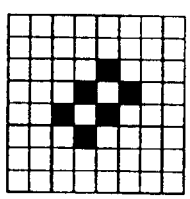
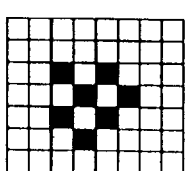
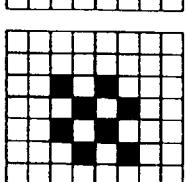

FIG. 40
BINARIZING PATTERN
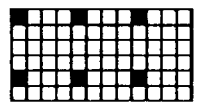
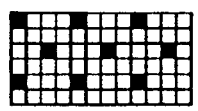
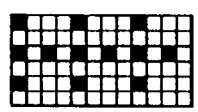
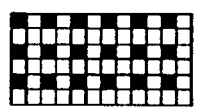
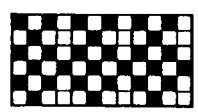
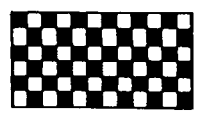
THINNING PATTERN
901 (FOR 1ST PASS)
902 (FOR 2ND PASS)
1ST PASS PRINT
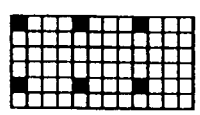
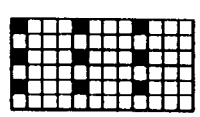
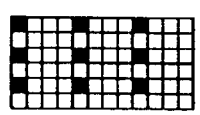
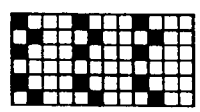
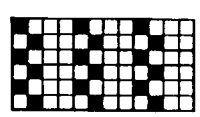
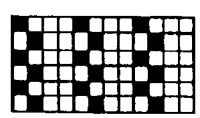
2ND PASS PRINT
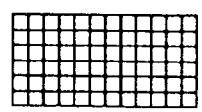
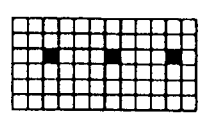
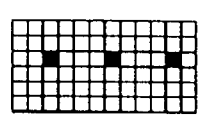
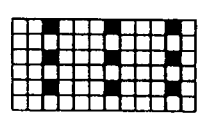
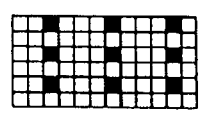
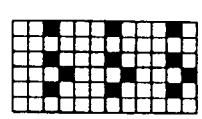
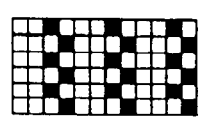

FIG. 45

FIG. 46
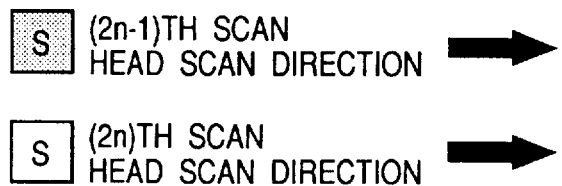
AREA GRADATION PATTERN 1
AND THINNING PATTERN 1
FIG. 47
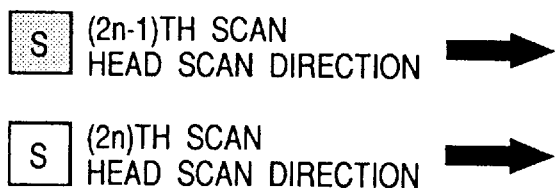
AREA GRADATION PATTERN 1
AND THINNING PATTERN 2

FIG. 48
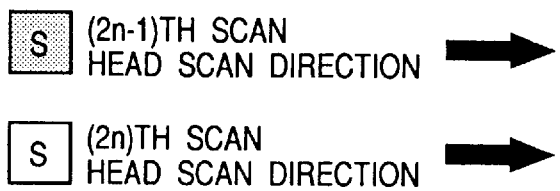
AREA GRADATION PATTERN 2
AND THINNING PATTERN 1
FIG. 49
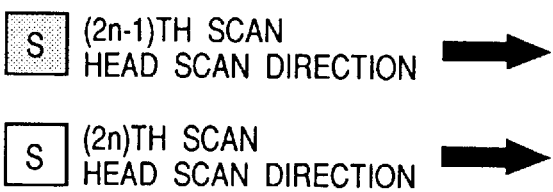
AREA GRADATION PATTERN 2
AND THINNING PATTERN 2

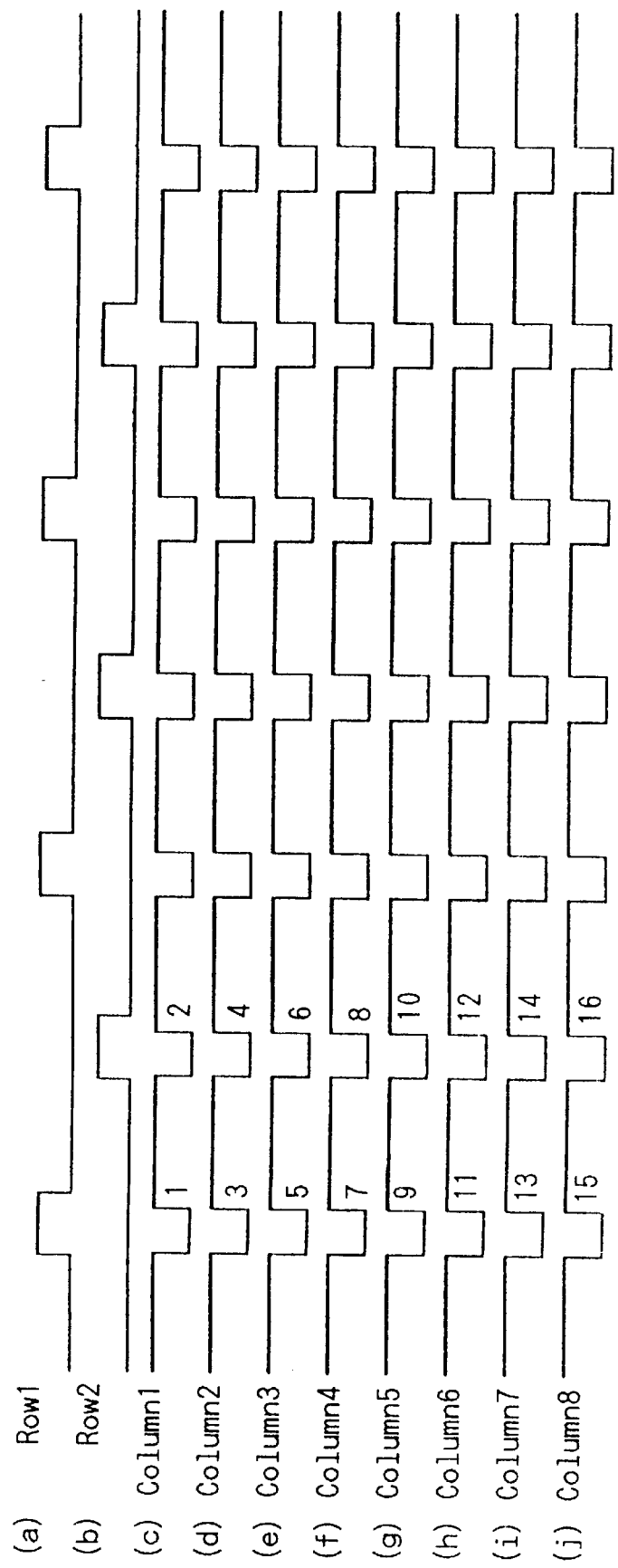

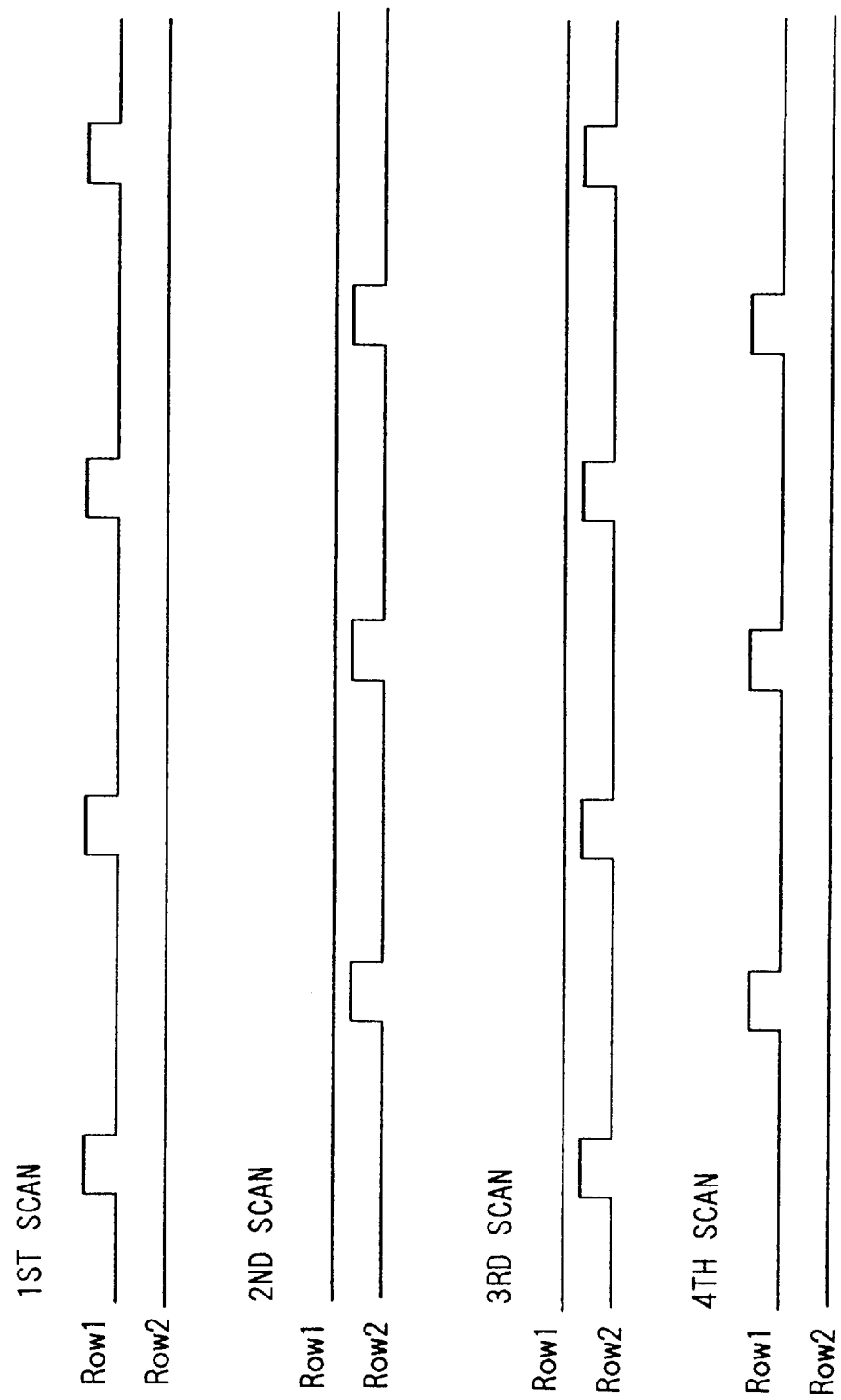

1ST SCAN
Row1
Row2

2ND SCAN
Row1
Row2

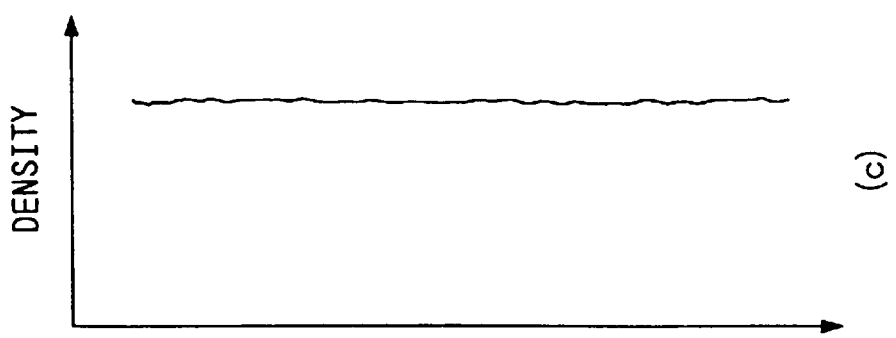
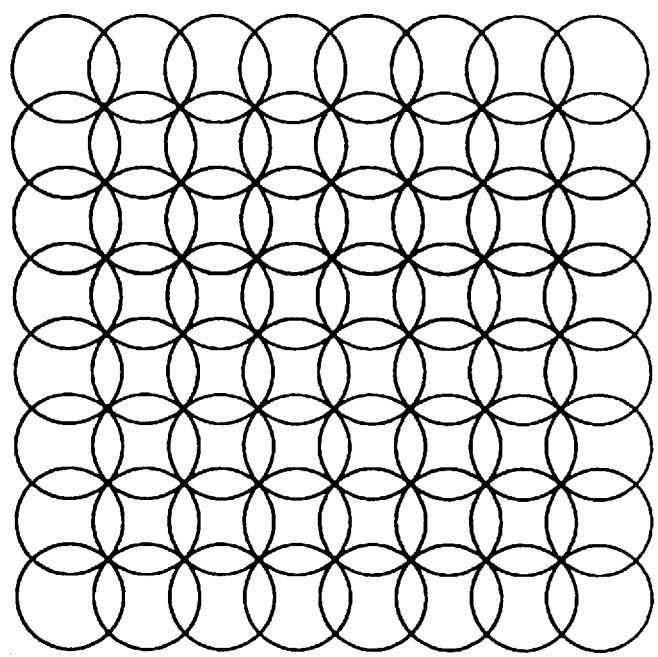
FIG. 65
PRIOR ART
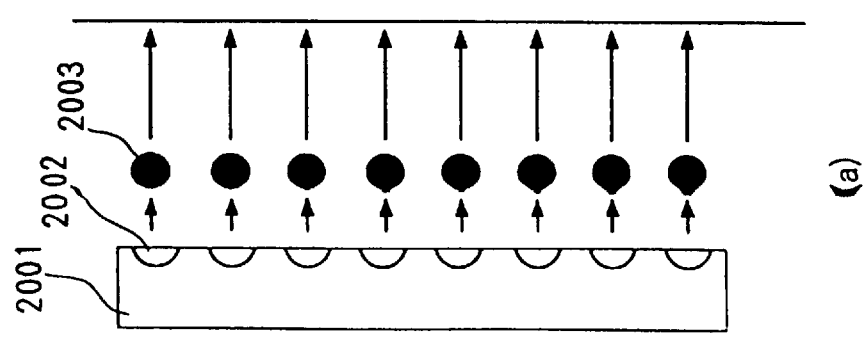

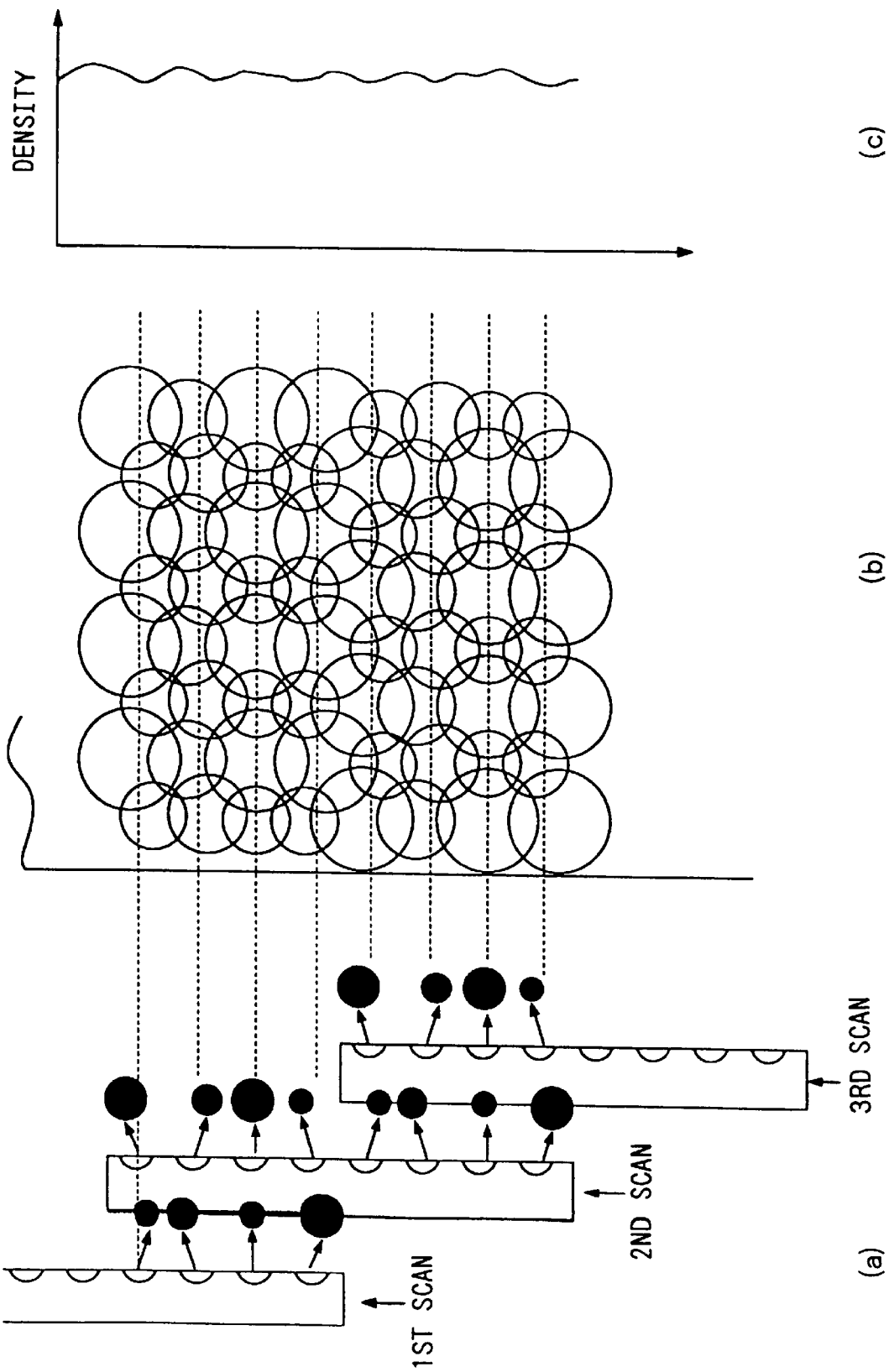

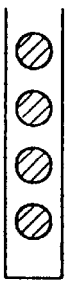
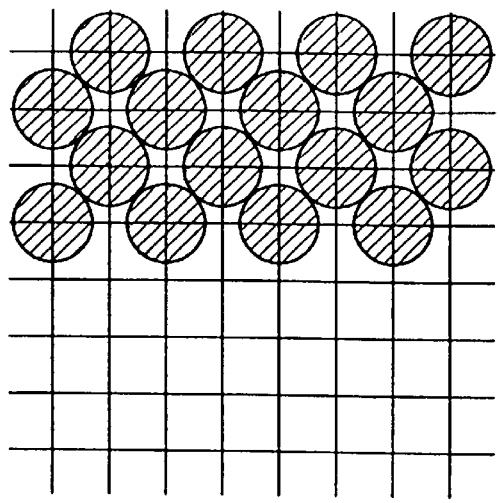
FIG. 68A
PRIOR ART
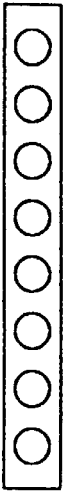
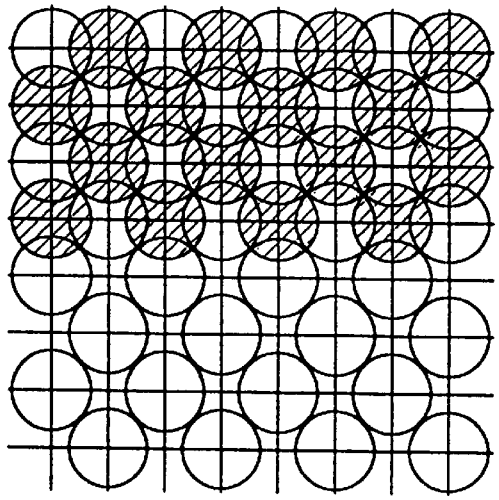
FIG. 68B
PRIOR ART
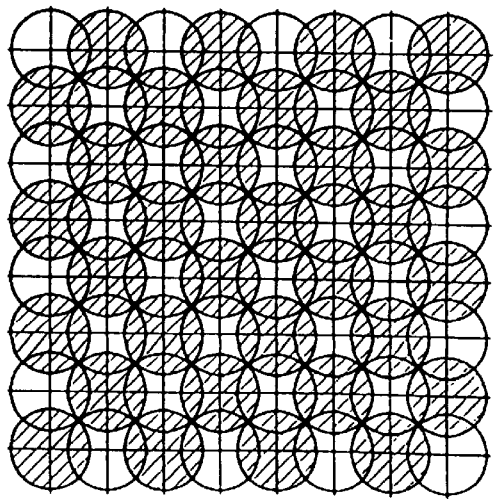
FIG. 68C
PRIOR ART
 CHECKER
 REVERSE CHECKER

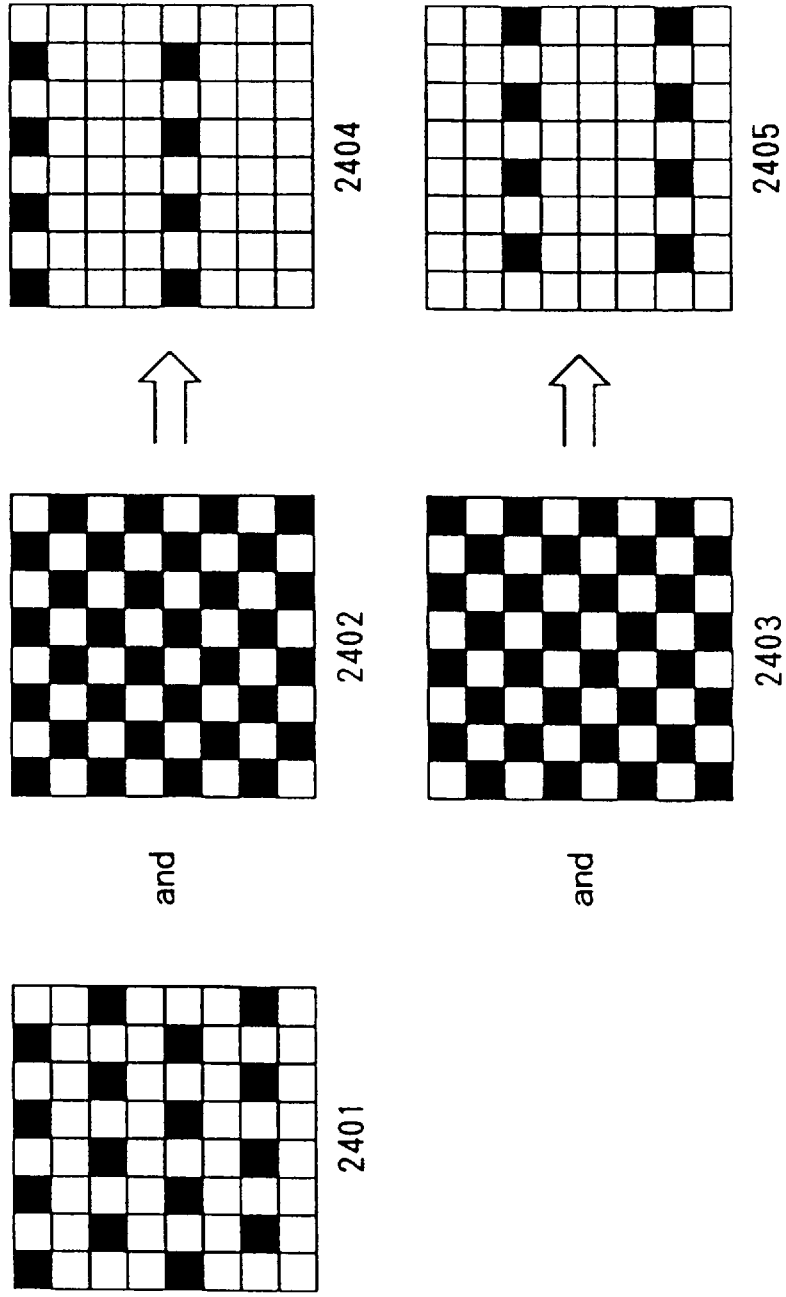

FIG. 78
PRIOR ART

| COLOR | PAPER TYPE | THINNING TYPE | RECORD AREA (1) | | | RECORD AREA (2) | | | COLOR DIFFER-ENCE |
|---|---|---|---|---|---|---|---|---|---|
| | | | L* | a* | b* | L* | a* | b* | |
| Y100% C50% | A | FINE 1 | 56.74 | -46.82 | 29.48 | 55.70 | -48.04 | 25.93 | 9.9 |
| | | FINE 2 | 56.98 | -45.88 | 28.99 | 57.04 | -45.20 | 29.42 | 0.8 |
| | B | FINE 1 | 60.67 | -48.31 | 34.07 | 55.36 | -55.19 | 21.35 | 15.4 |
| | | FINE 2 | 58.78 | -49.41 | 26.63 | 57.95 | -50.05 | 26.71 | 1.1 |
| Y100% K50% | A | FINE 1 | 42.40 | -8.63 | 22.57 | 40.51 | -7.29 | 20.22 | 3.3 |
| | | FINE 2 | 43.73 | -7.81 | 23.63 | 43.03 | -7.66 | 22.97 | 1.0 |
| | B | FINE 1 | 43.04 | -9.51 | 20.95 | 35.35 | -6.63 | 13.45 | 10.8 |
| | | FINE 2 | 40.35 | -8.05 | 18.76 | 40.19 | -8.05 | 18.51 | 0.3 |

(a)       (b)

(a)       (b)

(a)      (b)      (c)      (d)

FIG. 83
PRIOR ART
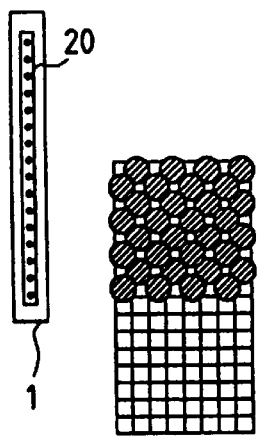
(a)
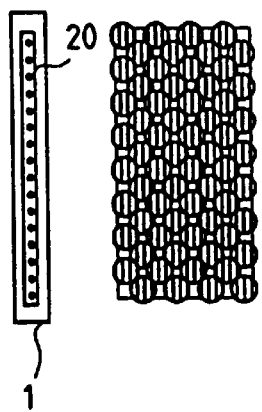
(b)
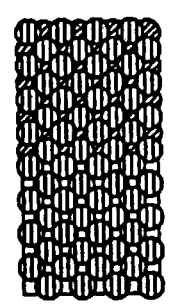
(c)
FIG. 84
PRIOR ART
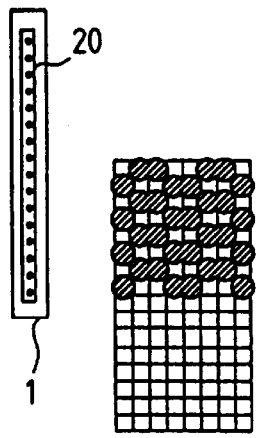
(a)
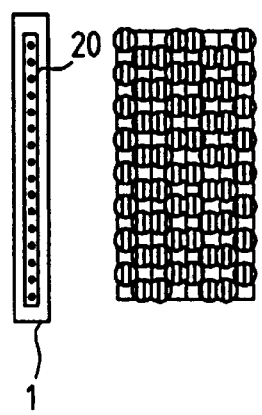
(b)
(c)

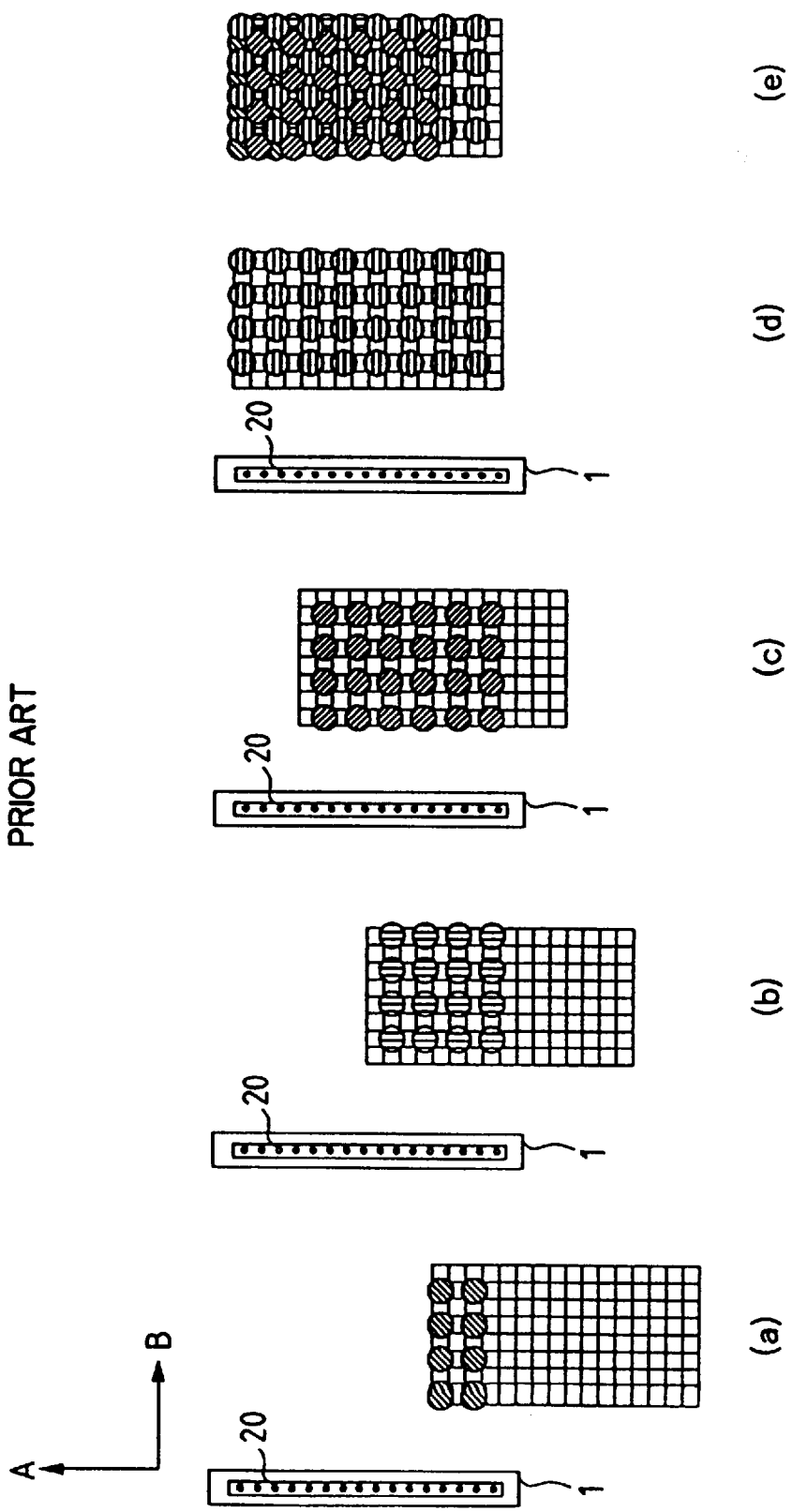

INK JET RECORDING METHOD AND APPARATUS

This application is a continuation of application Ser. No. 08/510,030, filed Aug. 1, 1995, now abandoned, and which is a continuation of application Ser. No. 07/921,231 filed Jul. 29,1992, now abandoned.

BACKGROUND OF THE INVENTION

1. Field of the Invention

The present invention relates to an ink jet recording apparatus which includes a recording means constituted by arranging a plurality of eject or election orifices, and performs recording by ejecting ink droplets onto a recording medium.

2. Related Background Art

With the widespread use of copying machines, information processors, such as wordprocessors and computers, and communication equipment, an apparatus for performing digital image recording using an ink jet recording head has rapidly spread as one of image forming (recording) apparatuses for these instruments. Such a recording apparatus employs a recording head (to be referred to as a multi-head hereinafter) constituted by integrally arranging a plurality of recording elements, and a head having integrated ink eject orifices and liquid channels is generally used as this recording head in order to improve the recording speed. The recording apparatus of this type generally includes a plurality of these multi-heads in order to perform color recording.

Unlike a monochromatic printer for printing only characters, an apparatus for performing color recording as described above must satisfy various factors such as color development properties, gradation characteristics, and uniformity. In particular, the uniformity is important because slight variations in nozzles produced due to differences between manufacturing processes of multi-heads affect the ink eject quantities or directions of the individual nozzles during printing, and this finally degrades an image quality as the density variation of a printed image.

This will be described in more detail with reference to FIGS. 65 and 66. Referring to (a) in FIG. 65, it is assumed that a multi-head 2001 is constituted by eight multi-nozzles 2002 for the sake of simplicity. As shown in (a) of FIG. 65, it is ideal that equal quantities of ink droplets 2003 are ejected in the same direction from the multi-nozzles 2002. If ink ejection is performed in this manner, dots of the same size are implanted on a paper surface as shown in (b) of FIG. 65, and a uniform image free from a density variation as a whole can be obtained ((c) in FIG. 65).

The individual nozzles, however, are actually different from each other as described above. Therefore, if printing is performed in the same manner as described above, variations are caused in the sizes and the directions of ink droplets ejected from these nozzles as shown in (a) of FIG. 66, and these ink droplets are implanted on a paper surface as shown in (b) of FIG. 66. As is apparent from (b) in FIG. 66, along the main scan direction of the head, blank portions which cannot satisfy an area factor of 100% are periodically present, the dots overlap each other thicker than needed, or a white stripe is formed as shown in the central portion of this drawing. The dots implanted in this condition form a density distribution shown in (c) of FIG. 66 with respect to the direction of the nozzle array. As a result, the above-mentioned phenomena are sensed as a density variation by human eye.

The following method is invented as a countermeasure against such a density variation. This method will be described below with reference to FIGS. 67 and 68A to 68C. According to this method, the multi-head 2001 is scanned three times in order to complete the print area shown in FIG. 65 or 66, and a half of this print area, i.e., a unit area of four pixels is completed by scanning the multi-head twice. In this case, the eight nozzles of the multi-head are grouped into four upper nozzles and four lower nozzles. In the first scan, each nozzle prints dots determined by thinning out given image data by about half in accordance with a predetermined image data array. In the second scan, image data dots of the remaining half are printed, thereby completing printing of the four-pixel unit area. This recording method will be referred to as a multi-pass recording method hereinafter.

The use of such a recording method can reduce by half the influences of the individual nozzles on a printed image even if a head having ejection characteristics, such as those of the multi-head shown in FIG. 66, is used. The resulting printed image is as shown in (b) of FIG. 67, in which black or white stripes are less conspicuous. Therefore, as shown in (c) of FIG. 67, the density variation is much more reduced than that shown in FIG. 66.

In performing recording of this type, image data is divisionally printed through the first and second scan operations, as two parts which complement each other, in accordance with a given predetermined array. This image data array (thinning pattern) is most often a checker pattern constituted by every other pixel in both the row and column directions, as shown in FIGS. 68A to 68C. Note that the recording methods of this type are described in the following patent specifications:

Japanese Laid-Open Patent Application No. 60-214670
Japanese Laid-Open Patent Application No. 60-214671
U.S. Pat. No. 4,622,561
U.S. Pat. No. 4,963,882
U.S. Pat. No. 4,967,203

In a unit print area (in this case, a four-pixel unit area), therefore, printing is completed through the first scan for printing a checker pattern and the second scan for printing a reverse checker pattern.

FIGS. 68A, 68B, and 68C are views for explaining the manner of completing recording of a predetermined area using the above checker and reverse checker patterns when a multi-head having eight nozzles is used as in the cases of FIGS. 65 to 67. In the first scan, recording of the checker pattern (hatched circles) is performed by using the four lower nozzles (FIG. 68A). In the second scan, paper feed is performed by the length of four pixels (half the head length), and recording of the reverse checker pattern (blank circles) is performed (FIG. 68B). In the third scan, paper feed is again performed by the length of four pixels (half the head length), and recording of the checker pattern is performed again (FIG. 68C). In this manner, paper feed in units of four pixels and alternate recording of the checker and reverse checker patterns are sequentially performed to complete a four-pixel unit record area in each scan operation.

As described above, since printing is completed in each unit area by using two different groups of nozzles, a high-quality image free from a density variation can be obtained.

Even when this multi-pass recording is performed, however, the density variation is sometimes not at all eliminated depending on the print duty. In particular, another density variation is sometimes found in intermediate color portions or color-mixed portions. This phenomenon will now be described below.

Normally, image data of a given area to be recorded is already regularly arranged before reception by a printer. A printer stores a predetermined quantity of such data in a buffer and applies another mask (image array pattern), i.e., the checker or reverse checker pattern as described above to the data. When both the data array and the mask are set ON, printing of corresponding pixels is performed. FIGS. 69 to 71 are views for explaining the manner of this type of printing.

FIG. 69 illustrates already arranged data 2401 stored in a buffer, a checker pattern mask 2402 indicating pixels which can be printed in the first pass, a reverse checker pattern mask 2403 indicating pixels which can be printed in the second pass, and patterns 2404 and 2405 indicating pixels printed in the first and second passes, respectively.

Referring to FIG. 69, the buffer stores data already arranged to print 25% of a given area. In this data, in order to maintain a constant density in a designated predetermined area, an image to be printed is generally scattered as much as possible. The type of this image array depends on the area gradation method performed for the data during image processing before the data is transferred to a printer. The data 2401 shows an example of an image array for 25% data. When this data is printed through the masks 2402 and 2403, the data is equally divided and recorded in the first and second passes as represented by the pixel arrays 2404 and 2405, respectively.

If, however, data of exactly 50% is supplied as shown in FIG. 70, the array of data 2501 in which an image is scattered as much as possible coincides entirely with the array of either a checker pattern mask (2502) or a reverse checker pattern mask (2503), as can be seen easily from FIG. 70.

In this case, printing of the entire image data is completed in the first pass (2504), and no printing is performed in the second pass (2505). That is, all the print data (2501) on the same line is printed by the same nozzles. Therefore, since the influence of variations in nozzles is directly reflected on the density variation, the original purpose of the above divisional recording method cannot be achieved.

FIG. 71 shows the result of printing obtained when array image data having a higher duty than that shown in FIG. 69 or 70 is input. As shown in FIG. 71, a considerable difference is present between the numbers of printed pixels in the first and second passes. That is, although the density variation is reduced at high duties near 100%, it appears again with data having a low duty to a duty around 50%.

In addition, in the print area shown in FIGS. 68A to 68C, the checker pattern is implanted first in the upper half four-pixel unit area, and then the reverse checker pattern is implanted in this area. In the lower half four-pixel unit area, however, the reverse checker pattern and the checker pattern are implanted in this order. This phenomenon, combined with the problematic phenomenon described above, brings about another undesirable phenomenon in that a print area in which a large number of dots are implanted in the first pass while only a small number of dots are implanted in the second and a print area in which almost no printing is performed in the first pass while an enormously large number of dots are printed in the second alternately appear in units of half lengths of the head. This phenomenon introduces the following problem especially in color-mixed portions printed in accordance with the ink jet system.

That is, when solid printing of an intermediate color formed by properly ejecting inks of different colors to overlap and adjoin each other is performed, color variations regularly occur.

FIG. 72 shows a conventional head-divided printing method (to be referred to as an L/n-paper feed printing method hereinafter, where n indicates the number of divided areas).

In this method, a record area (L) of each recording head is divided into two parts, and each recording head records one of the checker and reverse checker patterns in the first scan as shown in FIG. 72. Thereafter, paper feed of a length of L/2 is performed, and a different nozzle group prints the other one of the checker and the reverse checker patterns, thereby completing the printing. Referring to FIG. 72, although eject orifice arrays cannot be actually seen, they are viewed from the above for convenience of description.

More specifically, in the first scan, the nozzles of a record area (1) of each recording head perform printing of an image to be recorded thinned out by half in the checker pattern. Paper feed is performed by a length of L/2. In the second scan, each recording head performs printing of the image thinned out by half in the reverse checker pattern in both the record areas (1) and (2). As a result, printing in a portion corresponding to the record area (2) is completed. Paper feed of the length L/2 is performed again. In the third scan, the checker-pattern thinning printing is performed again by the entire record area, and so forth. In this manner, printing is repeatedly performed. Referring to FIG. 72, the contents in parentheses in the second and third scan operations indicate portions printed in the past.

The reason why an intermediate color variation is caused in this conventional example will now be described schematically below assuming that an eight-nozzle multi-head is used. In this case, four colors are cyan (C), magenta (M), yellow (Y), and black (K). Suppose, for example, that an intermediate color (yellowish green) overlapped at print duties of C 62.5% and Y 100% as shown in (a) of FIG. 73 is printed as image data to be recorded. When the intermediate color shown in (a) of FIG. 73 is printed using a checker pattern mask, printing of C and Y is performed at a 50% duty throughout the checker pattern mask in the first pass ((b) in FIG. 73). In the second pass, printing of the remaining duties, i.e., C 12.5% and Y 50% is performed ((c) in FIG. 73). The individual recording heads (of the respective colors) which form the images shown in (b) and (c) of FIG. 73 eject inks on pixels as indicated by (d), (e), (f), and (g) in FIG. 73.

FIG. 74 schematically shows the ejection position of the C recording head and the Y recording head in the first scan in accordance with the multi-pass printing method, and the resulting dots formed on a recording medium. Referring to FIG. 74, vertical stripe patterns indicate pixels where both the C and Y heads eject inks, and oblique stripe patterns indicate pixels where only the Y head ejects an ink. In the first scan, each recording head performs recording through the checker pattern mask by using the four nozzles of the record area (1). As a result, the checker pattern of dots where C and Y overlap each other is formed on the recording medium. Thereafter, paper feed of a length L/2 is performed to move the dots recorded in the first scan toward the record area (2).

FIG. 75 schematically shows an ejection position in the second scan and the resulting dots formed on the recording medium. In the second scan, the reverse checker pattern is printed by the entire record areas (1) and (2). As a result, the dots recorded in a paper portion corresponding to the record area (2) in this second scan overlap the checker pattern dots recorded in the first scan to complete the recording in this portion. Paper feed of the length L/2 is performed to move the paper portion corresponding to the record area (2) outside the record area and a paper portion corresponding to the record area (1) toward the record area (2).

It should be noted that when dots are printed to overlap other dots recorded previously, the dots implanted later tend to soak deeper in the direction of thickness of paper than the previously recorded dots at their overlap portions. FIG. 77 is a sectional view schematically showing this phenomenon. That is, a dye, such as a dyestuff, in an ejected ink bonds both physically and chemically with a recording medium. In this case, since the bond between the recording medium and the dye is finite, the bond between the dye of a previously ejected ink and the recording medium has highest priority as long as no large difference is present between the bonding forces of these dyes because of a difference between their types. Therefore, a large amount of the previously recorded ink dye remains on the surface of the recording medium, whereas the ink dye implanted later hardly bonds with the recording medium on its surface but soaks deep in the direction of thickness.

In FIG. 75, therefore, the dots recorded in the second scan are illustrated to overlap those recorded in the first scan from below.

FIG. 76 schematically shows an ejection position in the third scan and the resulting dots formed on the recording medium.

In the third scan, the checker pattern is printed by the entire record areas (1) and (2). As a result, the dots recorded in a paper portion corresponding to the record area (2) in this third scan overlap those recorded by the reverse checker pattern in the second scan to complete recording in this portion.

Although, however, the same quantities of inks are implanted in the portion currently corresponding to the record area (2) and the portion which is already moved outside the record area and in which printing is completed in the second scan, a difference is present between tones of color in the two portions to cause a color variation in these portions.

That is, since the checker pattern is recorded first in the portion outside the record area, a large number of pixels where both C and Y are ejected are present on the surface of the recording medium. In the portion corresponding to the record area (2), on the other hand, a large number of pixels where only Y is recorded are present on the surface of the recording medium. Therefore, yellowish green which is relatively strongly yellowish is formed in that portion.

A table of FIG. 78 explains this phenomenon using actual data. This table shows the results of printing of a halftone pattern consisting of a Y 100% duty and a C or K 50% duty performed in accordance with the multi-pass printing method. In this case, the printing was performed by both of a printing method (FINE1) in which Y 50% and C (K) 50% are recorded in the first pass and Y 50% and C (K) 0% are recorded in the second pass, and a printing method (FINE2) in which Y 50% and K 25% are recorded in both the first and second passes. (L*a*b) and a color difference in portions corresponding to the record areas (1) and (2) for performing different scan operations as described above were measured for two types of papers. According to these measurement results, an obvious difference is found between FINE1 and FINE2 even with the same print duty.

Because of the two problematic phenomena as described above, the conventional multi-pass printing method performed to compensate for nozzle variations can achieve only an image quality still unsatisfactory in terms of a density variation.

In addition, in the ink jet recording apparatus as described above, the ink eject orifices are grouped into a plurality of blocks and driven time-divisionally in units of these blocks, thereby preventing crosstalk. In this case, the crosstalk is a phenomenon that in a recording head mounting a plurality of ink eject orifices at a high density, ejection of an ink becomes unstable due to pressure waves or thermal diffusion from adjacent eject orifices.

FIGS. 79 and 80 are block diagrams showing conventional electric circuits for driving a printing head, and FIG. 81 is a timing chart showing signal waveforms of individual parts. In this case, assume that driving of a recording head for performing ink ejection is divided into four parts. A recording head 1 has 16 heaters 2, and eject orifices for ejecting an ink are provided in a one-to-one correspondence with the heaters 2. In this recording head 1, print data Si is set in a 16-bit shift register 5 by a print data sync clock CLKi, and a transistor array 3 is driven by switching on enable signals BEi1*, BEi2*, BEi3*, and BEi4*, thereby heating the heaters 2 in units of four heaters to perform printing. The signals BEi1*, BEi2*, BEi3*, and BEi4* are formed by a decoder 6. Note that a signal LATCH* is a control signal for latching the print data in a 16-bit latch 4, and a signal CARESi* is a reset signal for clearing the contents of the latch 4. A symbol* indicates that a corresponding signal is low-active.

The first heat operation is started by a heat start signal ((b) in FIG. 81), and a heat enable signal ((c) in FIG. 81) is kept HIGH during a print head driving period. The heat enable signal is formed by a flip-flop which receives the heat start signal and a heat clock signal ((a) in FIG. 81). During the period in which the heat enable signal is HIGH, counters 8 and 9 are counted up by the heat clock signal. The value of the counter 8 causes a comparator 10 to generate a heat pulse* signal ((d) in FIG. 81) for driving the head 1. The comparator 10 keeps generating the heat pulse* signal until a pulse width set in a register 12 by a CPU (not shown) coincides with the count. When the count coincides with the set value, the comparator 10 switches the heat pulse* signal to LOW. The counter 9 is counted up for each cycle of the counter 8 to cause a comparator 11 to generate nozzle select1 and nozzle select2 signals ((e) and (f) in FIG. 81) for selecting divided blocks of the print head. The nozzle select1 and nozzle select2 signals select head-divide signals BEi1*, BEi2*, BEi3*, and BEi4* ((h) to (k) in FIG. 81) via the decoder 6. After switching the head-divide signals four times, the comparator 11 generates a heat end* signal ((g) in FIG. 81) and switches the heat enable signal to LOW, thereby ending the heat operation. In this circuit, all of the signals operate in synchronism with the heat clock signal. The heat enable signal indicating the heat period is started by the heat start signal and ended by the heat end* signal. The heat pulse* signal for actually heating the head 1 is divided into BEi1*, BEi2*, BEi3*, and BEi4* by divided block select signals, i.e., the nozzle select1 and nozzle select2 signals.

While the recording head is thus time-divisionally driven, divisional recording is performed.

FIGS. 82A to 82C show mask patterns for masking a signal to be recorded, in each of which hatched portions are portions for masking a signal and blank portions indicate recordable portions. Each mask is constituted by a 4×4 matrix, and an image signal is masked by repeating this mask pattern in both the vertical and horizontal directions. FIG. 83 is a view showing image recording processes, in which the eject orifice array of the recording head is equally divided into two parts (n=2). Referring to FIG. 83, a recording medium is fed in a direction A, and the recording head is scanned in a direction B.

First, data to be recorded is masked in accordance with a mask pattern (a) of FIG. 82A, and an upper-half image (a) of FIG. 83 is recorded by the first scan-recording. Subsequently, the recording medium is fed in the direction A by the length of an area (of eight nozzles in FIG. 83) obtained by equally dividing the eject orifice array (of 16 nozzles in FIG. 83) into two parts. The data is masked in accordance with a mask pattern (b) of FIG. 82A, and an image (b) of FIG. 83 is recorded by scanning the recording head 1 in the direction B. An image (c) of FIG. 83 is formed by these two recording processes. In the image (c), recording is completed in an area corresponding to the eight upper nozzles (upper-half nozzles) by performing the scan-recording twice using the eight upper nozzles and the eight lower nozzles of the recording head. Thereafter, these recording processes are repeatedly performed to form one image.

FIG. 84 is a view showing image recording processes in which the eject orifice array of the recording head is similarly equally divided into two parts and the mask patterns shown in FIG. 82B are used. The scan and feed operations of the recording head 1 and the recording medium are the same as those described above. Referring to FIG. 84, an image (a) is formed using a mask pattern (a) of FIG. 82B, and an image (b) is formed using a mask pattern (b) of FIG. 82B. An image (c) is formed through the two recording processes of the images (a) and (b).

FIG. 85 is a view showing recording processes performed when the eject orifice array of the recording head is equally divided into four parts (n=4). First, data to be recorded is masked in accordance with a mask pattern (a) of FIG. 82C, and an image (a) is recorded by the first scan-recording. Subsequently, the recording medium is fed in the direction A by the length of an area (of four nozzles in FIG. 85) obtained by equally dividing the eject orifice array (of 16 nozzles in FIG. 85) of the recording head 1 into four parts. The data is masked in accordance with a mask pattern (b) of FIG. 82C, and an image (b) is recorded by scanning the recording head 1 in the direction B. Thereafter, while the recording medium is similarly fed, an image (c) is formed using a mask pattern (c) of FIG. 82C, and an image (d) is formed using a mask pattern (d) of FIG. 82C. An image (e) is formed through these four recording processes. In an area of the image (e) corresponding to the four uppermost nozzles, recording is performed using different eject orifice groups obtained by equally dividing the eject orifice array into four parts, and an image is completely formed.

In each of the recording methods described above, it is possible to limit the quantity of an ink to be recorded on a recording medium at one time. Therefore, when recording is to be performed on a recording medium having a poor ink absorbency, especially when color recording is to be performed, a blur can be reduced to enable high-quality recording.

In the above recording methods, however, the heat signal of the head is divided, and the heat operation is time-divisionally performed in units of divided blocks. This results in a deviation between the positions of dots formed on the recording medium for reasons to be explained below.

FIGS. 88A and 88B are views showing the results of recording obtained when an image shown in FIG. 86 is recorded by the recording method shown in FIG. 83 while the eject orifices are divided as shown in FIG. 87A. FIG. 88A shows the result obtained when the head is not inclined, and FIG. 88B shows the result obtained when the head is inclined due to the mounting error or the like of the head. Note that dots ①, ②, and ③ are ejected by the first, second, and third scan operations, respectively, and each suffix indicates the number of a divided block.

A deviation shown in FIG. 88A is induced by a timing difference between divide signals BEi1, BEi2, BEi3, and BEi4, and this deviation $L_0$ is given by $L_0 = \Delta T v$ where $\Delta T$ is the time difference between the heat signal generation timings of the divided blocks BEi1 and BEi4, and $v$ is the scan rate of the recording head. When the head is inclined as shown in FIG. 88B, the basic ejection position is varied by the time difference between the generation timings of the heat signals of the individual divided blocks and the inclination of the head, in accordance with whether the upper or lower portion of the head is used. As a result, the deviations satisfy a relation of $L_2 < L_1$. In this case, recorded dots are scattered in an area corresponding to the eight upper nozzles, whereas they are concentrated in an area corresponding to the eight lower nozzles. Note that if the head 1 is inclined in a direction opposite to that shown in FIG. 88B, recorded dots are concentrated in the upper area while they are scattered in the lower area.

FIGS. 89A and 89B show the results of recording obtained when the image shown in FIG. 86 is recorded by the recording method shown in FIG. 83 while the eject orifices are divided as shown in FIG. 87B. FIG. 89A shows the result obtained when the head is not inclined, and FIG. 89B shows that obtained when the head is inclined. A deviation $L_0$ in FIG. 89A is similarly given by $L_0 = \Delta T v$ where $\Delta T$ is the time difference between the generation timings of the heat signals of the divided blocks BEi1 and BEi4, and $v$ is the scan rate of the recording head. When the head is inclined as shown in FIG. 89B, the deviations satisfy a relation $L_2 < L_1$ due to the time difference between the generation timings of the heat signals of the individual divided blocks and the variation in the basic ejection positions. As in the recording method described above, recorded dots are scattered in an area corresponding to the eight upper nozzles, whereas they are concentrated in an area corresponding to the eight lower nozzles.

The quality of an image recorded by this recording method is significantly degraded by stripe-like density variations produced by the above dense and sparse patterns of dots, which alternately appear in equally divided $n$ areas (in this case, an area corresponding to the eight nozzles).

FIGS. 90A and 90B show images obtained by recording the image shown in FIG. 86 by the recording method shown in FIG. 84 when the eject orifices are divided as shown in FIG. 87B. FIG. 90A shows an image obtained when the head is not inclined, and FIG. 90B shows an image obtained when the head is inclined. When the head is inclined as shown in FIG. 90B, the deviations satisfy the relation $L_2 < L_1$ as described above.

In this recording method, unlike in the above recording methods, no stripe-like density variations occur because dense and sparse dot patterns do not occur at equal intervals. However, since the difference between the deviations $L_1$ and $L_2$ is large, a texture which leads to degradation in image quality occurs.

SUMMARY OF THE INVENTION

The present invention has been made in consideration of the above situation and has as its object to provide an improved ink jet recording method and apparatus.

It is another object of the present invention to provide an ink jet recording method and apparatus capable of recording a high-quality image free from a density variation and the like.

It is still another object of the present invention to provide an ink jet recording method and apparatus capable of recording a high-quality image free from a color variation.

It is still another object of the present invention to provide an ink jet recording method and apparatus capable of recording a high-quality image free from a recording positional deviation.

It is still another object of the present invention to provide an ink jet recording method and apparatus capable of performing a scan operation a plurality of number of times on a predetermined area of a recording medium by using different blocks of a recording head such that substantially equal amounts of an ink are implanted in the individual scan operations, thereby recording a high-quality image free from a density variation or a color variation.

It is still another object of the present invention to provide an ink jet recording method and apparatus capable of ejecting an ink on a recording medium constantly in the same implantation order by using $n$ blocks of each recording head.

It is still another object of the present invention to provide an ink jet recording method and apparatus capable of masking image data using a plurality of block patterns each consisting of a combination of patterns, each of which has an area of 2 ×2 pixels or more, and which have different arrays of print and non-print pixels, thereby sequentially recording thinned images complementary to each other.

It is still another object of the present invention to provide an ink jet recording method and apparatus capable of generating a timing of divisional driving for only blocks to be driven in one heat operation, thereby reducing any recording deviation produced by the divisional driving.

The above and other objects of the present invention will become apparent from the following description taken in conjunction with the accompanying drawings.

BRIEF DESCRIPTION OF THE DRAWINGS

FIG. 11 is a view showing masks according to the third embodiment;

FIG. 20 is a view showing a basic pattern and a mask block pattern of a checker pattern;

FIG. 24 is a view showing basic mask patterns and a mask block pattern according to the sixth embodiment;

FIG. 31 is a view for explaining multi-pass printing according to the sixth embodiment;

FIG. 32 is a view for explaining multi-pass printing according to the seventh embodiment;

FIG. 33 is a view for explaining multi-pass printing according to the sixth embodiment;

FIG. 34 is a view for explaining multi-pass printing according to the seventh embodiment;

FIG. 40 is a view for explaining multi-pass printing according to the sixth embodiment;

FIG. 45 is a view for explaining multi-pass printing according to the ninth embodiment;

FIG. 46 is a view for explaining multi-pass printing using a thinning pattern 1 for a gradation pattern 1;

FIG. 47 is a view for explaining multi-pass printing using a thinning pattern 2 for the gradation pattern 1;

FIG. 48 is a view for explaining multi-pass printing using the thinning pattern 1 for a gradation pattern 2;

FIG. 49 is a view for explaining multi-pass printing using the thinning pattern 2 for the gradation pattern 2;

FIG. 58 is a timing chart for driving the electric circuit shown in FIG. 57;

FIG. 59 is a timing chart for signal control according to the twelfth embodiment;

FIG. 65 is a view showing an ideal condition of printing of an ink jet printer;

FIG. 67 is a view for explaining a reduction in a density variation according to an L/n-paper feed printing method;

FIGS. 68A to 68C are views for explaining a reduction in the density variation according to the L/n-paper feed printing method;

FIG. 69 is view showing 25% data and printed dots obtained by conventional divisional printing;

FIG. 78 is a table showing a color difference obtained when printing is performed by conventional printing methods;

FIG. 83 is a view showing a method of performing recording by equally dividing an eject orifice array of a recording head into two parts;

FIG. 84 is a view showing another method of performing recording by equally dividing an eject orifice array of a recording head into two parts;

FIG. 85 is a view showing a method of performing recording by equally dividing an eject orifice array of a recording head into four parts;

DETAILED DESCRIPTION OF THE PREFERRED EMBODIMENTS

Figure 1A:
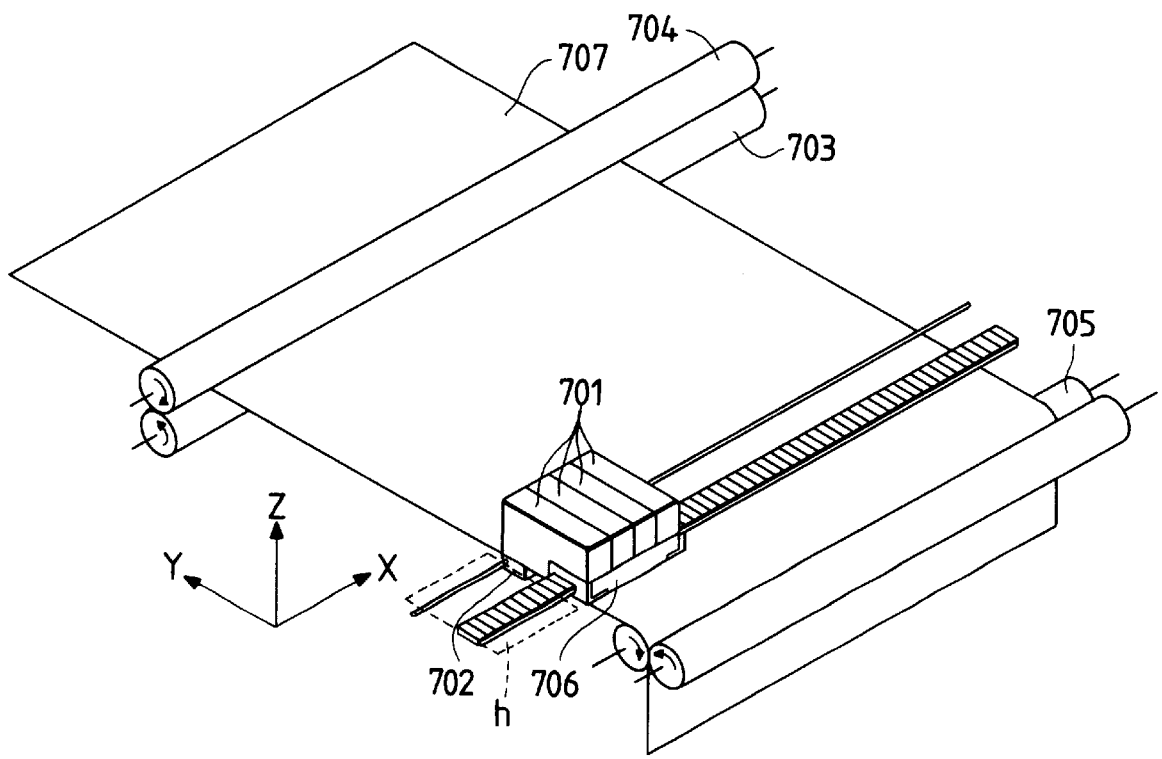
FIGS. 1A and 1B are views schematically showing the arrangement of an ink jet recording apparatus to which the present invention is applicable.

Embodiments of the present invention will be described below with reference to the accompanying drawings. FIG. 1A is a perspective view schematically showing the arrangement of an ink jet recording apparatus to which the present invention is applicable.

Figure 1B:
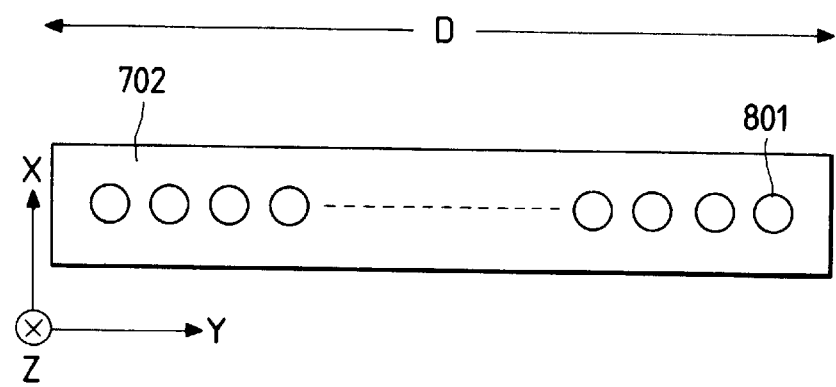

Referring to Fig. 1A, this recording apparatus comprises ink cartridges 701 constituted by ink tanks containing color inks of four colors, black, cyan, magenta, and yellow, and multi-heads 702. FIG. 1B shows multi-nozzles 801 arranged on this multi-head 702 viewed in the Z direction. In this embodiment, the multi-head 702 has thermal energy generating elements in a one-to-one correspondence with the nozzles. The multi-head 702 forms a bubble in an ink by thermal energy generated by each thermal energy generating element and in this manner induces a state change in the ink, thereby ejecting the ink from each ink eject orifice. Referring back to FIG. 1A, a paper-feed roller 703 clamps print paper 707 together with an auxiliary roller 704 and rotates in a direction indicated by an arrow to feed the print paper 707 in the Y direction. Paper-supply rollers 705 supply print paper and at the same time clamp the print paper 707 like the rollers 703 and 704. A carriage 706 supports the four ink cartridges and moves them with the progress of printing. When no printing is in progress or recovery of the multi-head is to be performed, the carriage 706 stands by at a home position h indicated by a dotted line in Fig. 1A.

The four ink jet cartridges mounted on the carriage 706 are arranged such that inks overlap each other in an order of black, cyan, magenta, and yellow inks. Intermediate colors can be realized by properly overlapping ink dots of three colors Cy, M, and Y. That is, red, blue, and green can be realized by overlapping M and Y, Cy and M, and Cy and Y, respectively.

In general, black can be realized by overlapping three colors Cy, M, and Y. In this case, however, since it is difficult to precisely overlap these colors, a chromatic edge is formed if color development of black is poor. This also results in too much an increase in an ink implantation density per unit time. Therefore, only black is implanted separately.

Figure 2:
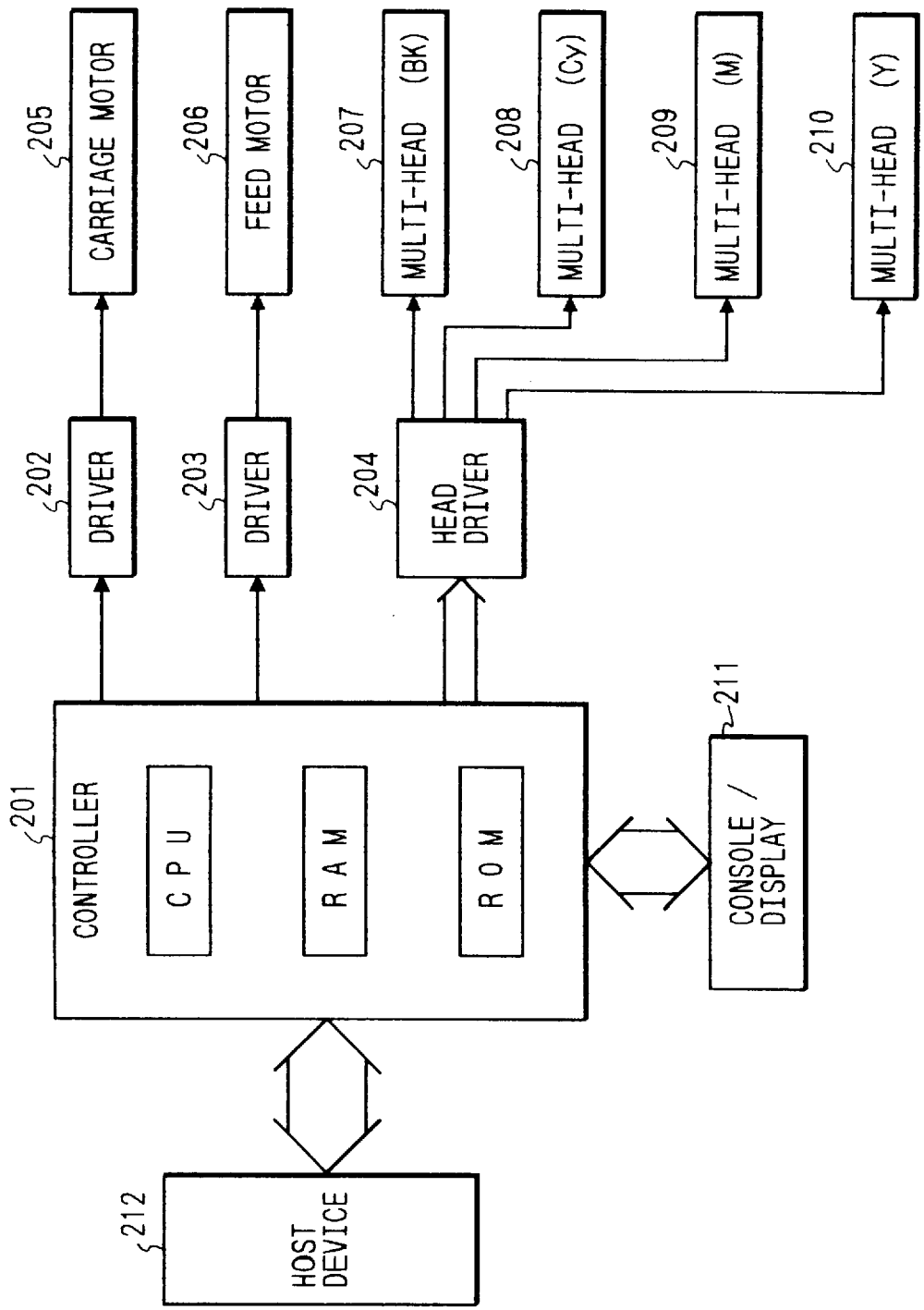
FIG. 2 is a block diagram showing a controller of the ink jet recording apparatus shown in FIGS. 1A and 1B.

FIG. 2 is a block diagram showing a controller of the ink jet recording apparatus shown in FIG. 1A. Referring to FIG. 2, a controller 201 mainly comprises a CPU, a ROM, and a RAM and controls the individual sections of the apparatus in accordance with programs stored in the ROM. A driver 202 drives a carriage motor 205 on the basis of a signal from the controller 201, and the carriage motor 205 moves the carriage 706 in the X direction (main scan). A driver 203 drives a feed motor 206 on the basis of a signal from the controller 201, and the feed motor 206 drives the paper-supply rollers 705 and the paper-feed roller 703 to feed a recording medium in the Y direction (sub scan). A driver 204 drives multi-heads 207 to 210 on the basis of print data from the controller 201. The controller 201 is also connected to a console/display 211 for performing various key input and display operations and a host device 212 for supplying print data to the controller.

The carriage 706 is located at the position (home position) shown in FIG. 1A before printing is started. Upon receiving a print start instruction, the carriage 706 moves in the X direction and performs printing in units of record areas divided on a paper surface using n multi-nozzles 801 on the multi-head 702. When printing of the data is finished to the end of the paper surface, the carriage returns to its home position and performs printing in the X direction again. During a time interval from the end of the first printing to the start of the second printing, the paper-feed roller 703 rotates in the direction indicated by the arrow to perform paper feed in the Y direction by the length of one divided record area. In this manner, printing of the multi-head and paper feed (sub scan) are performed for each scan (main scan) of the carriage, and this cycle is repeatedly performed to complete data printing on one paper surface.

(1st Embodiment)

Thinning patterns of two-pass printing performed by the ink jet recording apparatus will be described below with reference to FIGS. 3 and 4. This embodiment uses a so-called Bayer type pattern according to a dither method which is one of the most general area gradation methods for already binarized image data arrays. In this embodiment, assume that each pattern is constituted by a 4×4 matrix. FIG. 4 shows the results of printing of such array data obtained in the first and second passes for the respective duties when each data present in a buffer is masked by conventionally used checker and reverse checker patterns. The mask patterns used are a mask (checker thinning pattern) 21 for the first pass and a mask (reverse checker thinning pattern) 22 for the second pass. When array data of various duties illustrated on the left side of FIG. 4 are masked through these masks 21 and 22, the respective print results of the data obtained in the first and second passes become as illustrated on the right side of FIG. 4.

When the checker and reverse checker patterns are used as described above, data with a print duty of up to 50% is completely printed in only the first pass, i.e., a difference is present between the numbers of recorded dots in the first and second passes.

In the embodiment to be described below, a given image data array according to the area gradation method is thinned out using thinning patterns each having an array not synchronized with the image data array at the same duty. The resulting thinned image data are divisionally recorded on a predetermined area on a recording medium by performing a scan operation a plurality of number of times using areas of a record areas of a recording head. In this case, these thinning patterns are formed such that substantially equal quantities of an ink are implanted in a plurality of divisional recording operations.

Figure 3:
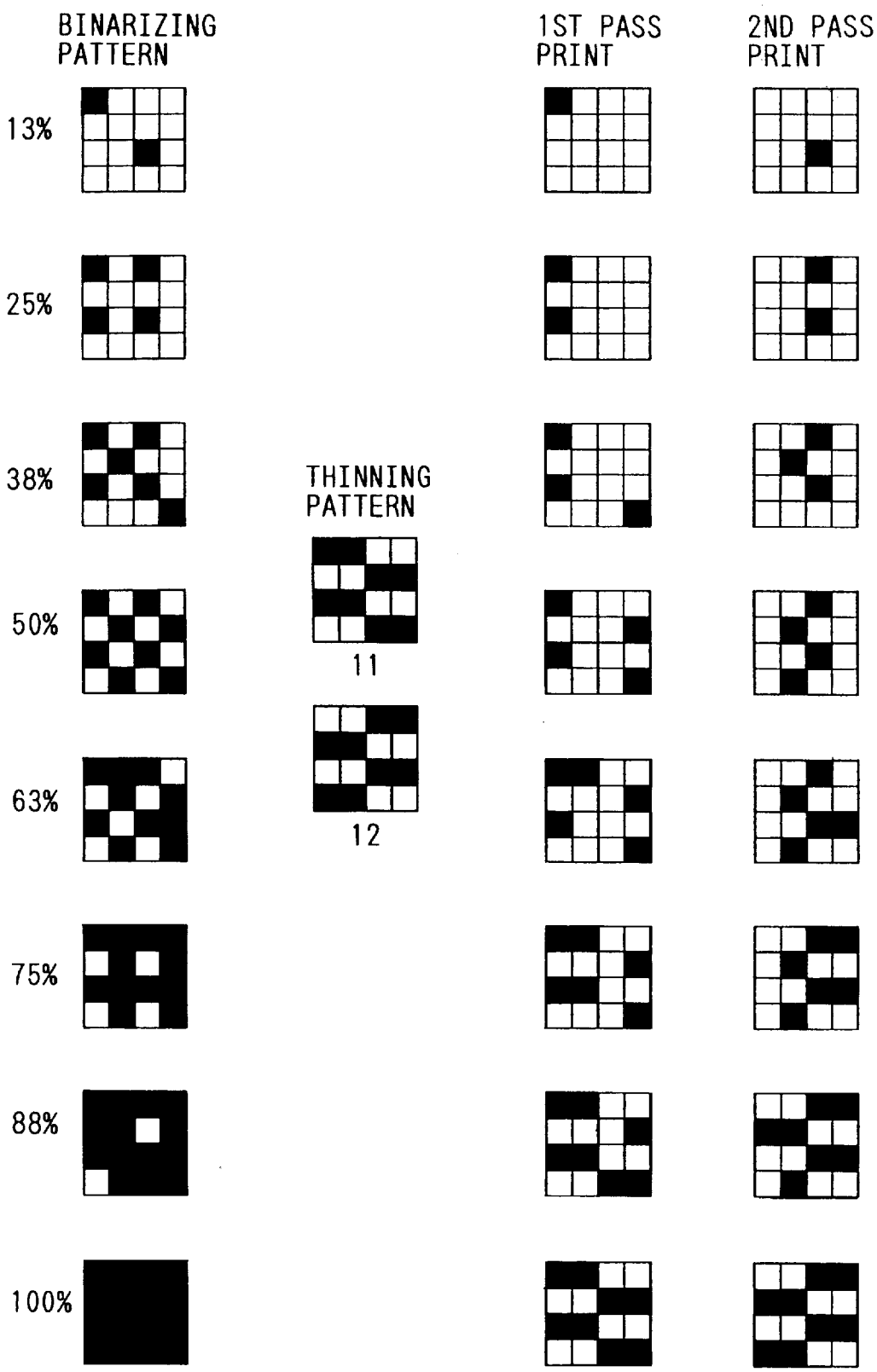
FIG. 3 is a view showing thinning patterns and printed patterns obtained in individual passes according to the first embodiment.
Figure 4:
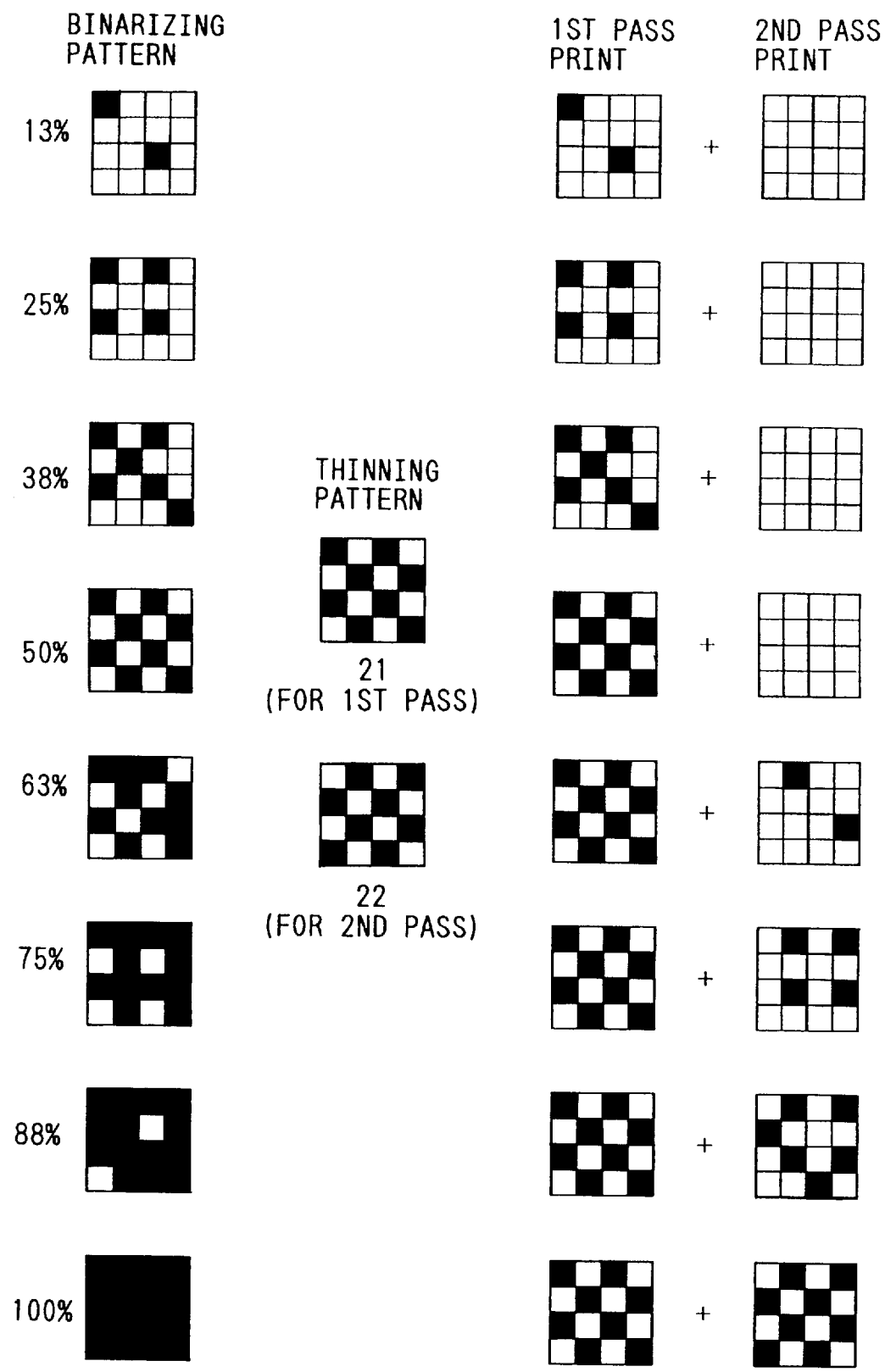
FIG. 4 is a view showing printed patterns obtained using checker and reverse checker thinning patterns.

FIG. 3 best illustrates the present invention, in which the results of thinning printing performed using thinning patterns (11 and 12) as the characteristic features of this embodiment are illustrated. According to FIG. 4, as described above, data with a print duty of up to 50% is completely printed in the first pass, and printing in the second pass is not performed unless the duty of data exceeds 50%. This embodiment, on the other hand, uses masks having the complementary thinning patterns 11 and 12 in which dot units each consisting of two dots continuous in the horizontal direction are arranged to form checker and reverse checker patterns, respectively. The use of these masks makes it possible to print equal numbers of dots in the first and second passes from low to high duties even when array patterns according to the dither method are used.

The method of eliminating a density variation caused by nozzle variations according to the above conventional example cannot accomplish its effect unless different nozzle groups are used to perform printing in the first and second passes such that substantially the same numbers of dots are implanted by these different nozzle groups.

In addition, a color variation which occurs especially in a color-mixed condition in the above conventional example is caused by this difference between the number of dots in the first and second passes. For these reasons, it is apparent that the masks of this embodiment in which substantially equal numbers of dots are printed in the first and second passes are more effective at each and every duty than the masks 21 and 22 shown in FIG. 4.

As described above, an array pattern of the Bayer type which is one of the most general dither methods is subjected to thinning printing using masks (thinning patterns), such as the masks 11 and 12 described above, which are not synchronized with the array upon area gradation at the same duty. In this case, the thinning printing is performed at the same position using different nozzle groups. As a result, a high-quality image free from a density variation can be obtained at each and every duty.

(2nd Embodiment)

In the second embodiment, the dither patterns used in the first embodiment are printed through four passes. In this case, printing in a single area is completed through four scan operations using four groups of nozzles. Therefore, paper feed is also performed by the length of a pixel unit which is ¼ the number n of the multi-nozzles, and four types of thinning pattern masks each of which allows 25% of printing are required. Suppose, for example, 25%-duty masks ①, ②, ③, and ④ are used as thinning patterns. Head driving and paper feed in this case will be described below with reference to FIG. 5.

Figure 5:
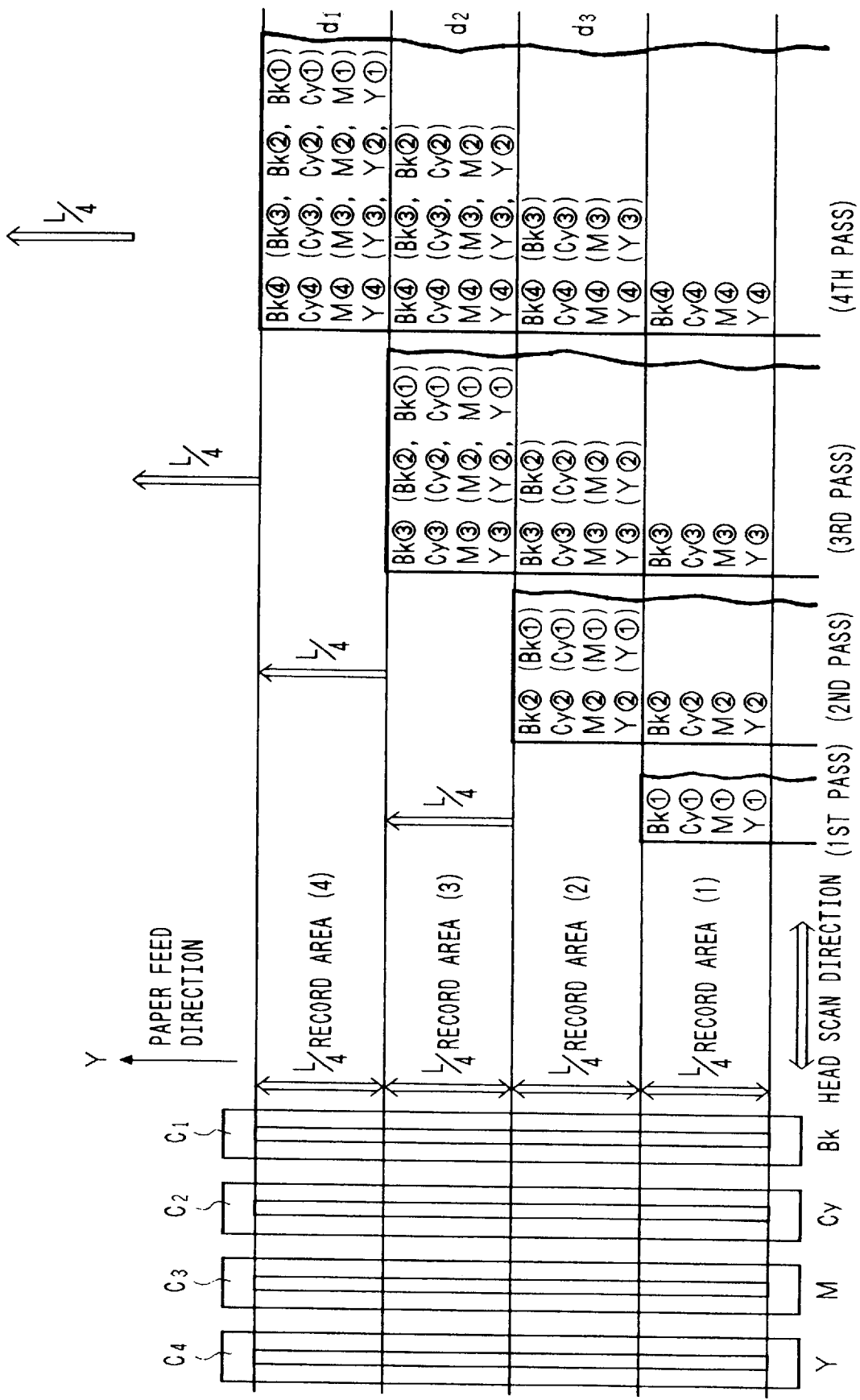
FIG. 5 is a view showing heads and record areas of four-pass printing according to the second embodiment of the present invention.

Referring to FIG. 5, the ordinate indicates arrays of n multi-nozzles and corresponding addresses on a paper surface, and the abscissa indicates the respective print timings of the passes. Heads C1 to C4 correspond to four colors black (Bk), cyan (Cy), magenta (X), and yellow (Y), respectively. Information given in each print area on the paper surface indicates the numbers ① to ④ of the masks used in printing in that area in a given pass and the history of printing (given in parentheses) obtained before that pass. Paper is fed in the Y direction in units of n/4 pixels (L/4) sequentially in the first pass, the second pass, and so forth.

According to this method, in an area d1 having a length L/4 on the paper surface, for example, the four colors Bk, Cy, M, and Y are printed using different portions, i.e., different nozzle groups of the individual heads using the masks ①, ②, ③, and ④ in this order in the first, second, third, and fourth passes, respectively. The print masks are used in an order of ②, ③, ④, and ① in the subsequent print area d2, an order of ③, ④, ①, and ② in the next area d3, and so forth. The order of the print masks in one area is thus different from that in another.

If, therefore, printing is performed by recording substantially the same numbers of dots throughout the first to fourth passes, variations in the nozzles are reduced most to realize a high-quality image free from a color variation.

Figure 6:
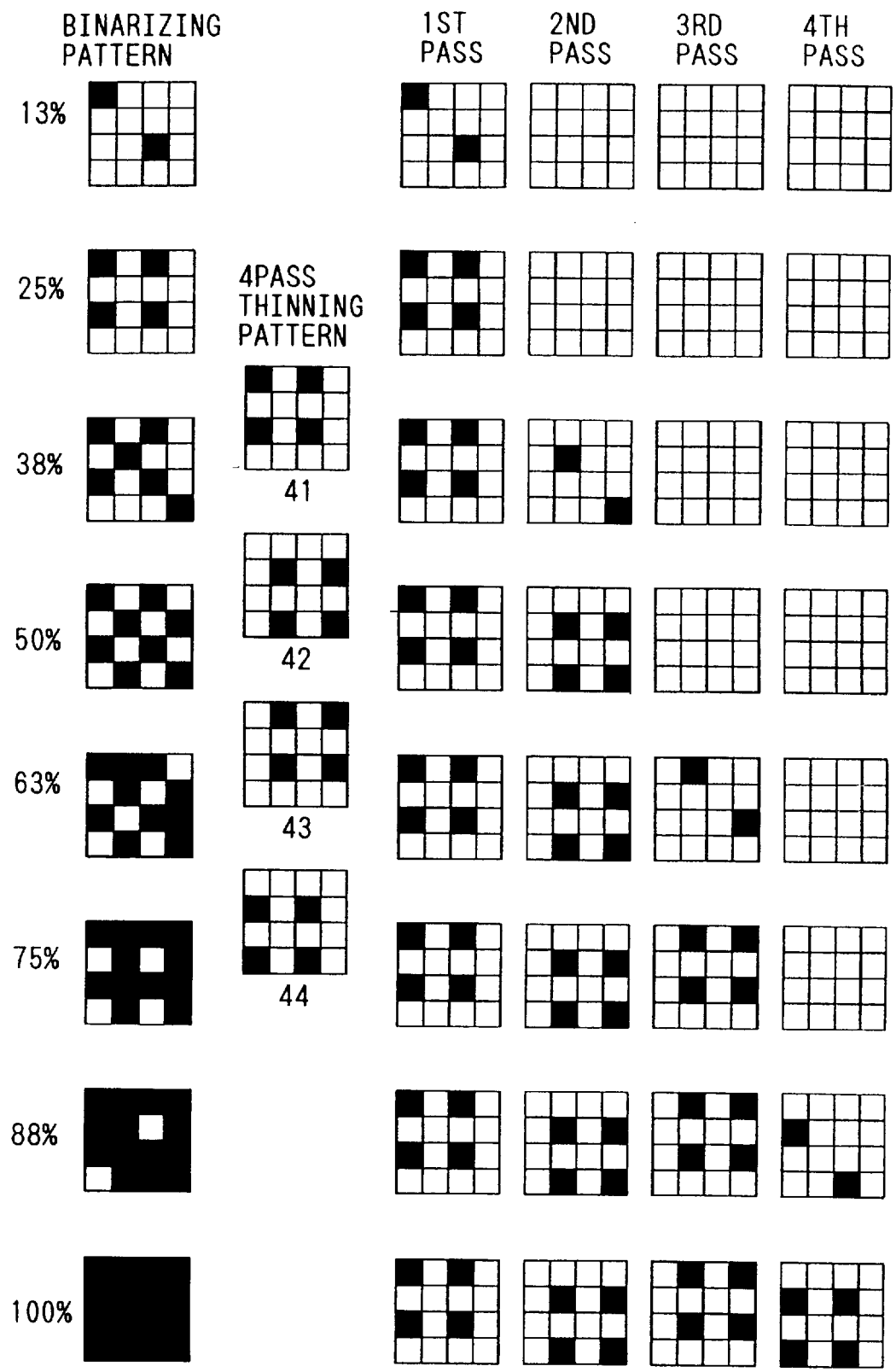
FIG. 6 is a view showing a divisional recording method for explaining the second embodiment.
Figure 7:
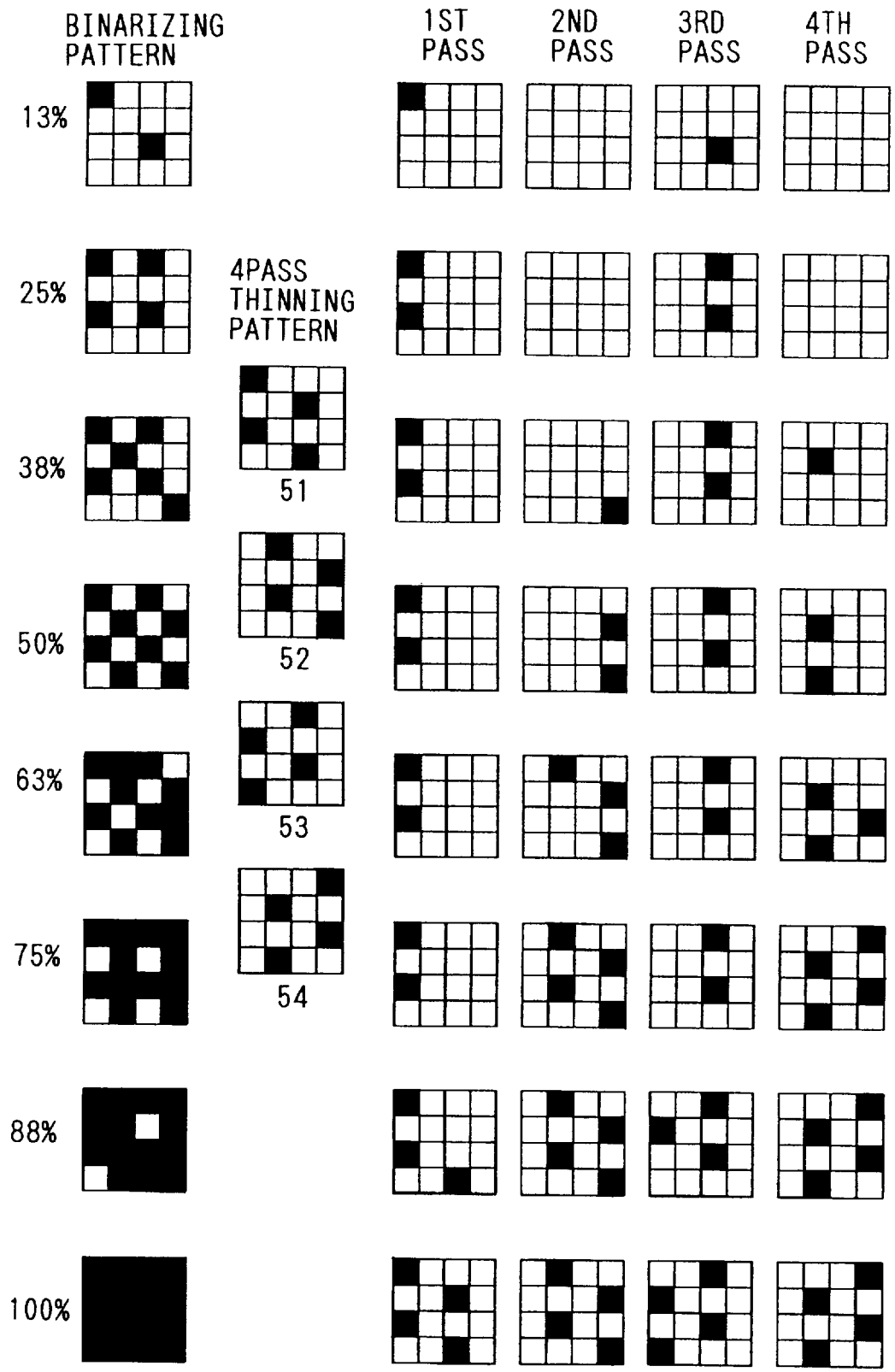
FIG. 7 is a view showing thinning patterns and printed patterns obtained in individual passes according to the second embodiment.
Figure 8:
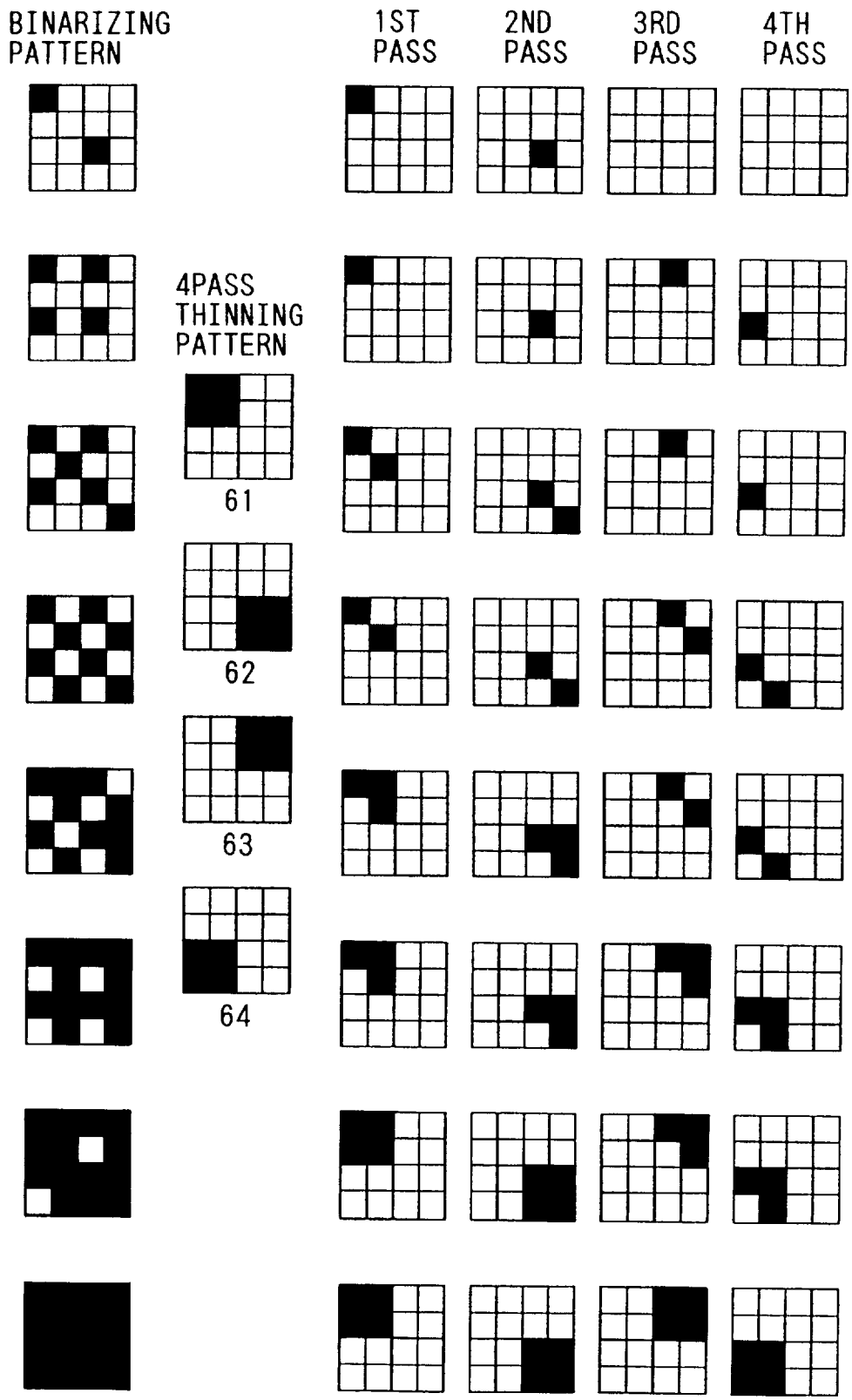
FIG. 8 is a view showing the thinning patterns and the printed patterns obtained in the individual passes shown in FIG. 7.

FIGS. 6 to 8 illustrate possible four-pass thinning patterns, and the printing results of the binarizing data of various duties described above at the time the data are masked by these thinning patterns. FIG. 6 illustrates the results of four-pass printing using masks 41 to 44, in which considerable differences are present between the numbers of printed dots in the individual passes. In FIG. 7, the differences are largely reduced by the use of masks 51 to 54. FIG. 8 illustrates the results of four-pass printing using masks 61 to 64 each constituted by unit groups of 2×2 pixels, in which case the differences are reduced most when a 4×4 matrix is used. As described above, therefore, the method shown in FIG. 8 having the most remarkable thinning effect is most effective in order to compensate for the density variations in the individual nozzles. The method of FIG. 8, however, has a high possibility that adjacent dots are simultaneously printed, and this may introduce a problem, in particular, of a blur in the resulting image. In such a case, the method of FIG. 7 in which dots are not printed in adjacent positions in a single pass may be more suitable although the method more or less produces differences between the numbers of dots.

As described above, this embodiment uses the four types of masks each having a print duty of 25%, such as those shown in FIGS. 6 and 7, which are not synchronized with an image data array having the same print duty of 25% and of the Bayer type as one of the most general dither methods. As a result, it is possible to obtain a high-quality image free from a density variation or a color variation as described in the above conventional example.

(3rd Embodiment)

Figure 9:
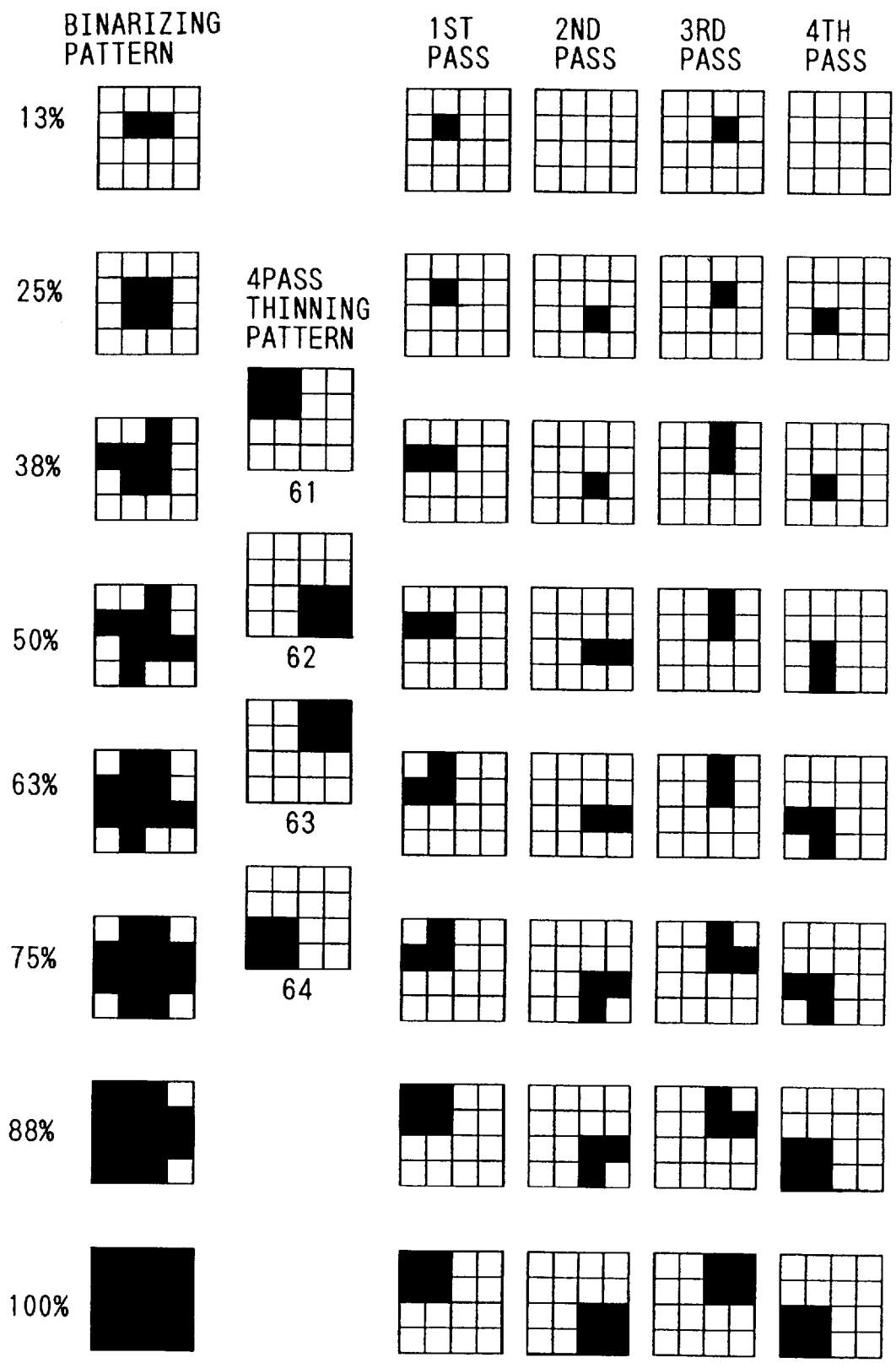
FIG. 9 is a view showing thinning patterns and printed patterns obtained in individual passes according to the third embodiment of the present invention.
Figure 10:
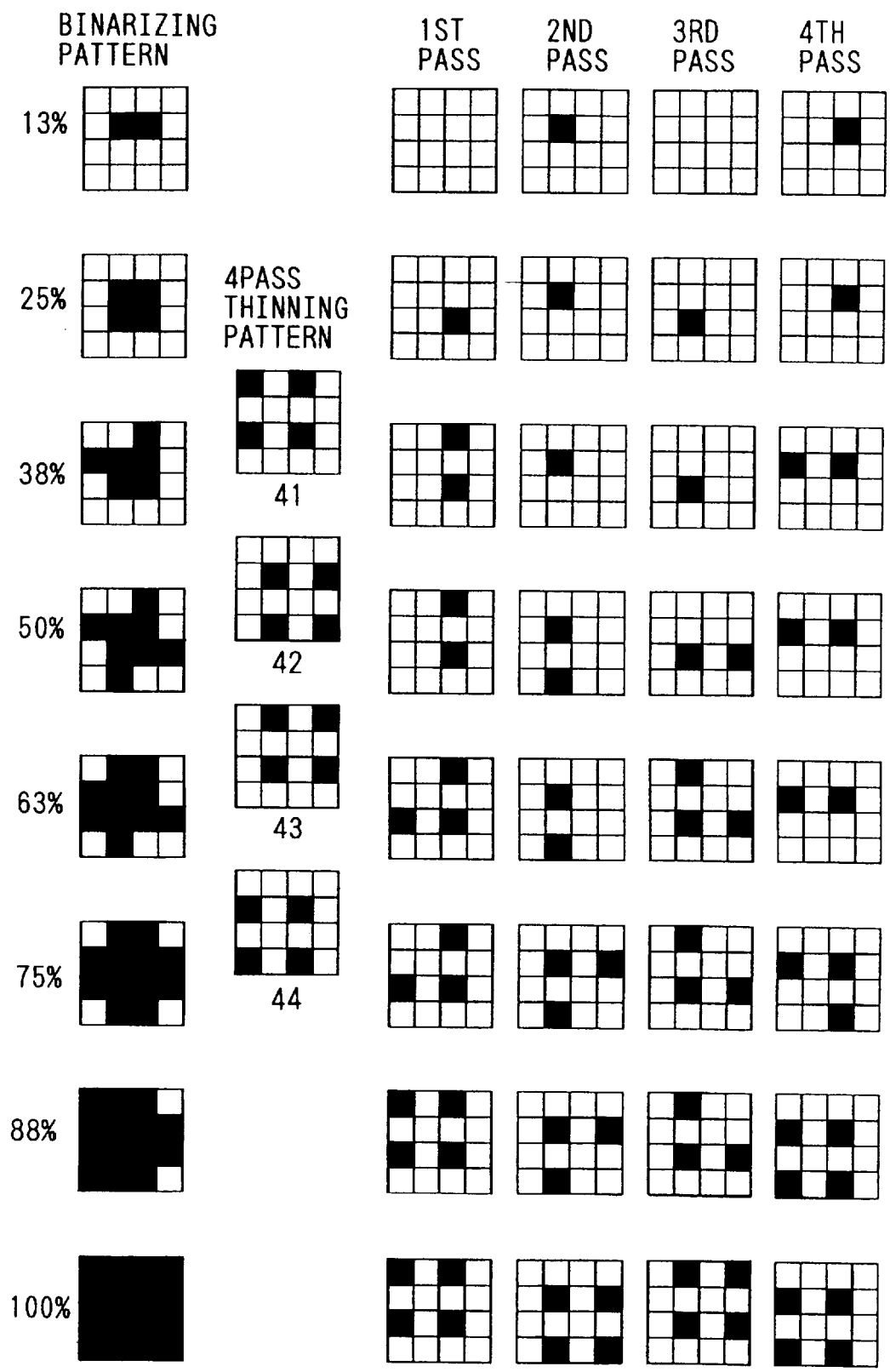
FIG. 10 is a view showing the thinning patterns and the printed patterns obtained in the individual passes shown in FIG. 9.

The third embodiment of the present invention will be described below with reference to FIGS. 9 to 11. Image data array patterns used in this embodiment are of a so-called fattening type according to the same dither method but are different from those of the above first and second embodiments. Patterns of this type at the respective duties are as shown in FIGS. 9 and 10, which are largely different from those of the Bayer type used in the above embodiments. Assume that the same four-pass printing as in the second embodiment is performed for the data arranged in this manner. In this case, as shown in FIG. 9, when the masks 61, 62, 63, and 64 which are the best in the second embodiment are used, dots are equally printed in the four passes as in the second embodiment. However, the use of the masks 41, 42, 43, and 44 which cause considerable differences between the numbers of printed dots in the second embodiment also realizes printing of equal numbers of dots throughout the first to fourth passes (FIG. 10).

It can be assumed, therefore, that in the area gradation patterns of the dither method according to this embodiment, the numbers of printed dots are substantially the same in the respective passes regardless of whether the masks shown in FIGS. 9 and 10 are used.

In simultaneous printing of four color inks or printing on plain paper which easily causes blur, however, it is preferred to print dots at positions located as remote as possible in one eject operation. Therefore, when these factors are taken into account, the printing method using the masks 41 to 44 shown in FIG. 10 is considered more preferable than that using the masks 61 to 64 shown in FIG. 9.

Although a mask constituted by a 4×4 dot matrix has been described as the masks of the present invention, such as the masks 41 to 44, this is equivalent to a mask in which 2×2 dot matrixes 181 to 184 are arranged in the row (horizontal) and column (vertical) directions as shown in FIG. 11.

In this case, therefore, a printer need only be equipped with masks having the size which is ¼ the size of the above masks, and this leads to a reduction in a cost of the printer itself and a reduction in the print time.

In this embodiment, the two types of mask patterns 61 to 64 and 181 to 184 are provided in correspondence with the two types of area gradation patterns according to the dither method, i.e., the Bayer type described in the second embodiment and the fattening type described above in this third embodiment. These mask patterns are selected by a user by operating keys provided on the console. Therefore, the user can selectively use these mask patterns in accordance with binarizing patterns supplied to a printer, thereby constantly obtaining high-quality images.

As described above, this embodiment provides the mask patterns 61 to 64 and 181 to 184 each having a print duty of 25% and not synchronized with a dot array of the Bayer type area gradation patterns which are the most general patterns of the dither method and the fattening type area gradation patterns, at the same print duty of 25%. As a result, it is possible to obtain a high-quality image free from a density variation or a color variation described in the above conventional example.

(4th Embodiment)

Still another embodiment of the present invention will be described below. In each of the above embodiments, thinning mask patterns having the same array pattern are used for a plurality of record areas in each scan operation. In this embodiment, however, mask patterns having different array patterns are used for a plurality of record areas in each scan operation such that an order of implantation of inks is constantly the same in each record area, thereby preventing changes in a tone of color between the individual record areas.

Figure 12:
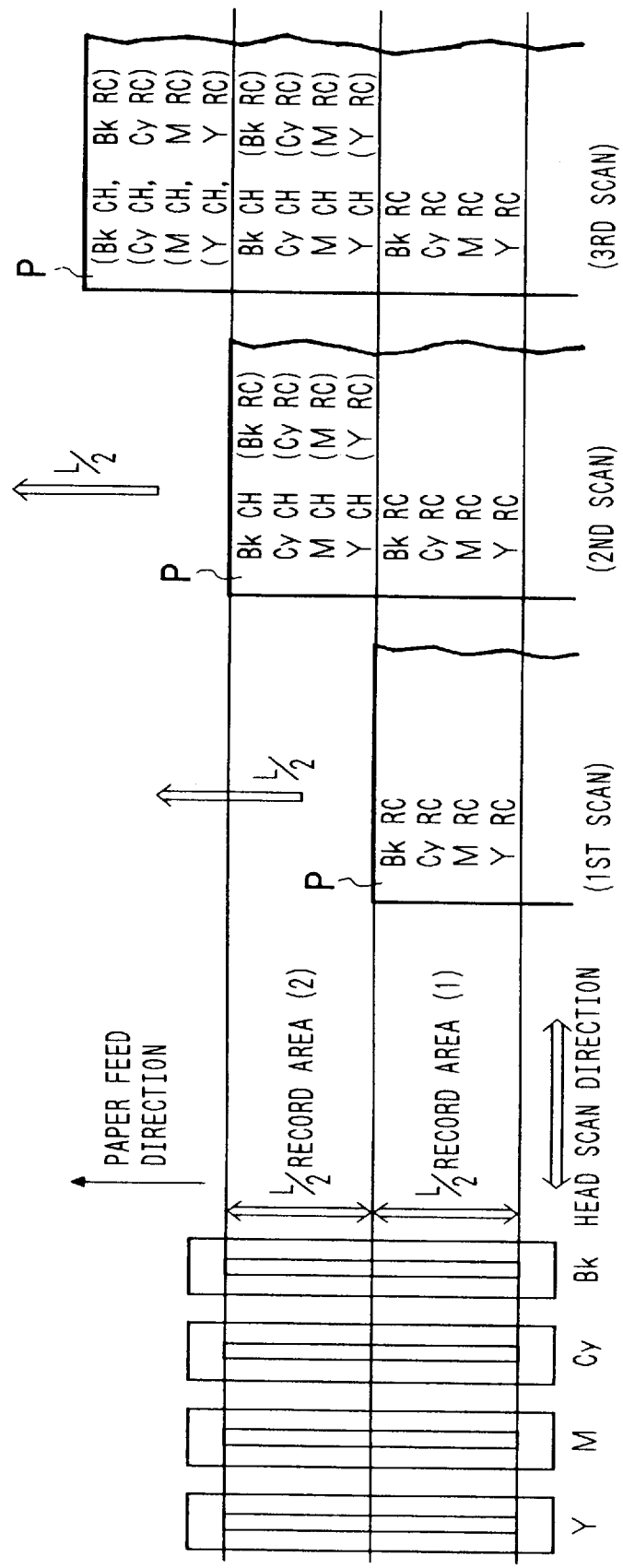
FIG. 12 is a schematic view for explaining a recording method according to the fourth embodiment of the present invention.

FIG. 12 shows in detail a recording control method according to the fourth embodiment. In the first scan, nozzles in a record area (1) of each recording head are used to perform printing of image data thinned out by half in a checker pattern. Paper feed is performed by a length of L/2. In the second scan, checker pattern printing is performed as in the first scan by the record area (1) of each recording head, while the image to be recorded is thinned out by half in a reverse checker pattern and printed by a record area (2). As a result, printing is completed in a portion corresponding to the record area (2). The L/2-long paper feed is performed again. In the third scan, as in the second scan, the record area (1) performs printing by thinning out the data in the checker pattern, and the record area (2) performs printing by thinning out the data in the reverse checker pattern, thereby completing printing in a portion corresponding to the record area (2), and so forth. In this manner, printing is repeatedly performed. Referring to FIG. 12, the contents given in parentheses in the second and third scan operations indicate dot patterns printed in the past. As a result, no color variation occurs because the ink implantation order is constantly the same.

Figure 73:
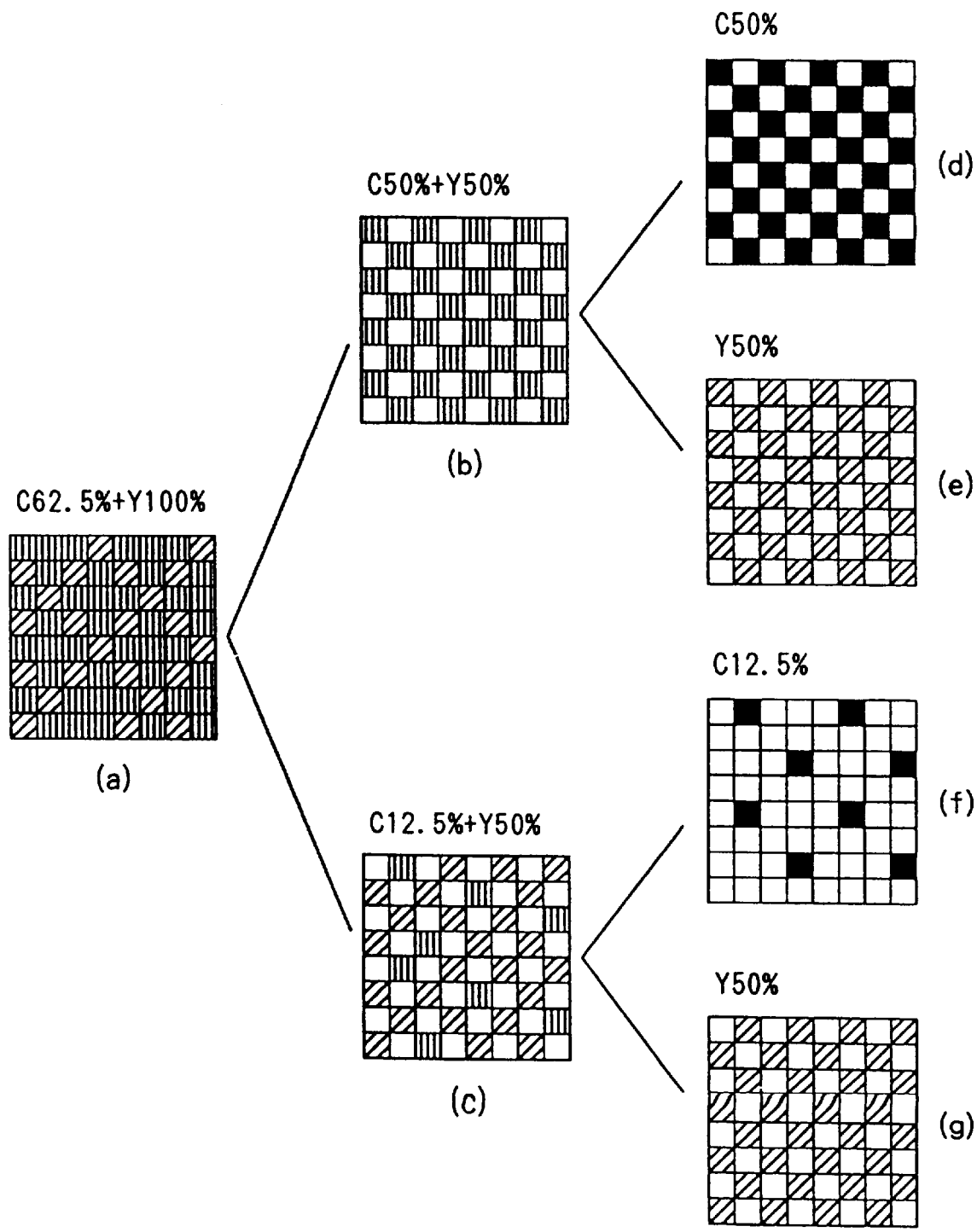
FIG. 73 is a view showing intermediate color image data.
Figure 74:
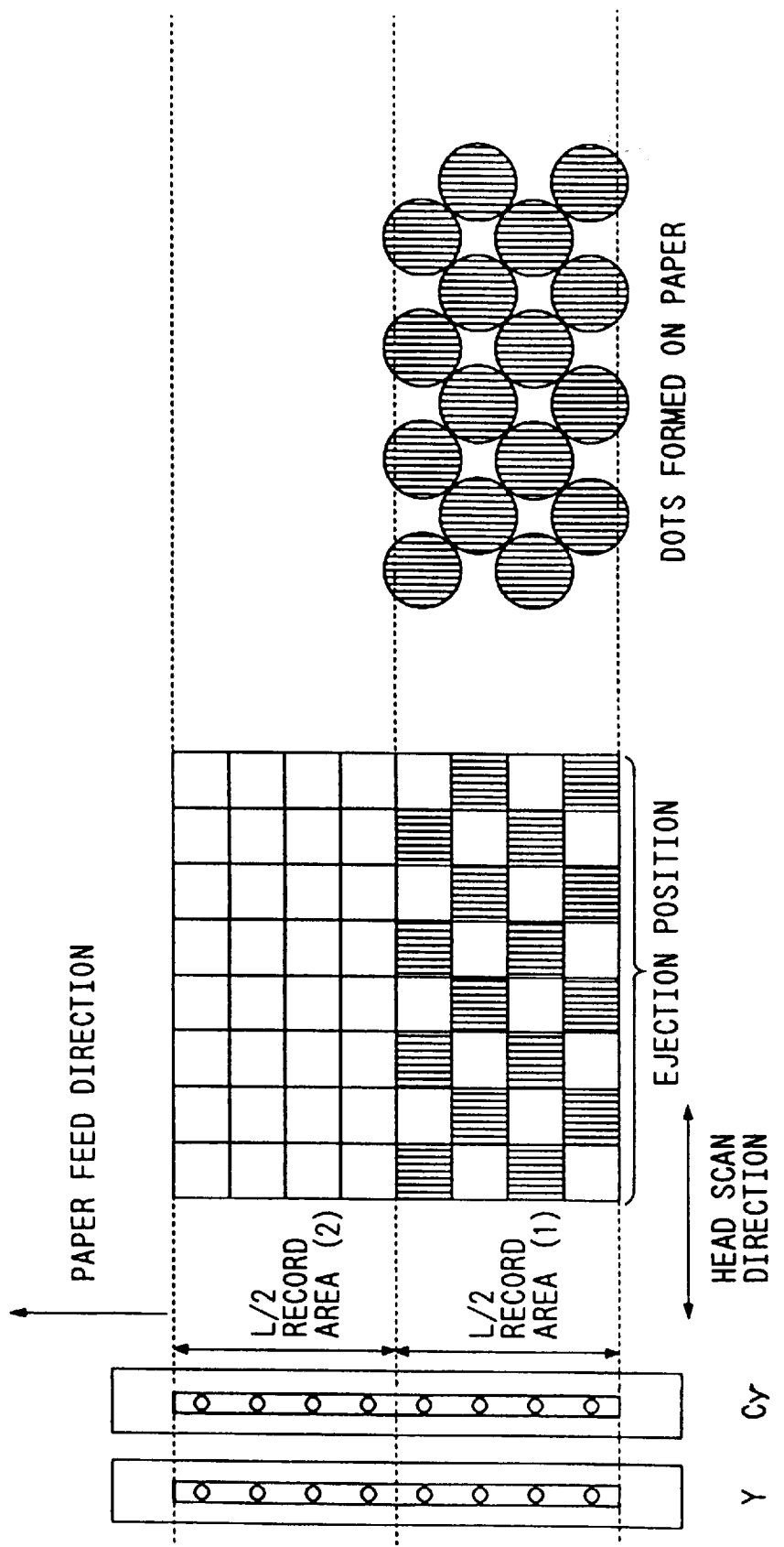
FIG. 74 is a view showing dots formed in the first pass according to a conventional example.
Figure 75:
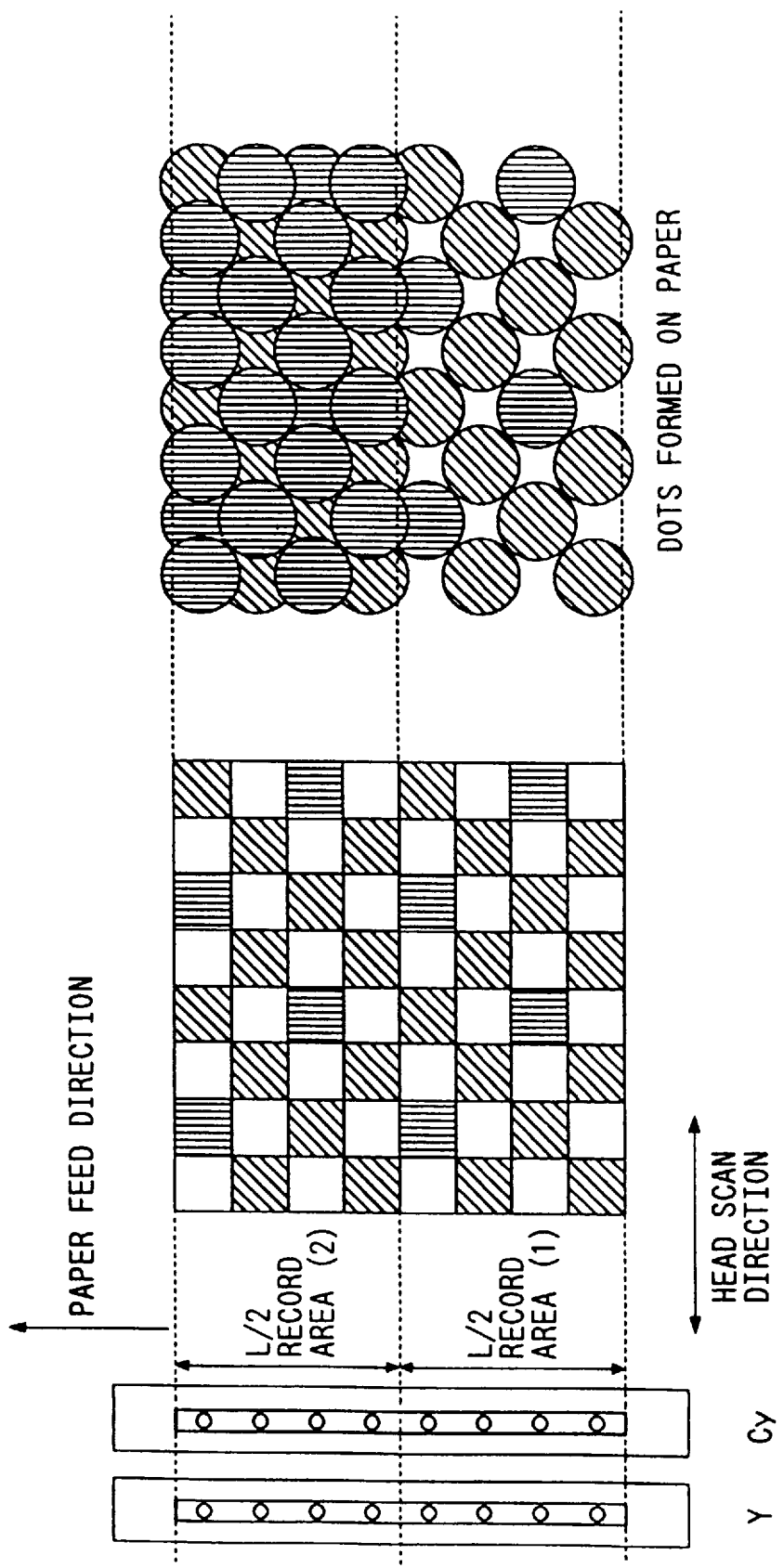
FIG. 75 is a view showing dots formed in the second pass of the conventional example.
Figure 76:
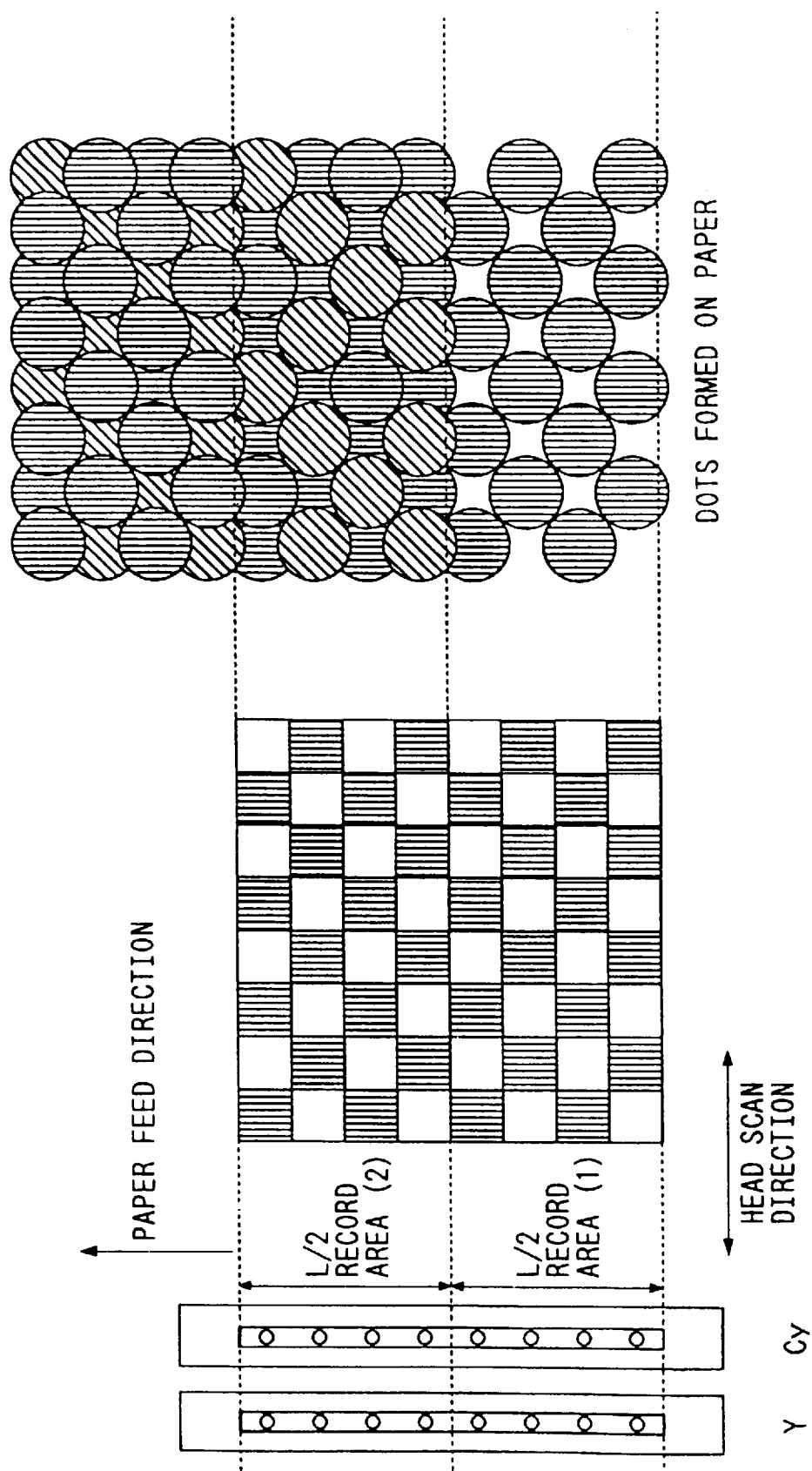
FIG. 76 is a view showing dots formed in the third pass according to the conventional example.
Figure 77:
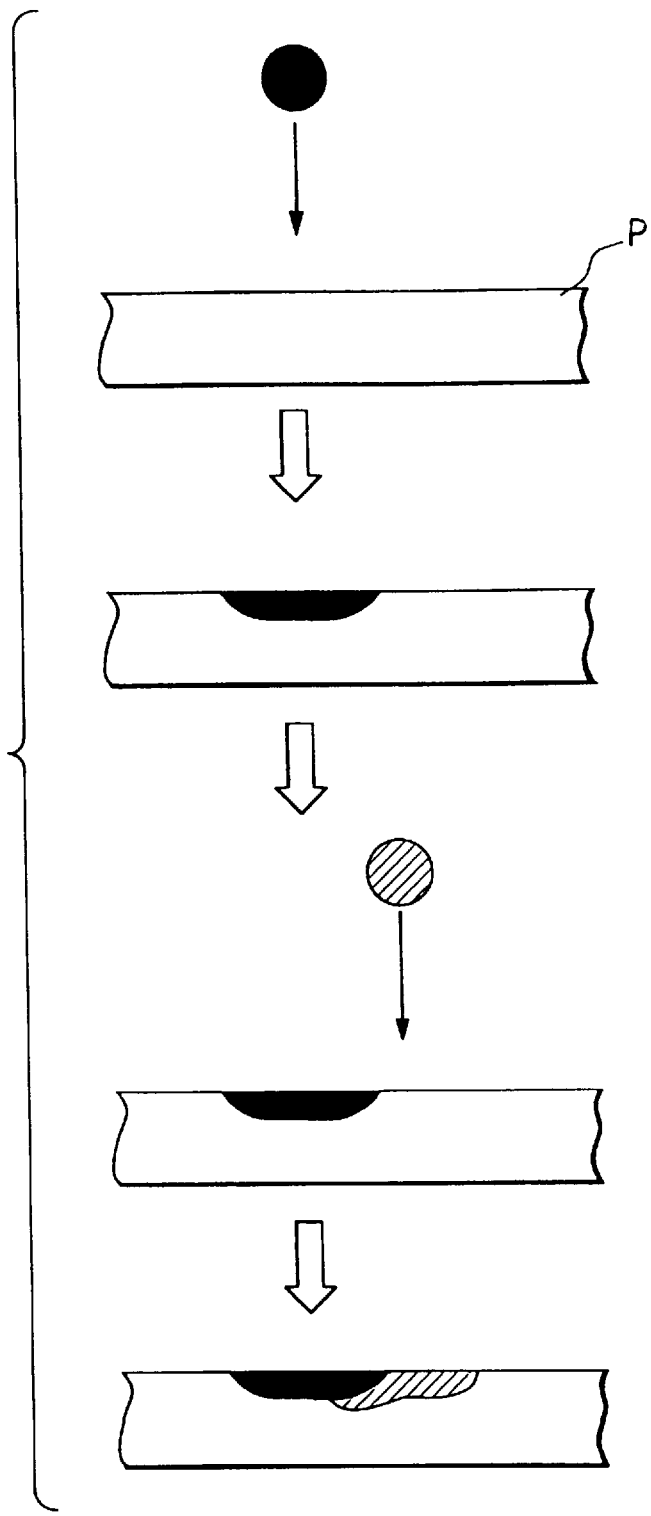
FIG. 77 is a view for explaining overlap of dots on a recording medium.

The reason why no intermediate color variation occurs in this embodiment will now be described in more detail below by taking printing using eight-nozzle multi-heads as an example. In this case, assume that solid printing of an intermediate color (yellowish green) overlapped at print duties of Cy 62.5% and Y 100% as shown in FIG. 73A is performed as an image to be recorded as in the conventional example.

Figure 13:
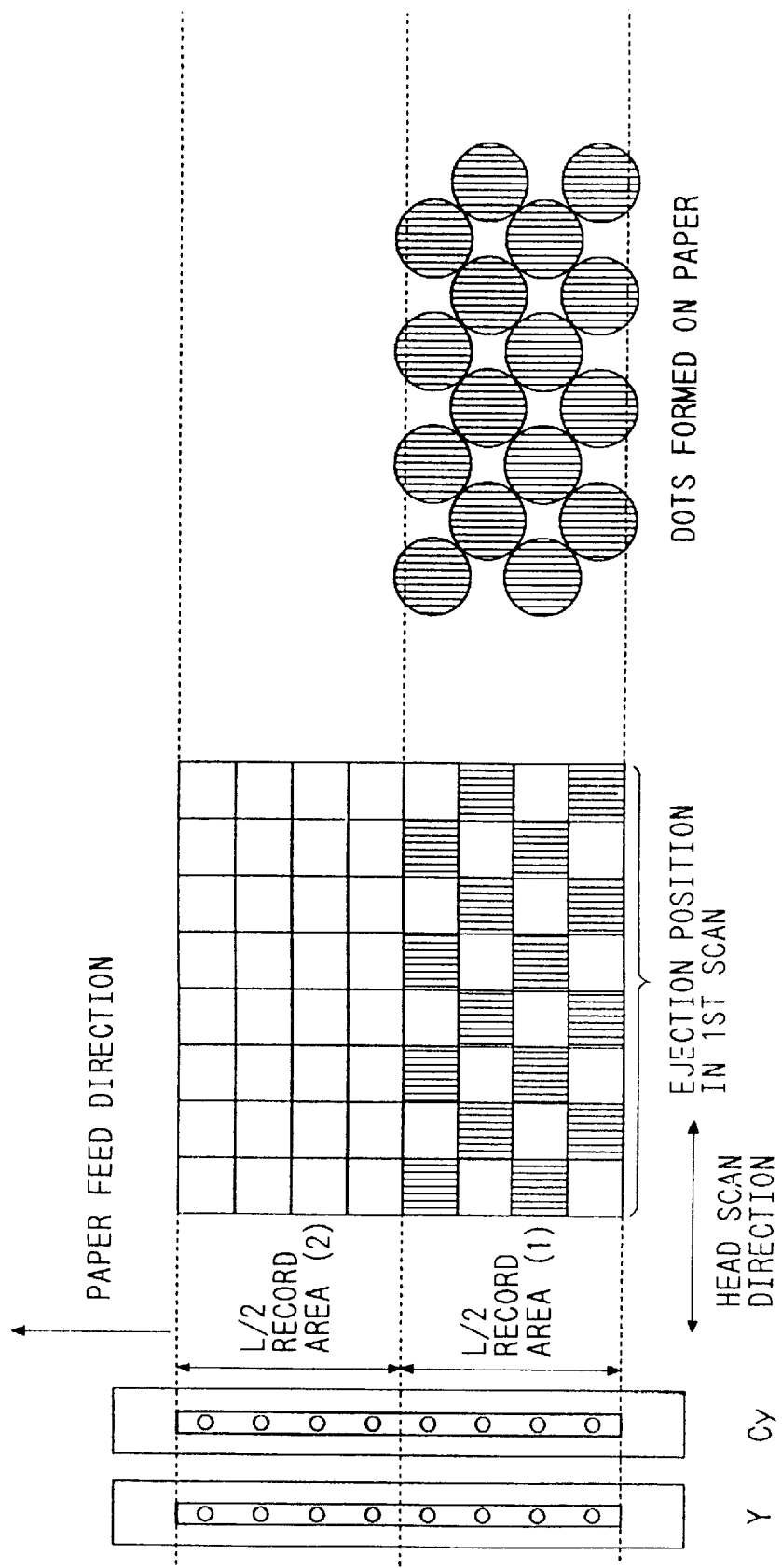
FIG. 13 is a schematic view showing an ejection position in the first scan and the resulting dots formed on paper according to the fourth embodiment.

FIG. 13 schematically illustrates an ejection position of a Cy recording head and a Y recording head in the first scan according to an L/2-paper feed printing method of this embodiment, and the resulting dots formed on a recording medium, in which vertical stripe patterns indicate pixels where both the Cy and Y recording heads perform recording. In the first scan, each recording head ejects an ink in a checker pattern by using four nozzles in its record area (1). As a result, dots in each of which Cy and Y overlap each other are formed in a checker pattern on a recording medium. Subsequently, paper feed is performed by a length of L/2 to move the dots recorded in the first scan toward a record area (2). There is so far no difference between this embodiment and the above conventional example.

Figure 14:
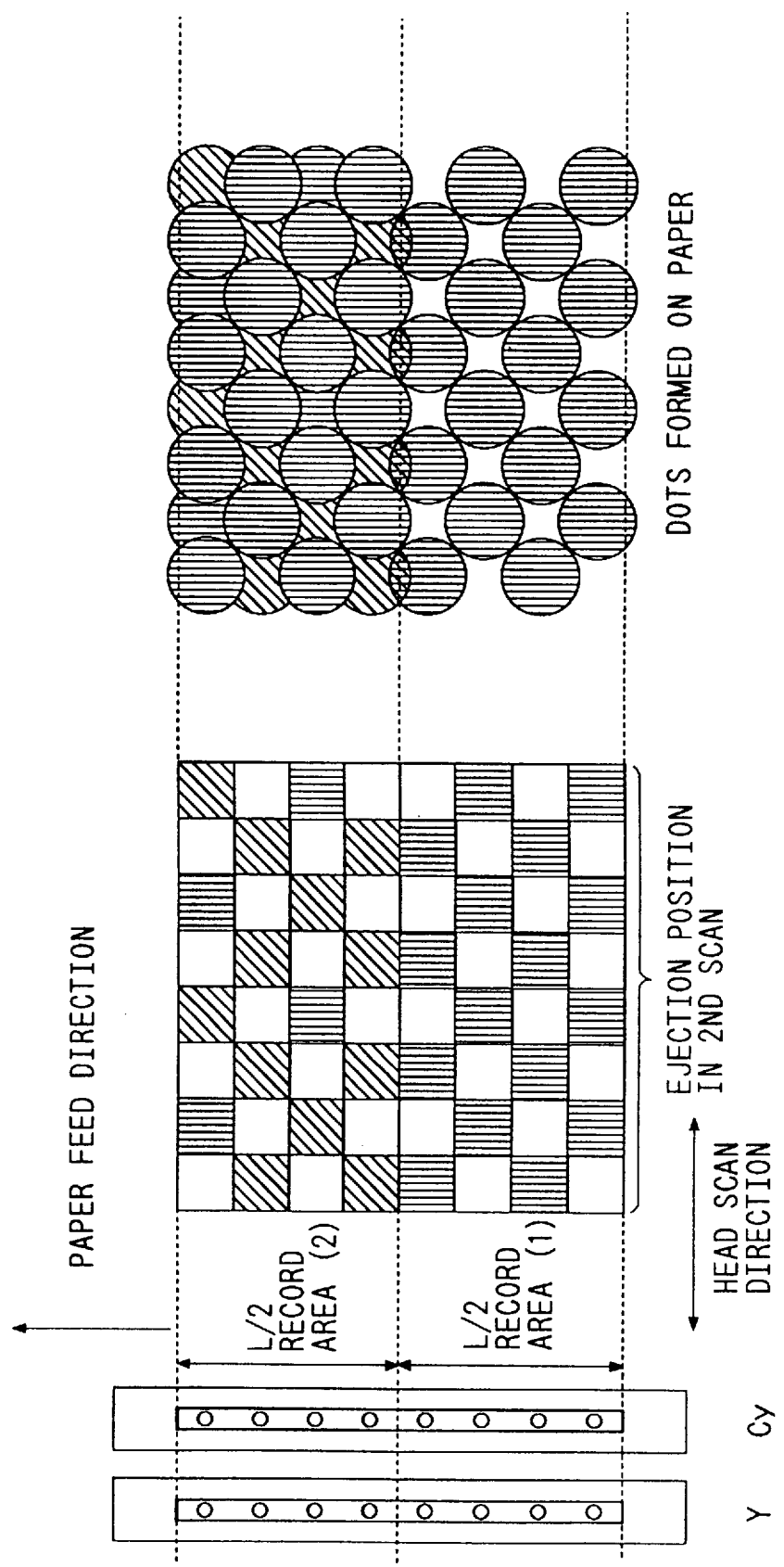
FIG. 14 is a schematic view showing an ejection position in the second scan and the resulting dots formed on paper according to the fourth embodiment.

FIG. 14 schematically illustrates an ejection position in the second scan and the resulting dots formed on the recording medium. Vertical stripe patterns indicate pixels where both the Cy and Y recording heads perform recording, and oblique stripe patterns indicate pixels where only the Y head performs recording.

In the second scan, the record area (1) performs the checker pattern printing as in the first scan, but the record area (2) performs printing in a reverse checker pattern unlike in a portion corresponding to the record area (1).

As a result, the reverse-checker-pattern dots overlap the checker-pattern dots recorded in the first scan in a portion corresponding to the record area (2), and recording in this portion is completed. Subsequently, the L/2-long paper feed is performed again to move the portion corresponding to the record area (2) outside the record area and the portion corresponding to the record area (1) toward the record area (2).

Figure 15:
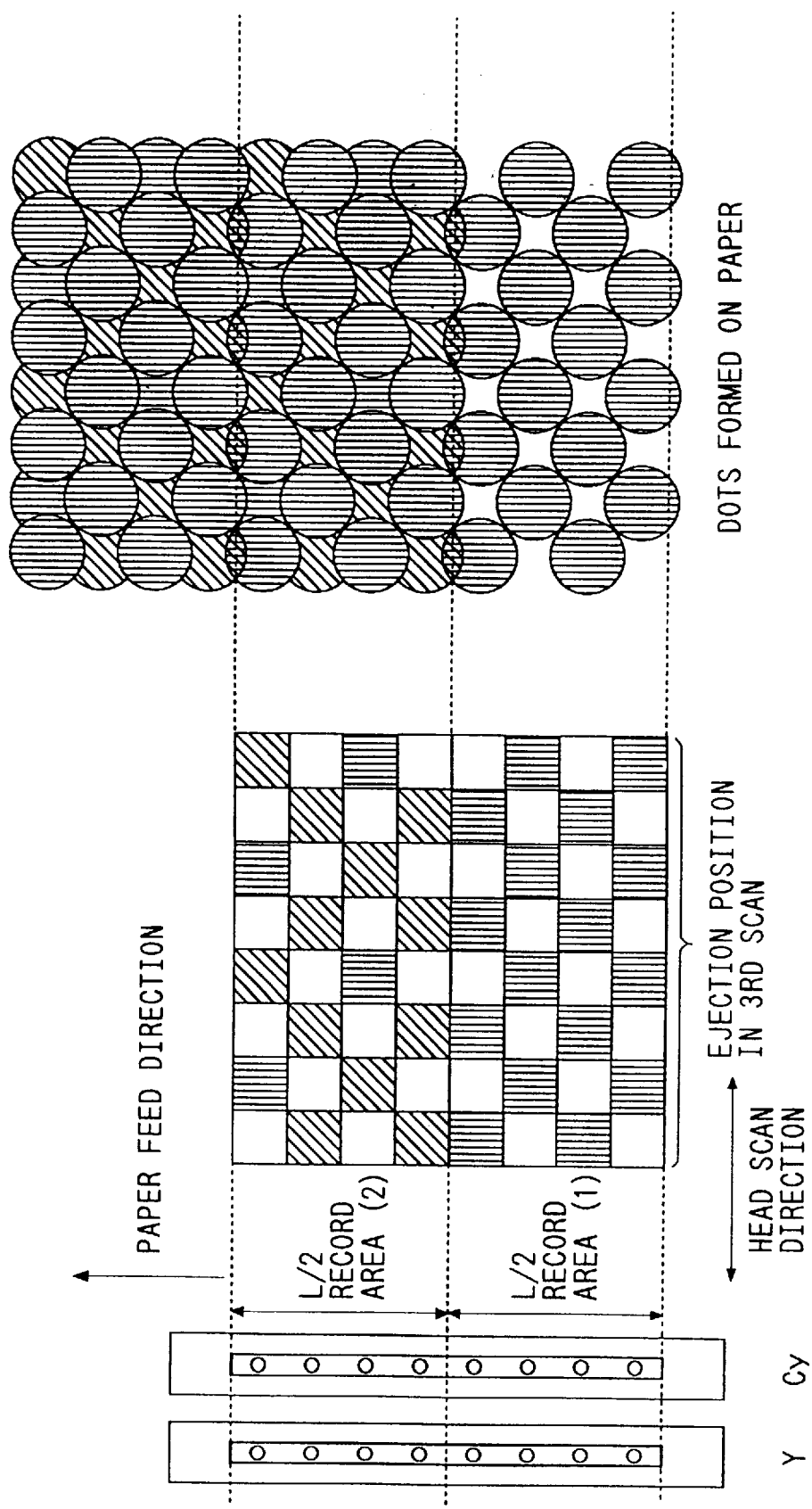
FIG. 15 is a schematic view showing an ejection position in the third scan and the resulting dots formed on paper according to the fourth embodiment.

It should be noted that when dots are printed to overlap other dots recorded previously, the dots printed later soak deeper in the direction of the thickness of paper than those recorded previously at their overlap portions. Therefore, FIG. 14 illustrates the print result such that the dots recorded in the second scan overlap the dots recorded in the first scan from the below. FIG. 15 schematically shows an ejection position in the third scan and the resulting dots formed on the recording medium. In the third scan, the record area (1) performs checker-pattern printing while the record area (2) performs reverse-checker-pattern printing as in the second scan.

As a result, the reverse-checker-pattern dots overlap the checker-pattern dots recorded in the second scan in a portion corresponding to the record area (2), so recording in this portion is completed. Therefore, the reverse checker pattern is implanted after implantation of the checker pattern in both of the portion currently corresponding to the record area (2) and the portion moved outside the record area, in which printing is completed in the second scan. As a result, a uniform tone of color is obtained in these portions, so no color variation occurs.

This not only achieves the characteristic feature of L/n-paper feed printing in that a density variation caused by a low landing precision, such as a paper feed error, or by an unstable ejection quantity is reduced, but also prevents a color variation which regularly occurs when solid printing of an intermediate color formed by ejecting inks of different colors to properly overlap and adjoin each other is performed. As a result, high-quality color image recording can be realized.

Figure 16:
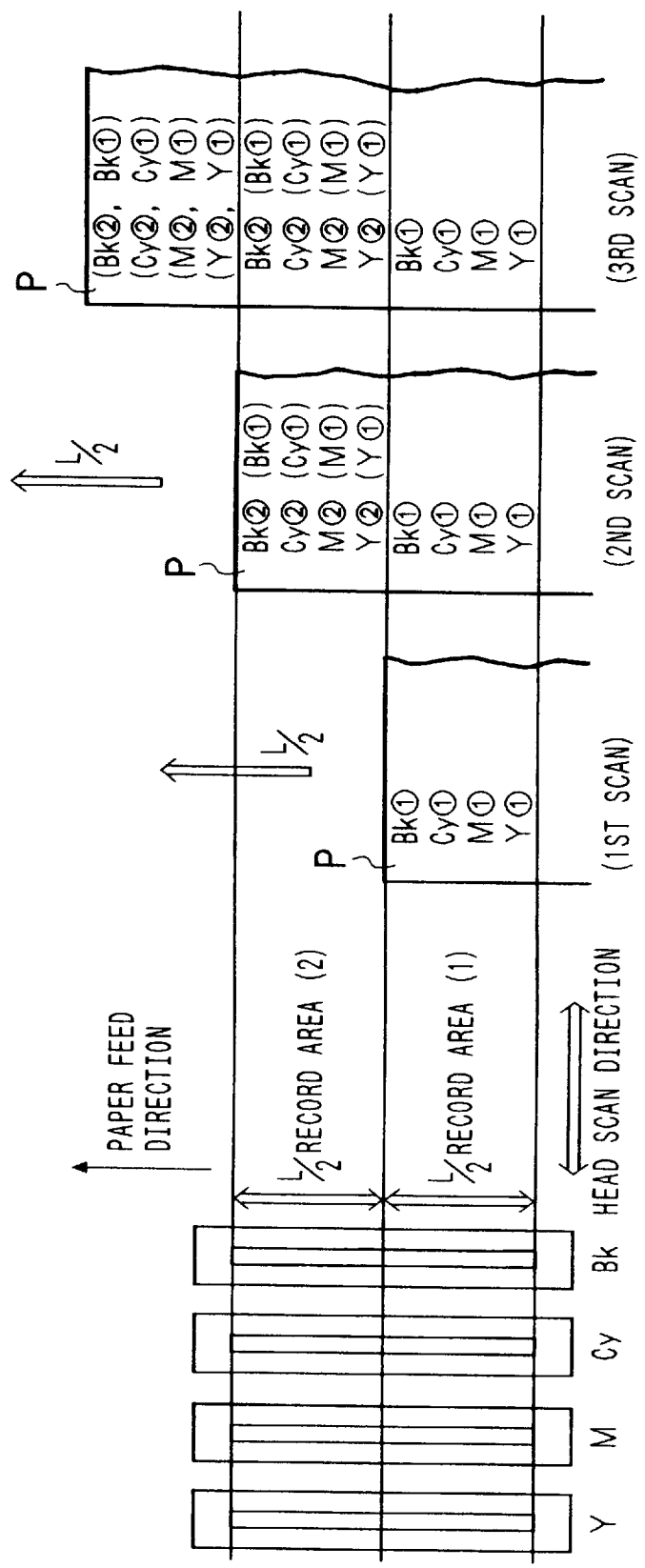
FIG. 16 is schematic view for supplementarily explaining the recording method according to the fourth embodiment of the present invention.

In this embodiment, data to be printed is thinned out into checker and reverse checker patterns such that it is fixedly printed into the checker pattern by the record area (1) and the reverse checker pattern by the record area (2). The thinning pattern, however, is not limited to this checker-like pattern. That is, as shown in FIG. 16, once a certain thinning pattern ① is fixed for the record area (1), printing is performed such that the record area (2) always performs recording by using a complementary thinning pattern ②, thereby completely printing an image to be recorded by the two record areas.

Figure 17:
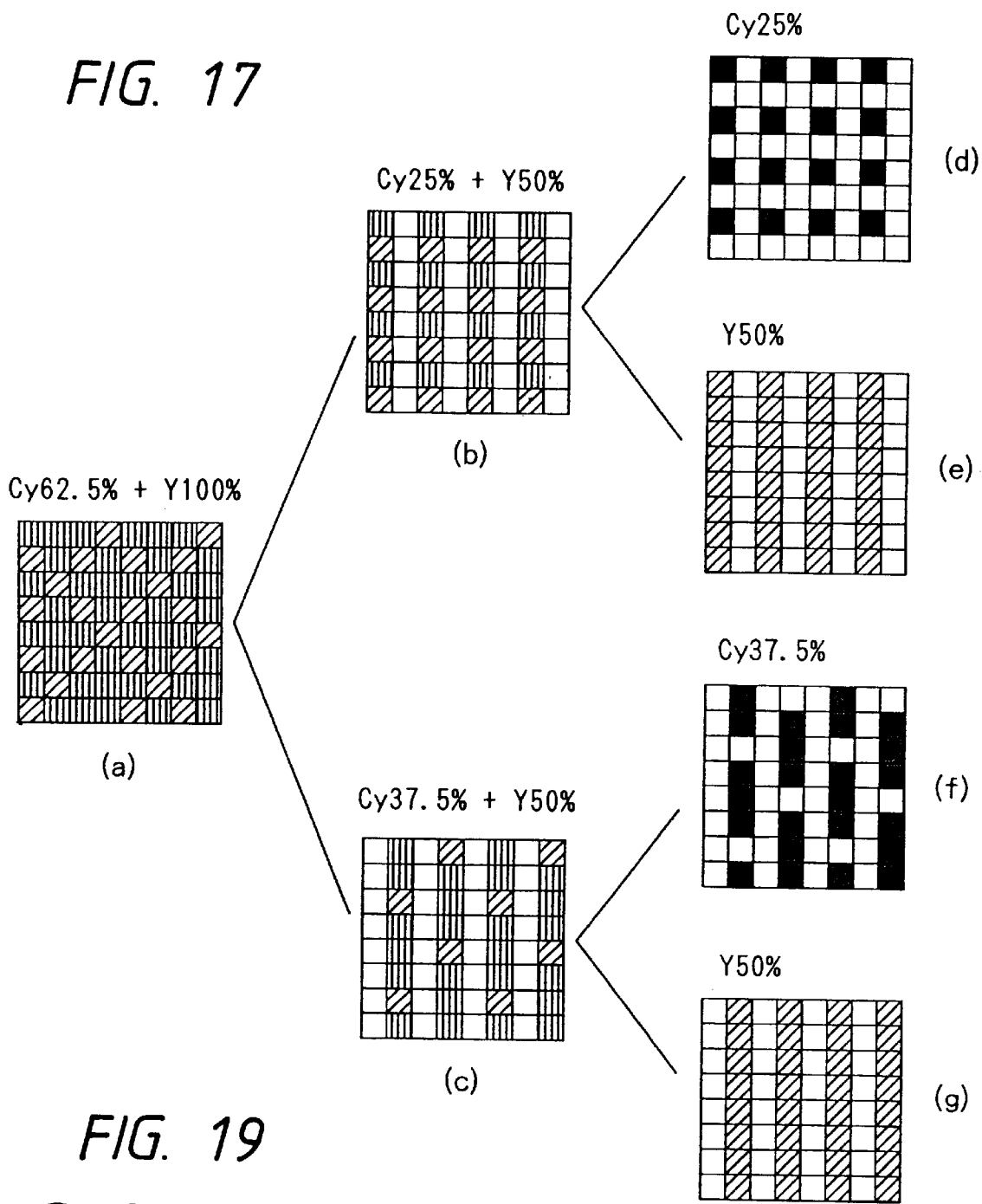
FIG. 17 is a view for explaining another thinning method.

FIG. 17 shows other thinning patterns. It is assumed that solid printing of an intermediate color (yellowish green) overlapped at print duties of Cy 62.5% and Y 100% as illustrated in (a) of FIG. 17 is performed as an image to be recorded as in the fourth embodiment. In this case, the intermediate color shown in (a) of FIG. 17 is thinned out as illustrated in (b) and (c) of FIG. 17, and these patterns are printed to overlap each other through two scan operations. Suppose the pattern (b) is called a thinning pattern ① and the pattern (c) is called a thinning pattern ② The recording heads eject inks as indicated by (d) and (e) in FIG. 17 to form the pattern (b), and as indicated by (f) and (g) in FIG. 17 to form the pattern (c). In this case, the thinning pattern ① is printed by the record area (1), and the thinning pattern ② is printed by the record area (2).

In the present invention, the thinning ratio is set to be 50% in each record area of each recording head so that an image to be recorded is completed through two scan operations. In situations where an improvement in the print density is required by increasing the implantation quantity, the thinning print ratio in each area may be increased to 75% so that 150% is obtained by two scan operations. On the other hand, in circumstances where an ink boundary blur need be eliminated by decreasing the implantation quantity, the thinning print ratio may be decreased to 40% so that an implantation quantity of 80% is obtained b y two scan operations.

(5th Embodiment)

Figure 18:
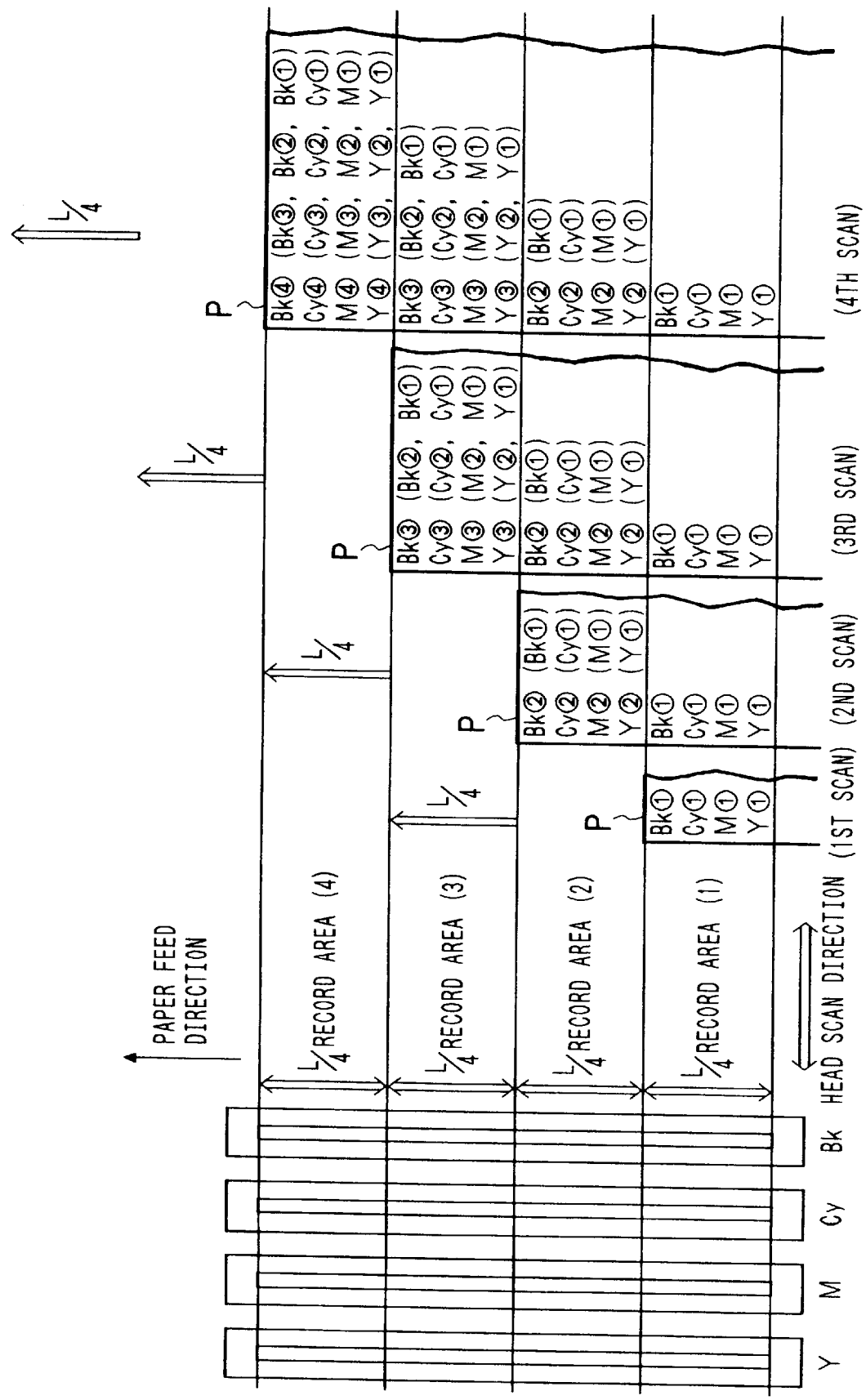
FIG. 18 is a view for explaining a thinning method according to the fifth embodiment of the present invention.

FIG. 18 shows a recording method according to the fifth embodiment of the present invention.

In this method, a record area L of each recording head is divided into four parts, so each recording head records a portion of data thinned out to be 25% in the first scan. Thereafter, paper feed is performed by a length of L/4, and another 25% data is printed by another nozzle group of each recording head in the second scan. The L/4-long paper feed is performed again, and another 25% data is printed in the third scan. Subsequently, the L/4-long paper feed is performed, and the last 25% data is printed in the fourth scan, t hereby completing the printing.

Referring to FIG. 18, eject orifice arrays which cannot be seen actually are illustrated as they are viewed from the above for convenience of explanation.

Figure 19:
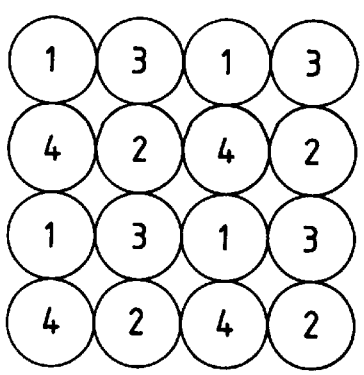
FIG. 19 is a schematic view for explaining a recording method according to the fifth embodiment of the present invention.

FIG. 19 shows a n example of the manner of 25% thinning according to this embodiment, in which the landing positions and the landing order are represented by numbers. That is, the record areas (1), (2), (3), and (4) perform printing at positions indicated by ①, ②, ③, and ④, respectively, thereby completing printing in a predetermined print area through four carriage scan operations.

This will be described in more detail with reference to FIG. 18. In the first scan, 25% thinning printing is performed using nozzles in the record area (1) of each recording head. In this 25% thinning printing, portions corresponding to the positions ① in FIG. 19 are printed. These portions are represented by Bk①, Cy①, M①, and Y① in FIG. 18. Subsequently, L/4-long paper feed is performed to move the portion recorded by the record area (1) to the record area (2). In the second scan, printing is performed in portions corresponding to the record areas (1) and (2). In this case, the record area (1) performs printing at the positions ① of the thinning pattern as in the first scan, while the record area (2) prints portions (represented by Bk②, Cy②, M②, and Y② in FIG. 18) corresponding to the positions ② of the thinning pattern shown in FIG. 19. The L/4-long paper feed is performed again to move the portion corresponding to the record area (2) to the record area (3) and the portion corresponding to the record area (1) to the record area (2). Subsequently, the record areas (1), (2), and (3) perform printing in the third scan. In this third scan, the record area (3) performs 25% thinning printing in portions (represented by Bk③, Cy③, M③, and Y③ in FIG. 18) corresponding to the positions ③ in FIG. 19), the record area (1) performs printing at the positions ① of the thinning pattern, and the record area (2) performs printing in portions corresponding to the positions ② of the thinning pattern shown in FIG. 19. Thereafter, the L/4-long paper feed is performed to move the portion corresponding to the record area (3) to the record area (4), the portion corresponding to the record area (2) to the record area (3), and the portion corresponding to the record area (1) to the record area (2). In the subsequent fourth scan, all the record areas (1), (2), (3), and (4) perform printing. In this case, the record area (4) prints portions (represented by Bk④, Cy④, M④, and Y④ in FIG. 18) corresponding to the positions ④ in FIG. 19 by 25% thinning printing, the record area (1) performs printing at the positions ① of the thinning pattern, the record area (2)

prints portions corresponding to the positions ② of the thinning pattern, and the record area (3) prints portions corresponding to the positions ③ of the thinning pattern. As a result, printing is completed in the portion corresponding to the record area (4), and the L/4-long paper feed is performed again to repeat the printing.

In FIG. 18, the contents given in parentheses in the second, third, and fourth scan operations indicate portions printed in the past scan operations.

In this embodiment, recording is always completed in an order of thinning ① → thinning ② → thinning ③ → thinning ④ in the portion corresponding to the record area (4). Therefore, since a uniform tone of color is obtained constantly, no color variation occurs.

In the fifth embodiment, the ink implantation quantity in each scan operation is reduced compared with that in the fourth embodiment, so a boundary blur is prevented more reliably. In addition, this embodiment not only achieves the characteristic feature of L/n-paper feed printing in that a density variation caused by a low landing precision, such as a paper feed error, or by an unstable ejection quantity is reduced, but also prevents a color variation which regularly occurs when solid printing of an intermediate color formed by ejecting inks of different colors to properly overlap and adjoin each other is performed. As a result, high-quality color image recording can be realized.

(6th Embodiment)

Print patterns for two-pass printing according to still another embodiment of the present invention will be described below.

This embodiment uses the Bayer type pattern according to the dither method as shown in FIG. 4, which is one of the most general area gradation methods for already binarized image data arrays. Assume that each pattern is constituted by a 4×4 matrix.

As described above, FIG. 4 shows the results of printing of such array data having different duties ($\frac{1}{16}$ pitch) obtained in the first and second passes when the data present in a buffer are masked with conventionally used checker and reverse checker patterns. A pattern of this type is generally obtained by repeating mask blocks (1402 in FIG. 20), each of which consists of a basic mask having 2×2 pixels (1401 in FIG. 20), in the vertical and horizontal directions throughout the entire print area (1403 in FIG. 20). In each of the thinning patterns 21 and 22 shown in FIG. 4, only a print area of 4×4 pixels obtained by arranging the two basis masks 1401 in each of the vertical and horizontal directions is illustrated to explain 16 gradation levels.

Figure 21:
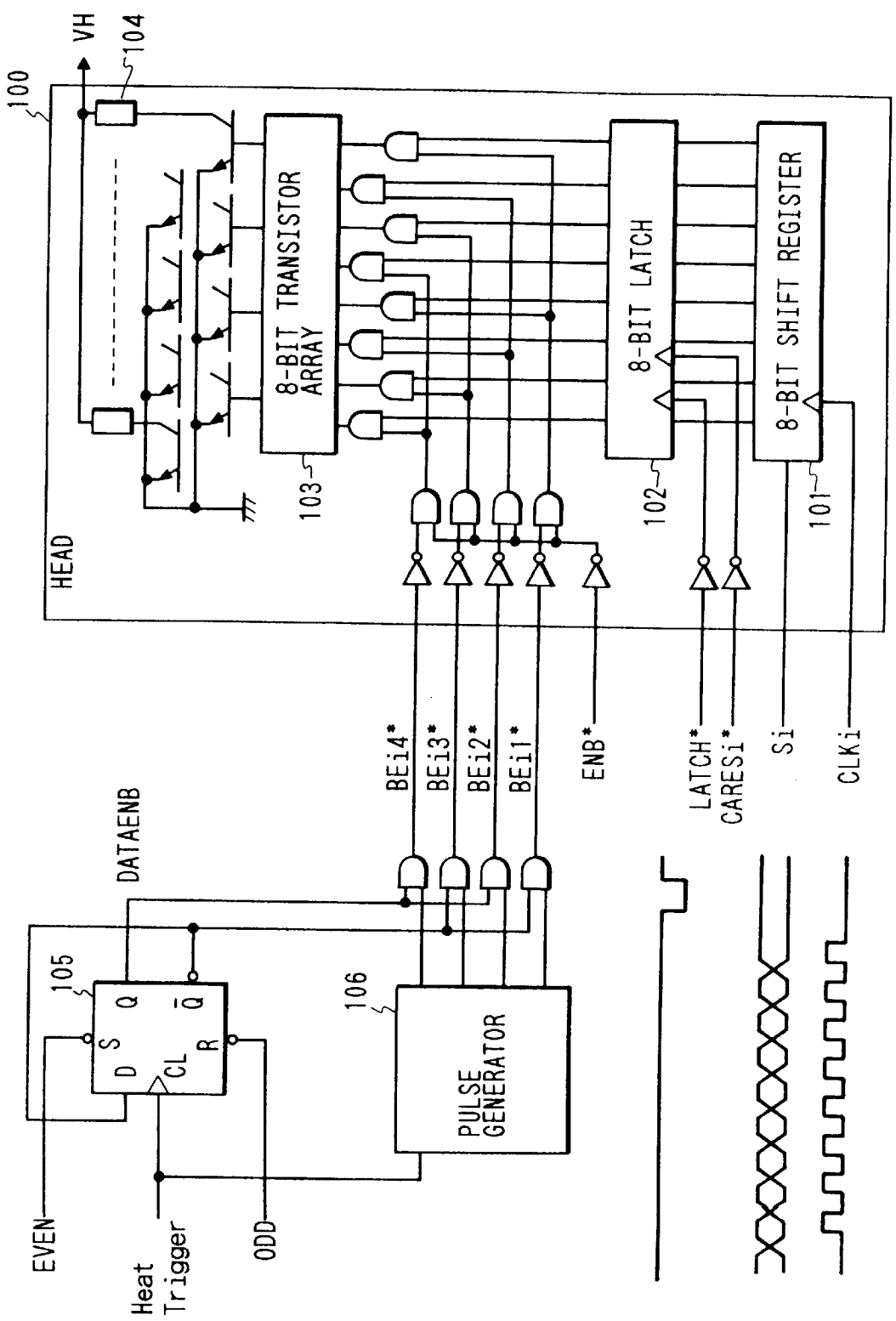
FIG. 21 is a block diagram showing the arrangement of an electric circuit for performing thinning printing of a checker pattern.
Figure 22:
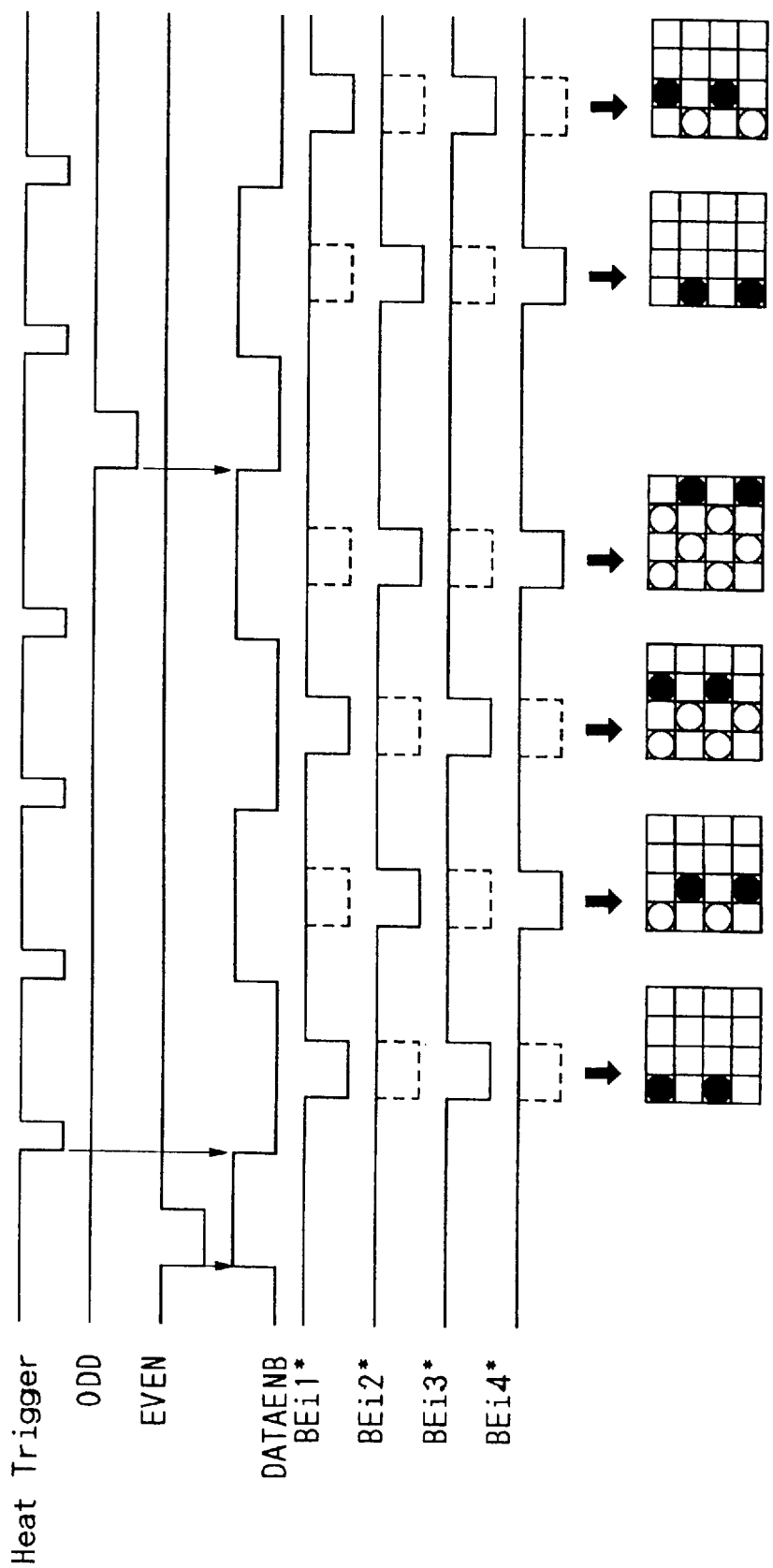
FIG. 22 is a timing chart showing signal waveforms of the circuit shown in FIG. 21.

FIG. 21 is a block diagram showing a main part of an electric circuit of a head driver and a head for performing thinning printing as shown in FIG. 4, and FIG. 22 is a timing chart showing various signal waveforms of the circuit shown in FIG. 21.

This embodiment uses a head having eight-nozzle ink eject orifices as a recording head.

A head unit 100 sets print data Si in an eight-bit shift register 101 in accordance with a print data sync clock CLKi. The head unit 100 switches on signals $BEi1^8$, $BEi2^*$, $BEi3^*$, and $BEi4^*$ to drive a transistor array 103 which in turn causes heaters 104 to generate heat, thereby performing printing. A signal $LATCH^*$ is a control signal for latching print data in a latch circuit 102, and a signal $CARESi^*$ is a reset signal for clearing the contents of the latch. Each heat operation is started by a heat trigger signal, and a pulse generator 106 outputs the signals $BEi1^*$, $BEi2^*$, $BEi3^*$, and $BEi4^*$. Although these signals are sometimes output at different timings, it is assumed that they are simultaneously output for the sake of simplicity in this embodiment.

In order to perform thinning, outputs of a flip-flop 105 are switched at an input timing of the heat trigger signal to change signals for masking (e.g., BEi1* and BEi3*) alternately each time a heat operation is started. This is actually performed by switching between HIGH and LOW of an output signal DATAENB from the flip-flop 105 as shown in the timing chart of FIG. 22. When the heat trigger signal is input, non-masked signals of the signals BEi1*, BEi2*, BEi3*, and BEi4* are switched to LOW, and heaters provided for nozzles corresponding to these signals are heated to eject ink droplets. Referring to FIG. 22, each dotted line portion indicates the timing of masking, which corresponds to the signal DATAENB. Signals EVEN and ODD are signals for initializing mask patterns. When printing of a checker pattern is required, the signal EVEN is supplied before printing of one line, and this presets the flip-flop 105 to enable the checker-pattern printing. When, on the other hand, a line on which printing of a reverse checker pattern is required is fed, the signal ODD is supplied to reset the flip-flop 105, and the signals BEi2* and BEi4* are switched on to enable the reverse-checker-pattern printing.

As described above, the use of the flip-flop which reverses the mask for every two pixels as one period makes it possible to repeatedly arrange the basic masks 1401 each consisting of 2×2 pixels shown in FIG. 20 by one line.

If, however, these thinning patterns are used to perform two-pass printing, a considerable difference is produced between the numbers of pixels printed in the first and second passes depending on the print duty as is apparent from FIG. 5.

The embodiment to be described below, therefore, uses a pattern which contains print pixels and non-print pixels and in which $\underline{m}$ pixels ($\underline{m}$ is an integer which satisfies m >2) are arranged in a sub scan direction and $k \times 2^{n-1}$ pixels ($\underline{k}$ and $\underline{n}$ are integers which satisfy $k \geq 2$ and $n \geq 1$, respectively) are arranged in a main scan direction, and a pattern in which arrays of print and non-print pixels in the above pattern are reversed. These two types of patterns are arranged in the horizontal direction (main scan direction) to form a block pattern in which $\underline{m}$ pixels are arranged in the sub scan direction and $k \times 2^n$ pixels are arranged in the main scan direction. Multi-pass printing is performed by using this block pattern. This will be described in more detail below.

Figure 23:
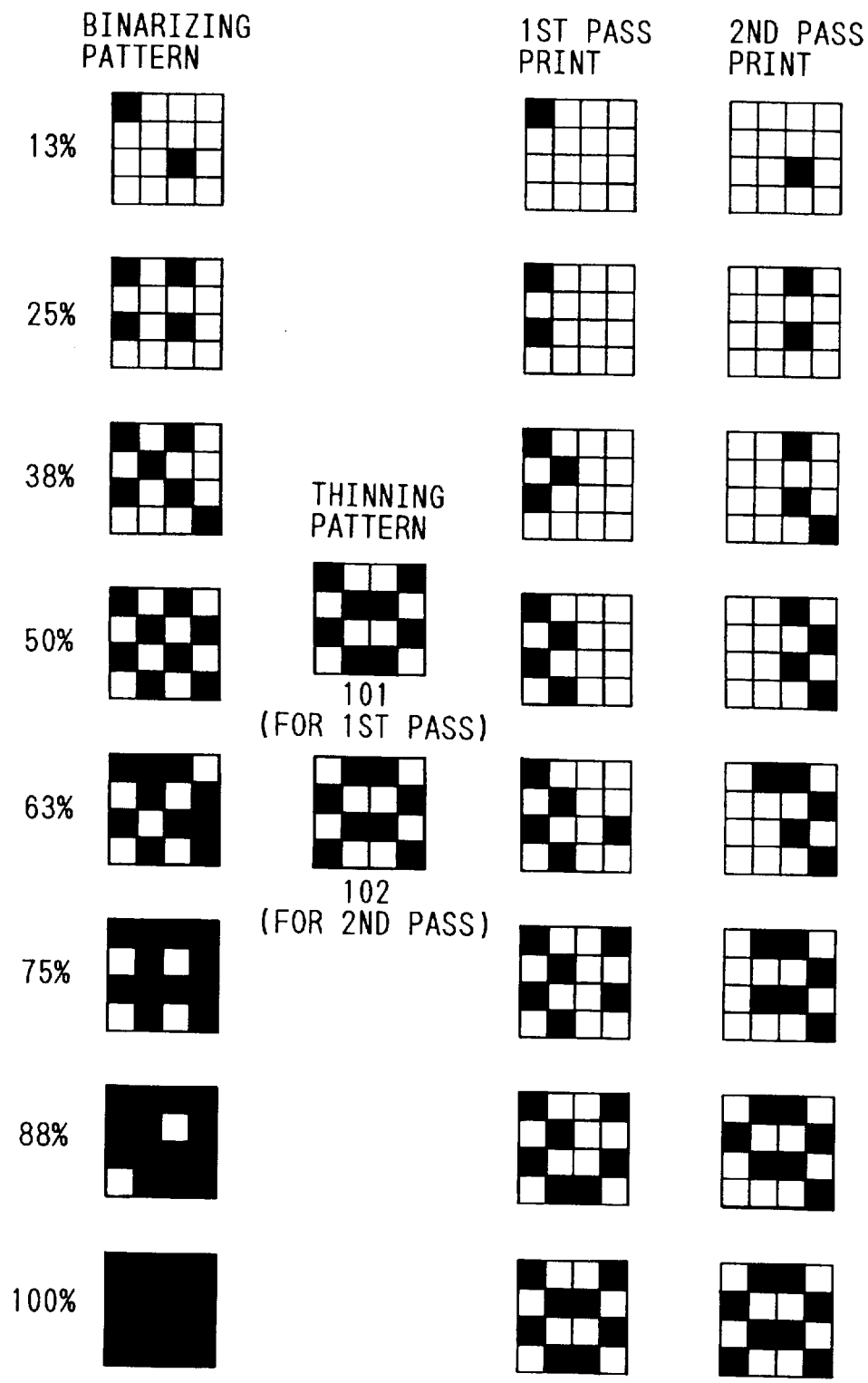
FIG. 23 is a view for explaining multi-pass printing according to the sixth embodiment of the present invention.

FIG. 23 best illustrates this embodiment. FIG. 23 shows the results of thinning printing in the first and second passes performed at different duties by using the thinning patterns 101 and 102 as the characteristic features of this embodiment. The thinning array used in this embodiment is constituted by a basic mask ① (1401 in FIG. 24) in which print pixels are diagonally arranged in an area of 2×2 pixels, a basic mask ② (1501) which is a reversed mask of the basic mask ①, and a mask block 1502 storing a horizontal array (①, ②) of these basic masks. These arrays are repeatedly arranged in the vertical and horizontal directions throughout the entire print area (1503).

Figure 25:
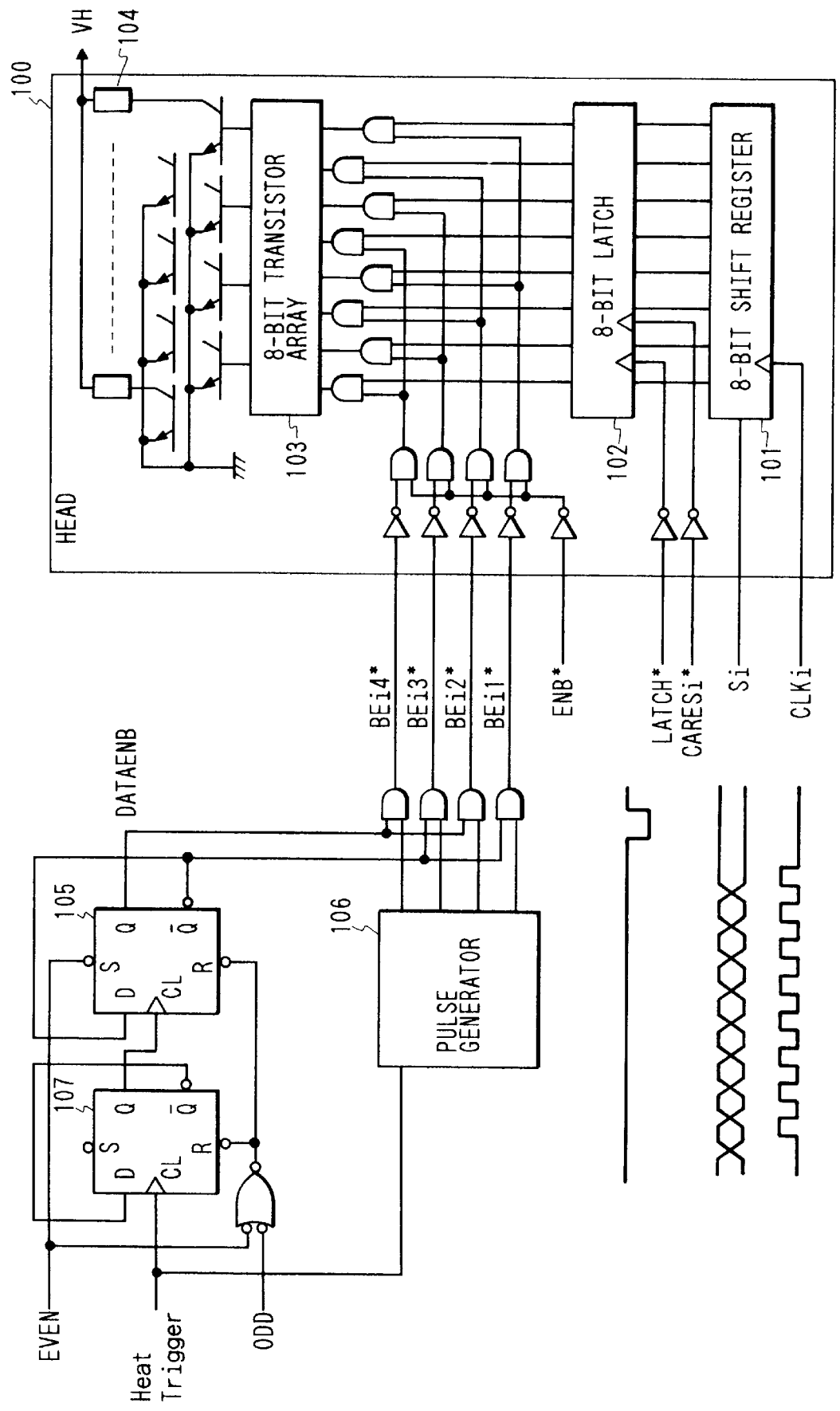
FIG. 25 is a block diagram showing the arrangement of an electric circuit for performing thinning printing according to the sixth embodiment.
Figure 26:
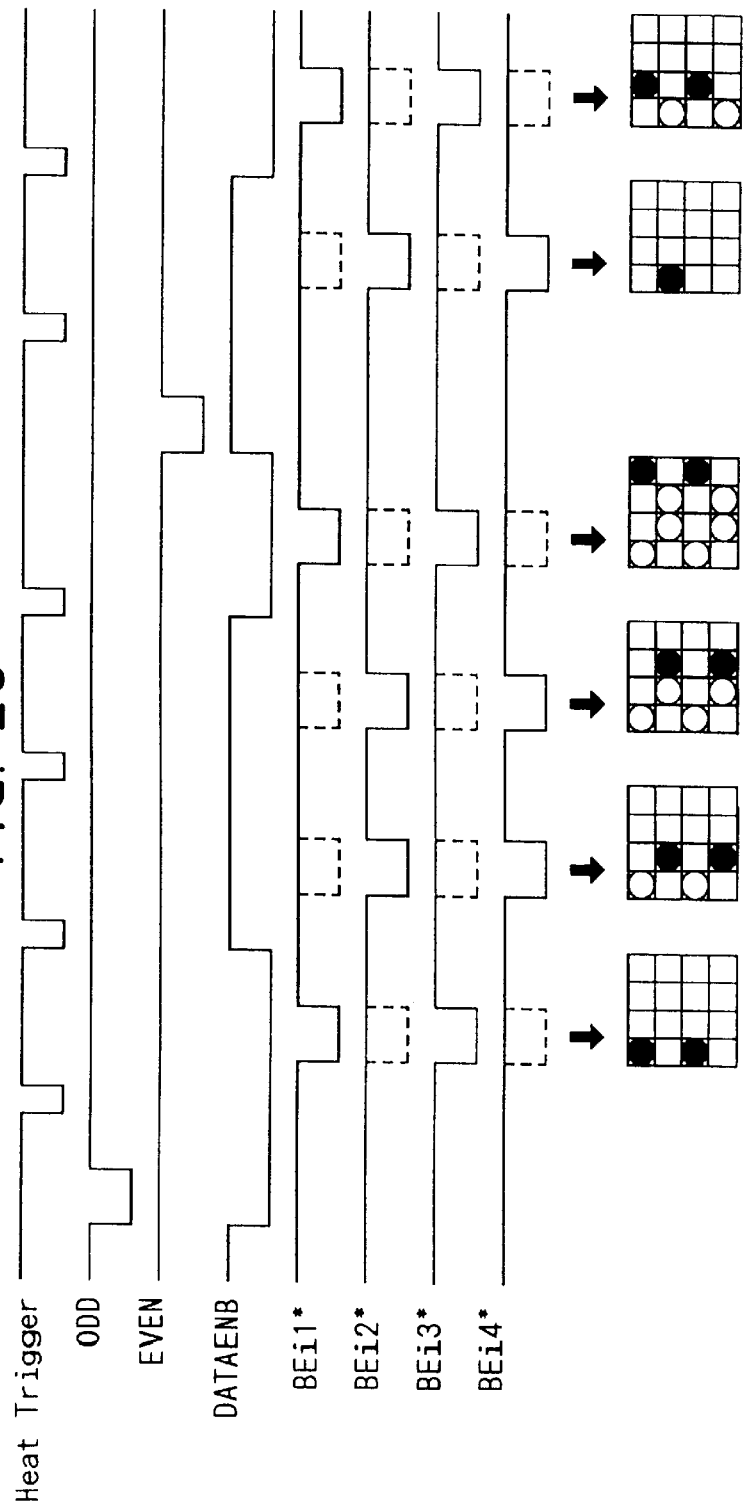
FIG. 26 is a timing chart showing signal waveforms of the circuit shown in FIG. 25.

FIG. 25 is a block diagram showing a main part of an electric circuit of a head driver and a head for performing thinning printing according to this embodiment, and FIG. 26 is a timing chart showing various signal waveforms in the circuit shown in FIG. 25. The same reference numerals as in FIG. 21 denote the same parts in FIG. 25. This circuit uses two stages of flip-flops in order to control mask signals. The circuit will be described below with reference to the timing chart shown in FIG. 26. Note that in FIG. 26, each dotted line portion indicates a masked signal which is actually not output.

Before printing of the first line is started, a signal ODD for setting checker-pattern printing is supplied in order to drive signals BEi1* and BEi3* When a heat trigger signal is supplied once, a pulse generator 106 generates signals for driving heaters 104. However, signals BEi2* and BEi4* are masked by an output from a flip-flop 105 and are therefore not printed. When the heat trigger signal is supplied again, the output from the flip-flop 105 is changed by an output from a flip-flop 107 to mask the signals BEi1* and BEi3*. Since this circuit uses the two stages of flip-flops, a signal DATAENB is changed for every other heat trigger signal, and a changed mask pattern is obtained each time the signal DATAENB is changed, as shown in FIG. 26. This realizes the mask pattern 1503 using the basic masks 1401 and 1501 and the mask blocks 1502 shown in FIG. 24.

In each of the thinning patterns 101 and 102 shown in FIG. 23, only 4×4 pixels, i.e., two vertically adjacent blocks each consisting of the basic masks ① 1401 and ② 1501 are illustrated for descriptive convenience. In the thinning printing shown in FIG. 4, data having a print duty of up to 50% is completely printed in the first pass, and printing of the second pass is not performed unless the print duty exceeds 50%. In this embodiment, however, the use of the masks 101 and 102 makes it possible to constantly print equal numbers of dots in the first and second passes from low to high duties although array patterns according to the same dither method are used.

The method of solving the problem of a density variation caused by nozzle variations according to the above conventional example cannot achieve its effect unless substantially the same numbers of dots are implanted in the first and second passes by using different nozzle groups. In addition, a color variation which occurs particularly in a color-mixed condition explained in the above convention al example is also caused by a difference between the numbers of dots in the first and second passes. Therefore, it is apparent that the masks of this embodiment by which substantially equal numbers of dots are printed in the first and second passes are more effective than the conventional masks 201 and 202 at each and every duty.

Figure 27:
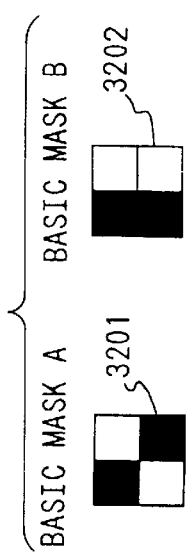
FIG. 27 is a view showing basic masks.

The facts that two vertically adjacent pixels are required as a basic mask in two-pass printing and that the basic masks described above are most effective of all possible print pixel arrays in an area of 2×2 pixels will be described below. Since equal numbers of dots must be printed in the first and second passes and nozzle groups different in the main scan direction must be used in the first and second passes in order to eliminate problems caused by nozzle variations, a basic mask A (3201) and a basic mask B (3202) shown in FIG. 27 are possible as a basic mask of 2×2 pixels. The basic mask 3202 satisfies the above two conditions and can maximally prevent the problems caused by nozzle variations. However, since the basic mask 3202 forms straight lines, in each of which dots of an equal tone of color are aligned in a number half the total number of nozzles, in the nozzle array direction (vertical direction), straight lines of different tones of color periodically appear in the main scan direction (horizontal direction). Therefore, a color variation in the vertical direction appears as fine stripes. For this reason, an area of a basic mask of two pixels is also required in the vertical direction in two-pass printing. In addition, in order to prevent print pixels from being aligned in the vertical direction in a basic mask, it is apparent that the basic mask 3201 used in this embodiment is the best of all basic masks of 2×2 pixels.

(7th Embodiment)

Figure 28:
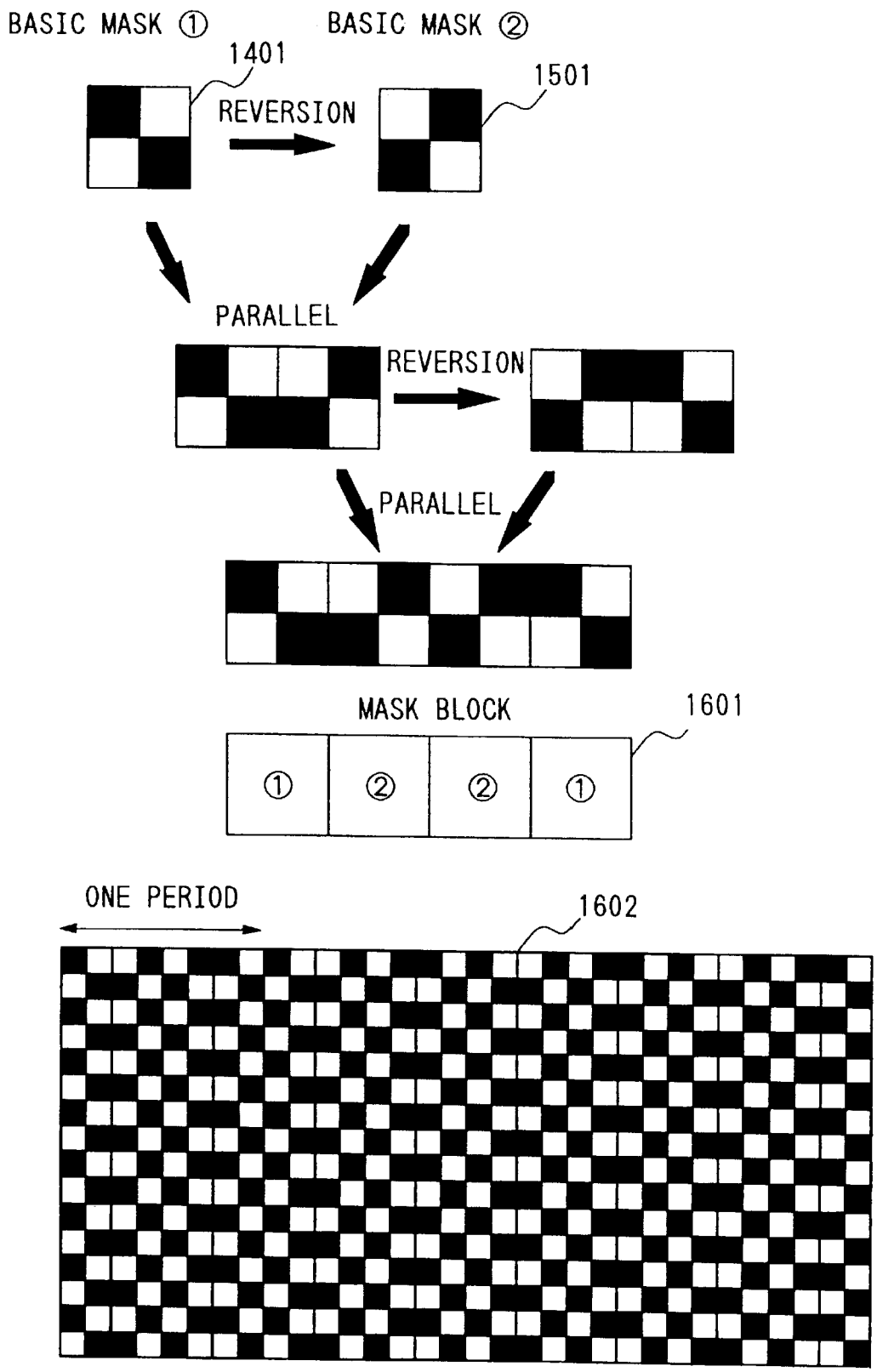
FIG. 28 is a view showing basic mask patterns and a mask block pattern according to the seventh embodiment.

As the seventh embodiment of the present invention, a two-pass printing method using thinning patterns in which the same basic masks as in the sixth embodiment are used but the size (storage quantity) of the mask block is doubled will be described below. FIG. 28 shows a thinning array used in this embodiment. This thinning array is constituted by the basic mask ① (1401) of the sixth embodiment, the basic mask ② (1501) of the same embodiment as a reversed mask of the basic mask ①, and a mask block (1601) storing a condition (①, ②, ②, ①) which is a horizontal combination of an array (①, ②) of these two basic masks arranged in the horizontal direction and an array (②, ①) as a reversed array. These mask blocks are repeatedly arranged in the vertical and horizontal directions throughout the entire print area (1602).

Figure 35:
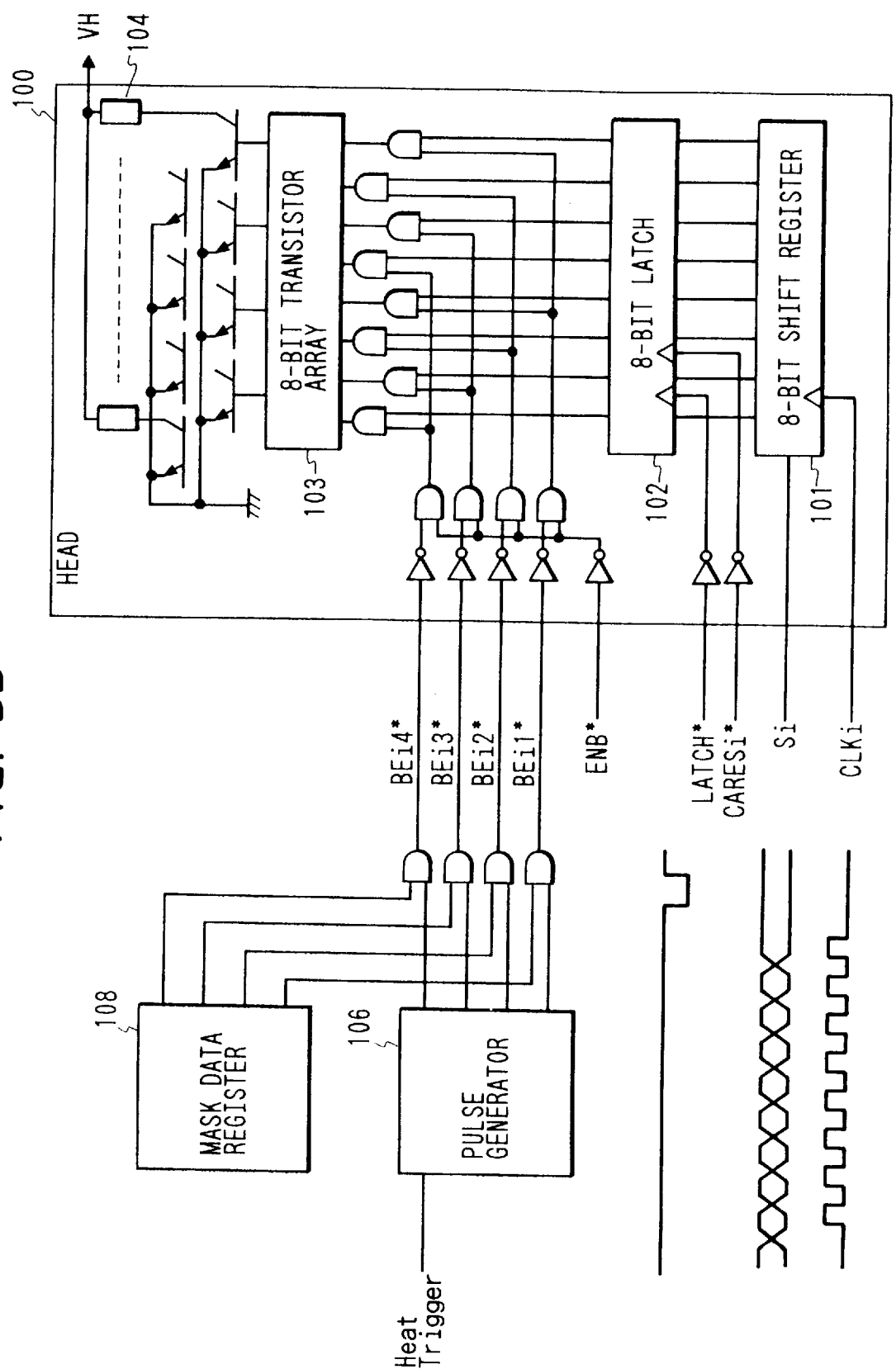
FIG. 35 is a block diagram showing the arrangement of an electric circuit for performing thinning printing according to the seventh and eighth embodiments of the present invention.
Figure 36:
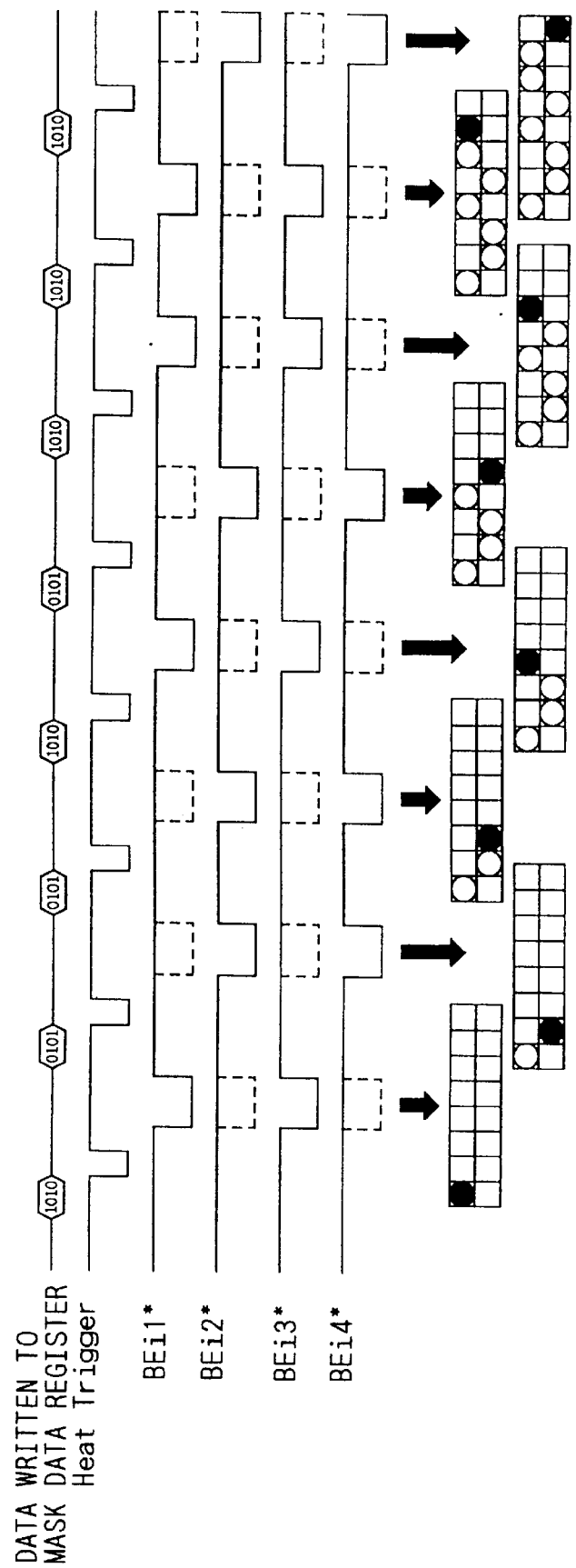
FIG. 36 is a timing chart showing signal waveforms for performing thinning printing according to the seventh embodiment by using the circuit shown in FIG. 35.

FIG. 35 shows an electric circuit which enables this embodiment. The same reference numerals as in FIGS. 21 and 25 denote the same parts in FIG. 35. In this circuit, a mask data register 108 is provided in place of a flip-flop to mask signals BEi1* to BEi4*, and a heat pulse generated in accordance with a heat trigger signal and mask pattern data set in the mask data register 108 are ANDed with each other to enable masking of given data. FIG. 36 is a timing chart showing a heat operation obtained when masking is actually performed using this circuit. In FIG. 36, each dotted line portion indicates a masked signal which is actually not printed. Referring to FIG. 36, data 1010 is written in the mask data register to mask the signals BEi2* and BEi4*. Thereafter, a heat trigger signal for starting a heat operation is switched to LOW to start printing. In this case, since the signals BEi2* and BEi4* are masked, only the signals BEi1* and BEi3* are actually supplied to perform printing of a checker pattern.

As described above, mask data is periodically written in the mask data register 108 before the heat trigger signal is sent, and this realizes the basic masks and the mask block shown in FIG. 28.

When the above thinning patterns are used, the effect on the 4×4 Bayer type dither pattern described in the first embodiment remains the same. However, the use of these thinning patterns can solve the problems posed in a low duty range, which cannot be solved by the conventional example or the first embodiment, and can eliminate image variations at a finer duty pitch. In addition, the fattening type dither pattern which is more or less problematic for the thinning patterns of the first embodiment can also be processed well.

These effects will be described below with reference to the accompanying drawings. The effect on the same Bayer type dither pattern as in the sixth embodiment will be described first. Suppose, however, that the pattern is constituted by a wider matrix of 8 ×8 pixels.

Figure 29:
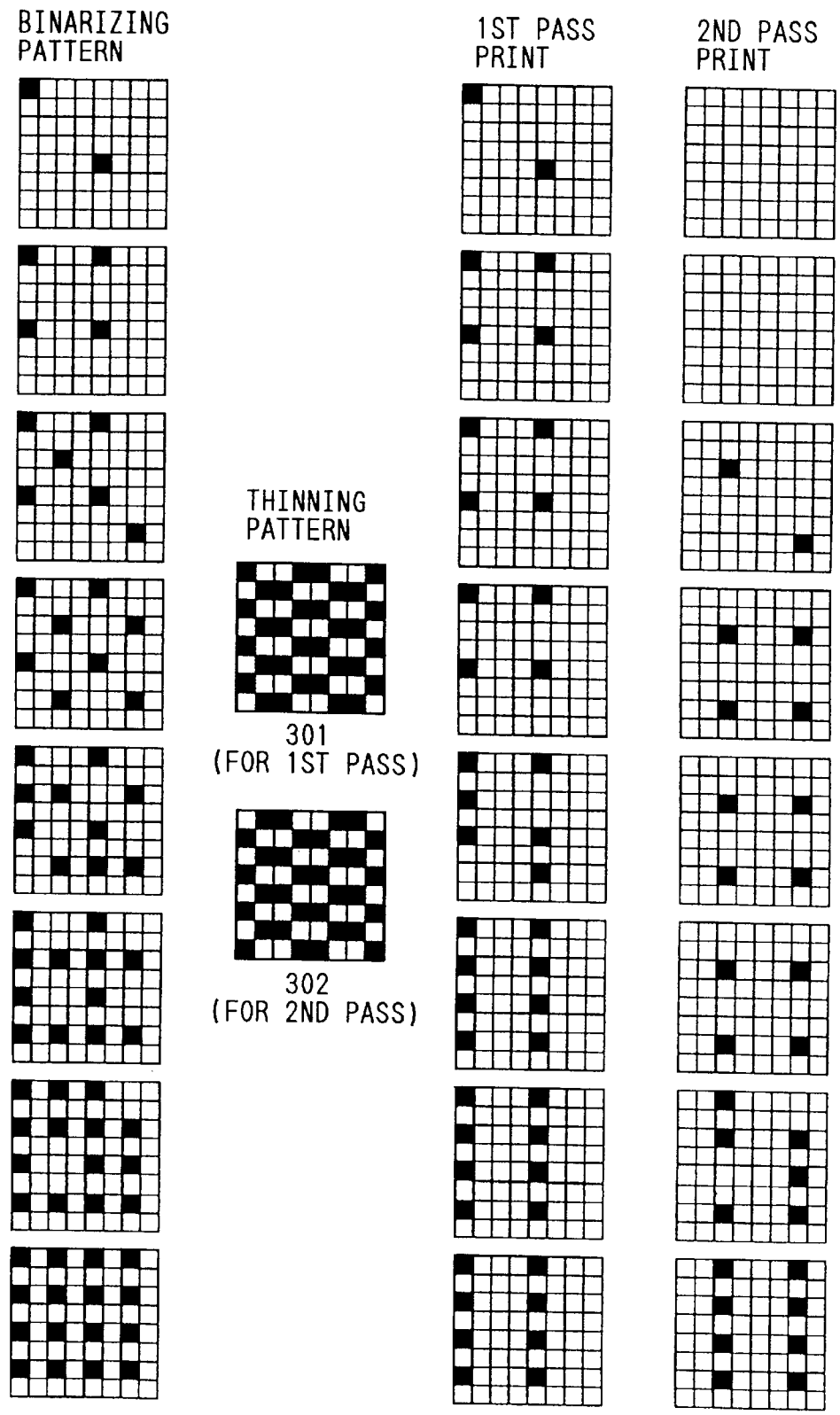
FIG. 29 is a view for explaining multi-pass printing according to the sixth embodiment.
Figure 30:
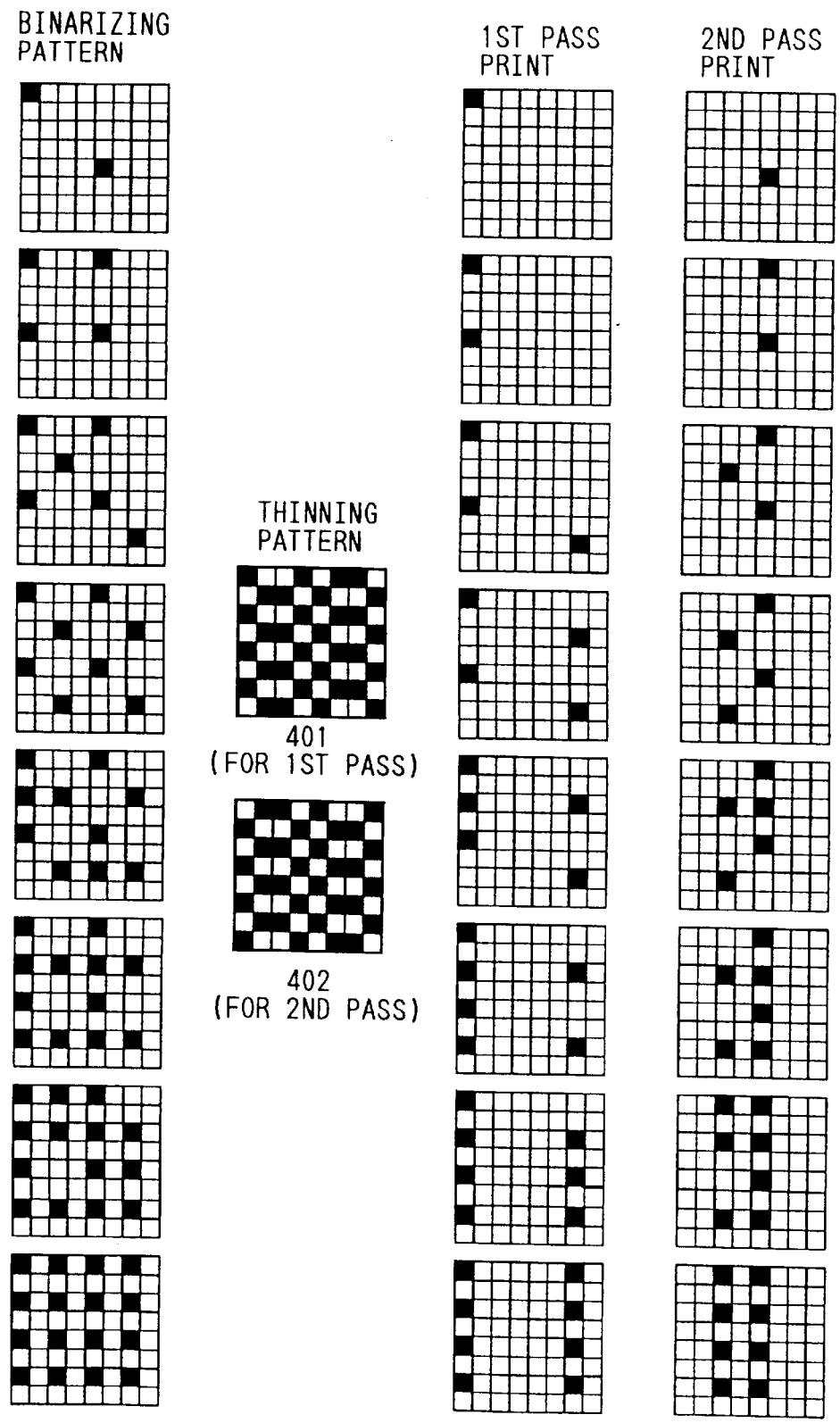
FIG. 30 is a view for explaining multi-pass printing according to the seventh embodiment.

FIG. 29 shows the results of printing of array data having various duties as illustrated on the left side of FIG. 29 obtained in the first and second passes when the data present in a buffer are masked through the thinning patterns used in the sixth embodiment. Similarly, FIG. 30 shows the results of printing at the time the thinning patterns of this embodiment are used. FIGS. 29 and 30 show the results corresponding to duties from 1/(8×8) to 16/(8×8).

As shown in FIG. 24 explained in the sixth embodiment, when the thinning pattern having a period of four pixels in the horizontal direction as in the sixth embodiment is used, two periods of the thinning pattern are synchronized with one period of the binarizing mask pattern even if the Bayer type pattern is used. Therefore, as shown in FIG. 29, no effects on the above-mentioned problems can be obtained at low duties of 1/16 or less. For example, at a 1/16 duty, all dot arrays in the main scan direction are implanted by the same nozzle, and printing is performed in a single scan operation of a head. In this embodiment, however, as shown in FIG. 30, the period is doubled by storing the double array (①, ②, ③, ④) in the mask block, and printing is equally performed by two nozzles through two scan operations even at the 1/16 duty. According to this embodiment, therefore, the above problems can be solved even at a duty pitch of 1/16 or less, and this makes it possible to obtain an image with a higher quality than that in the sixth embodiment.

FIGS. 31 and 32 and FIGS. 33 and 34 are views showing binarizing patterns of a 4×4 matrix and an 8 ×8 matrix, respectively, according to the fattening type dither method, for comparing the first embodiment and this embodiment in 16 gradation levels. These drawings also reveal that the thinning patterns of this embodiment provide finer adjustment and cover a wider range of duties than those of the first embodiment.

Figure 37:
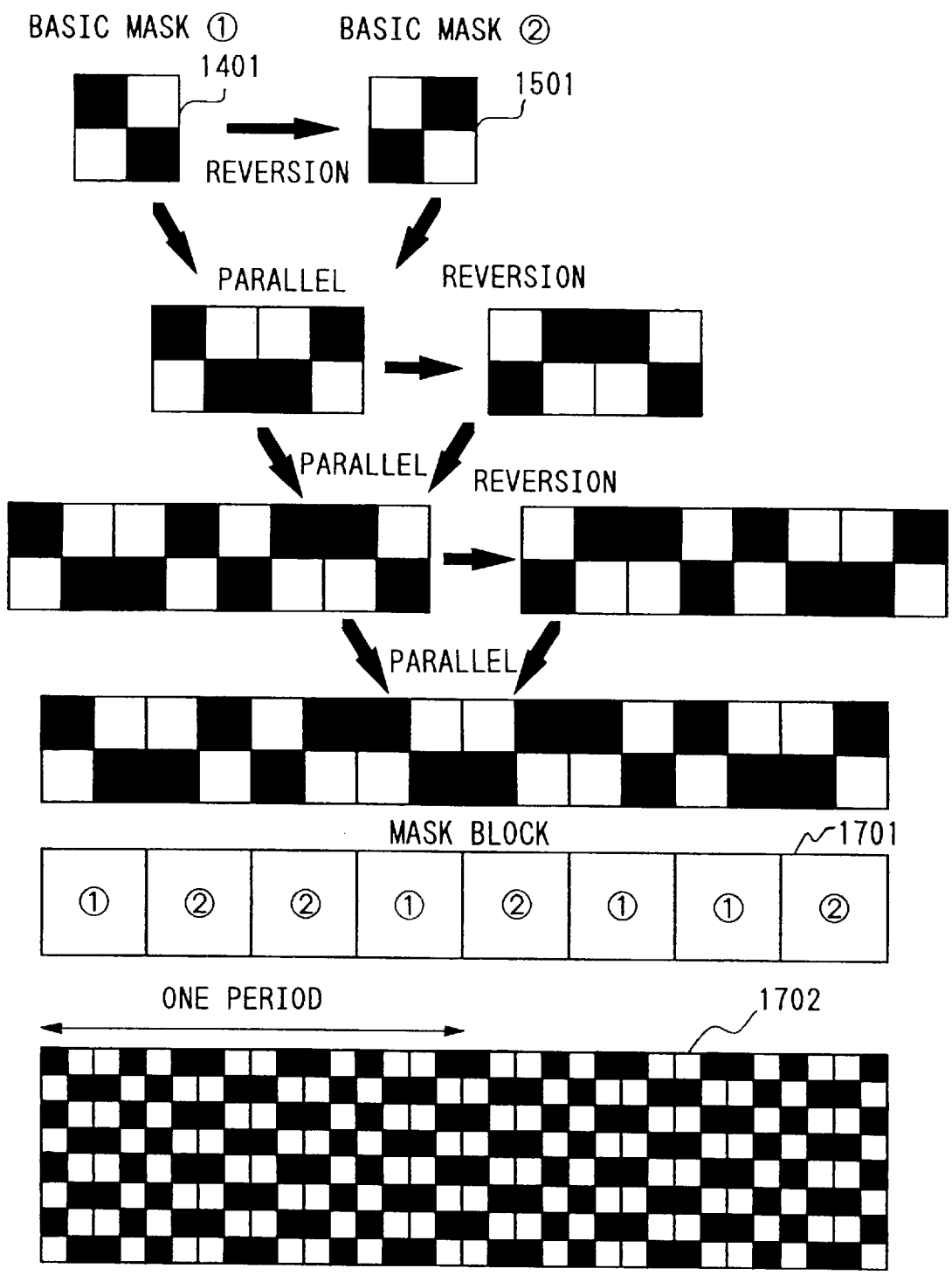
FIG. 37 is a view showing basic mask patterns and a mask block pattern according to the seventh embodiment.

As is also apparent from the above results, when the period of a thinning pattern is extended as long as possible as in this embodiment, the thinning pattern is no longer synchronized with the matrix of a binarizing pattern, and this provides a high possibility that the countermeasure against the above problems is effective to lower duties. In general, an 8×8 matrix is considered to be the best matrix for binarizing patterns. Therefore, if a thinning pattern has the number of pixels which cannot be divided by eight or has nine or more pixels in the horizontal direction, its period is not synchronized with the matrix of a binarizing pattern or a large number of pixels are required before the synchronization is established. In either case, the above countermeasure against the problems can be effective. The former example is described as the third embodiment. It is, however, assumed that a thinning pattern which can equally divide nozzles at any duty is the one having pixels in a number which is a multiple of eight in the horizontal direction, especially as an effective means for the Bayer type. As shown in FIG. 37, for example, the mask block (①, ②, ③, ④) shown in FIG. 28 used in this embodiment is reversed again to obtain another mask block (②, ①, ①, ②), and these mask blocks are arranged parallel to form a new mask block (①, ②, ②, ①, ②, ①, ①, ②) (1701). When this new mask block is stored, the above countermeasure is effective for any of the binarizing patterns of 8×8 pixels as has been described above. In this case, printing can be performed in the main scan direction by using two different types of nozzles even at a duty of 1/(8×8) which is the second lowest duty next to 0. Therefore, this embodiment may also use a mask block of this type in situations where the cost is not a problem and particularly improvement in image quality is required.

(8th Embodiment)

Figure 38:
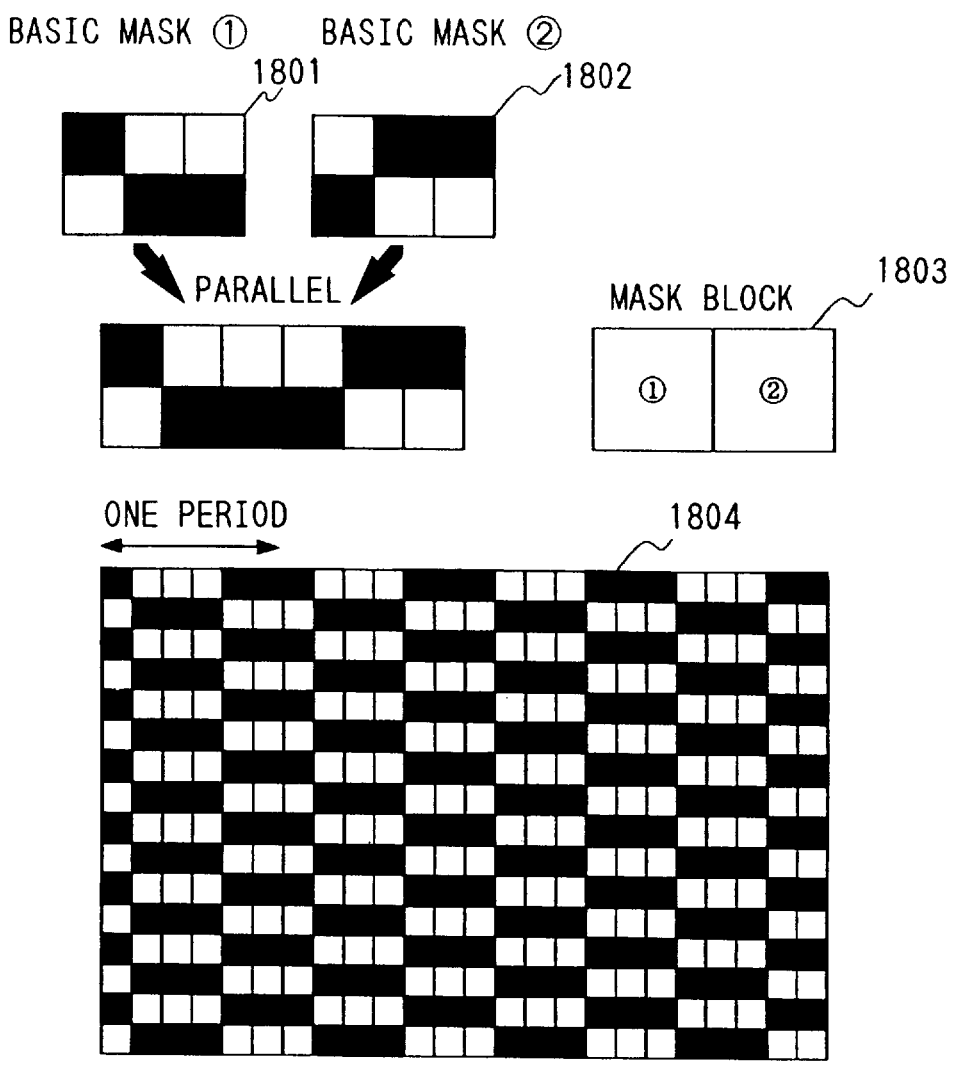
FIG. 38 is a view showing basic mask patterns and a mask block pattern according to the eighth embodiment of the present invention.

The eighth embodiment of the present invention will be described below. In this embodiment, as shown in FIG. 38, masks 1801 and 1802 each having a pixel area of 2×3 pixels in the vertical and horizontal directions are used as basic masks ① and ② to constitute a mask block ((①, ②)) 1803.

Figure 39:
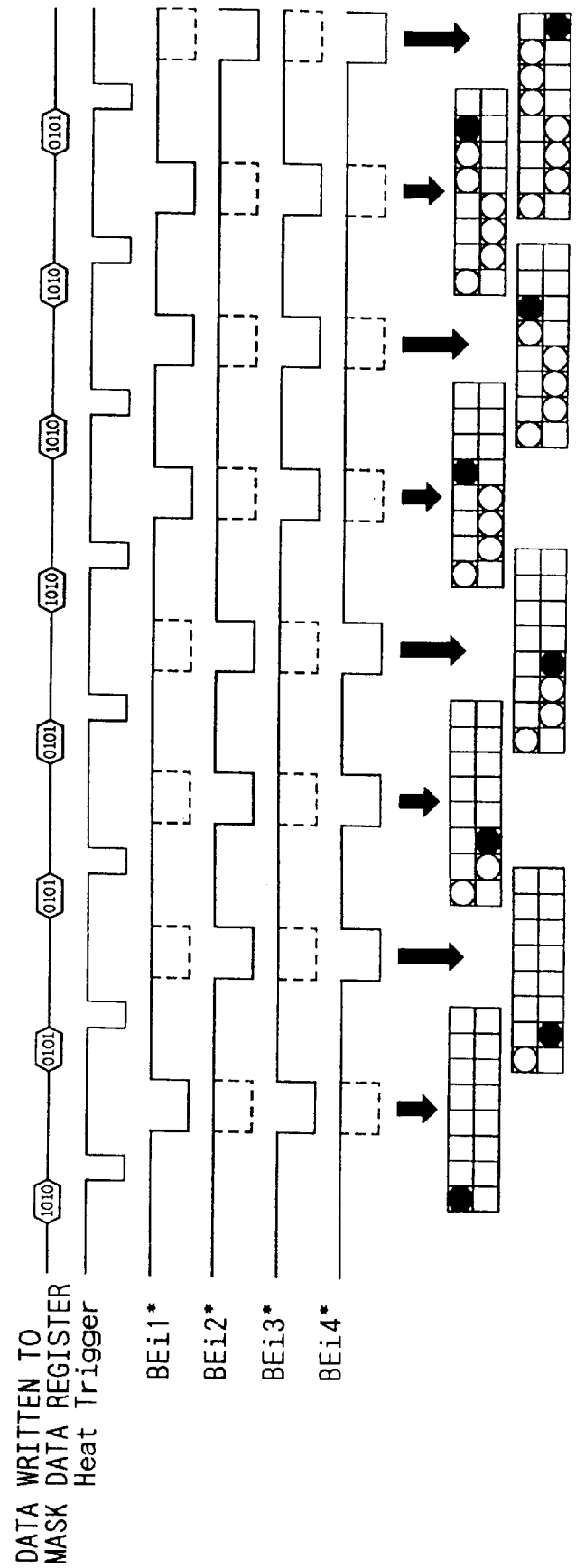
FIG. 39 is a timing chart showing signal waveforms for performing thinning printing according to the eighth embodiment by using the circuit shown in FIG. 35.

An electric circuit of a head driver and a head for realizing this embodiment can be realized by the same arrangement as that shown in FIG. 35 and a detailed description thereof will be omitted. FIG. 39 is a timing chart for enabling thinning printing as shown in FIG. 38 using the circuit of FIG. 39. The mask pattern shown in FIG. 38 can be obtained by only changing a value to be set in a mask data register 108 as shown in FIG. 39.

Figure 41:
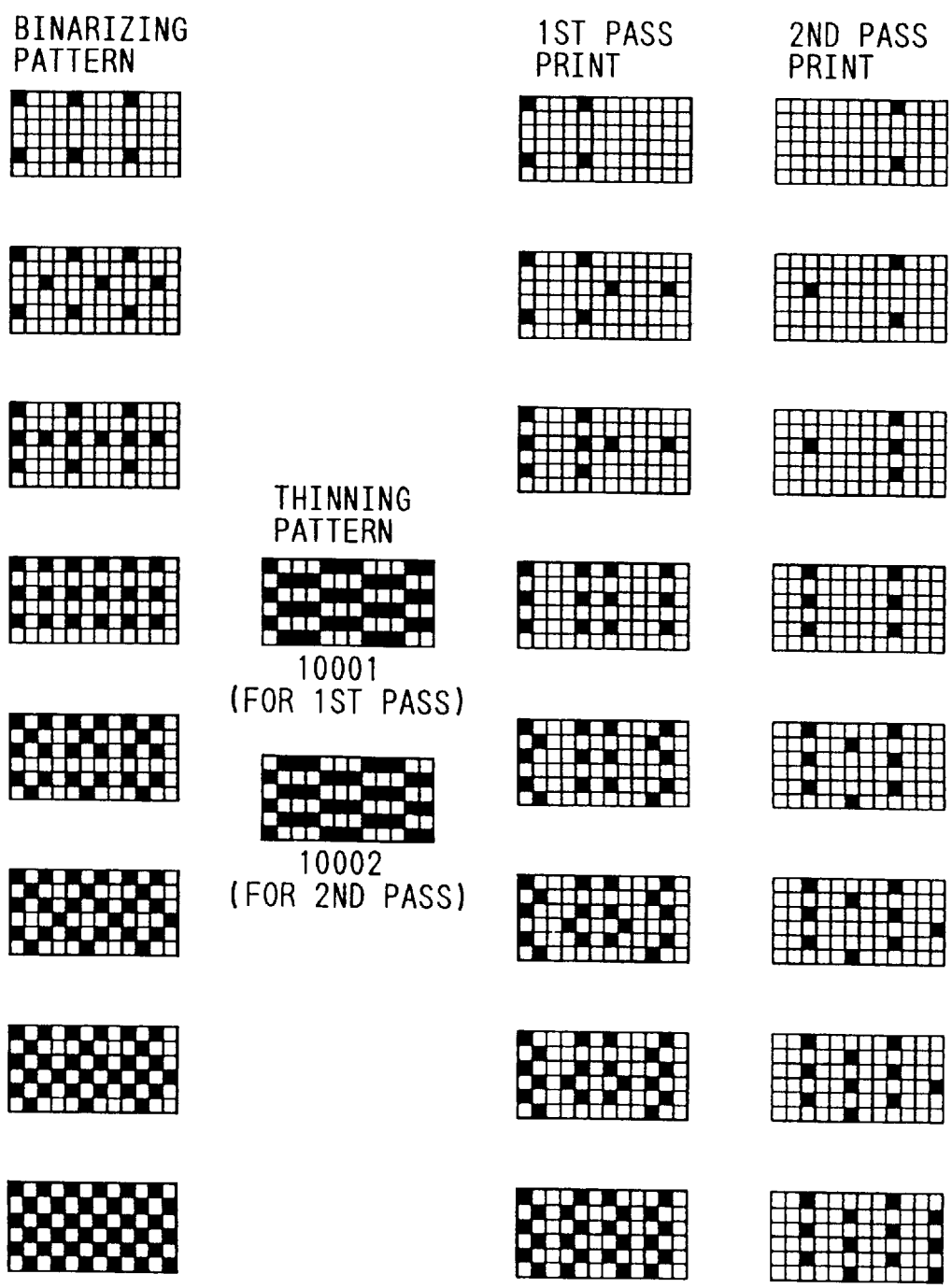
FIG. 41 is a view for explaining multi-pass printing according to the eighth embodiment.

According to this embodiment, as is apparent from a comparison between FIGS. 40 and 41, separate printing in the first and second passes can be performed even at a duty of 1/16 or less which cannot be processed well in the sixth embodiment, without using a large thinning pattern area (2×8) as used in the seventh embodiment. FIG. 40 shows the results of printing performed by using thinning patterns 901 and 902 as used in the first embodiment, and FIG. 41 shows the results of printing performed by using thinning patterns 1001 and 1002 according to this embodiment. In this case, however, although printing is performed not using one type of a nozzle group, a difference is produced between the numbers of dots printed by two types of nozzles in the two passes.

At a duty of ⁴⁄₁₆ or ⁸⁄₁₆, therefore, the print results obtained in the sixth embodiment are more or less better than those shown in FIGS. 40 and 41. However, this embodiment is effective not only for a duty pitch of ¹⁄₁₆ or less. As described above, the number (three) of pixels in the horizontal direction in the thinning area according to this embodiment is not a measure of the number (eight) of pixels in the horizontal direction of a mask which is normally used in binarization. When the mask of this embodiment is used, therefore, no synchronization is established even in a binarizing method other than the Bayer type dither method shown in FIG. 41. In addition, the image quality is not particularly degraded by various binarizing methods or in a wide range of applications, thus indicating the effect of this embodiment.

(9th Embodiment)

Figure 42:
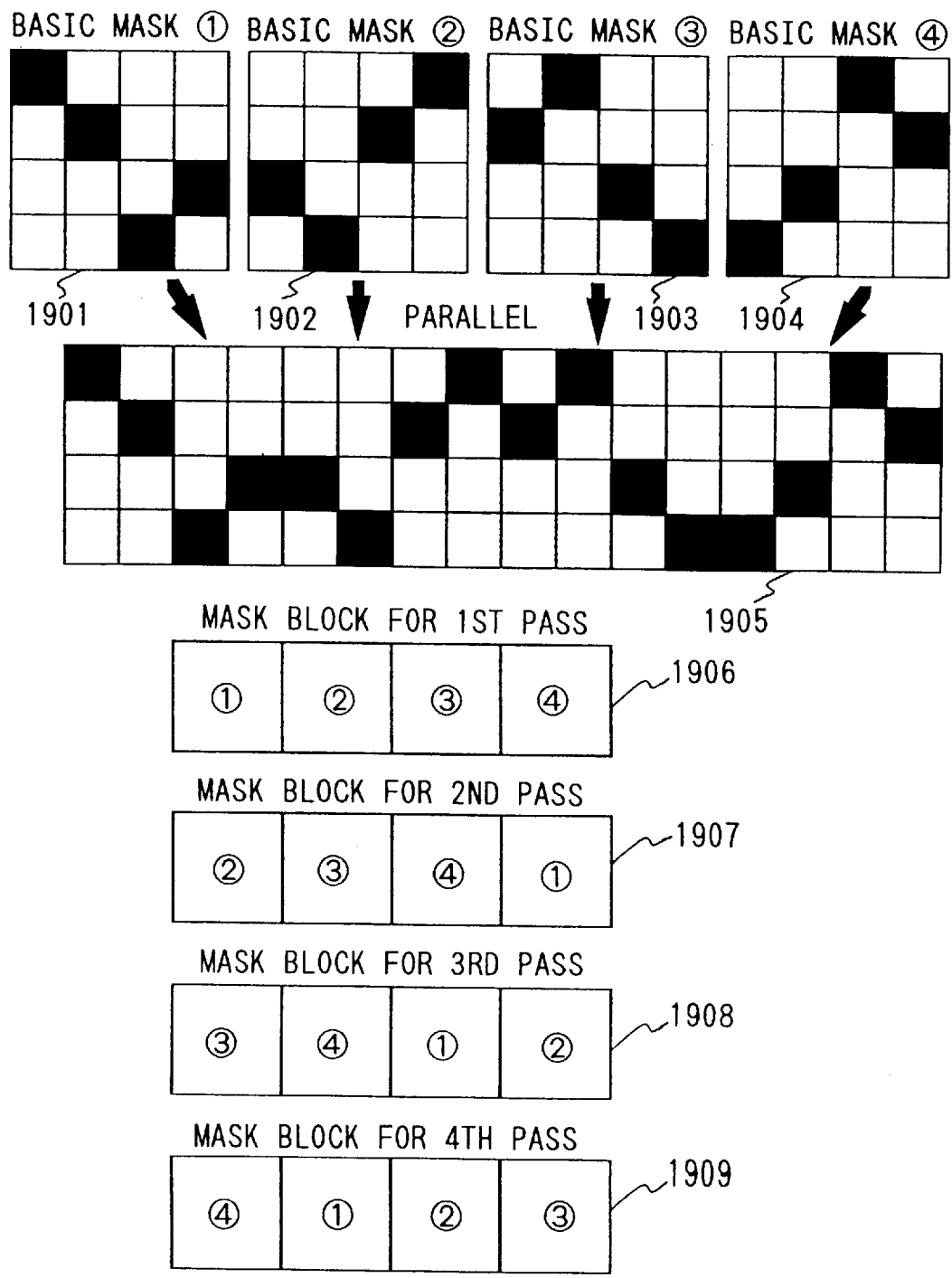
FIG. 42 is a view for explaining basic mask patterns and mask block patterns according to the ninth embodiment of the present invention.

As the ninth embodiment, a four-pass printing method having four types of 4×4 basic masks will be described below. This embodiment completes printing by scanning a single area four times using basic masks ① (1901), ② (1902), ③ (1903), and ④ (1904) and a mask block (1906 to 1909) as shown in FIG. 42. That is, dots arranged in the main scan direction are recorded by four types of nozzles. Therefore, nozzle variations are reduced more than those in the above embodiments of two-pass printing, and this realizes a smooth and high-quality image.

Figure 43:
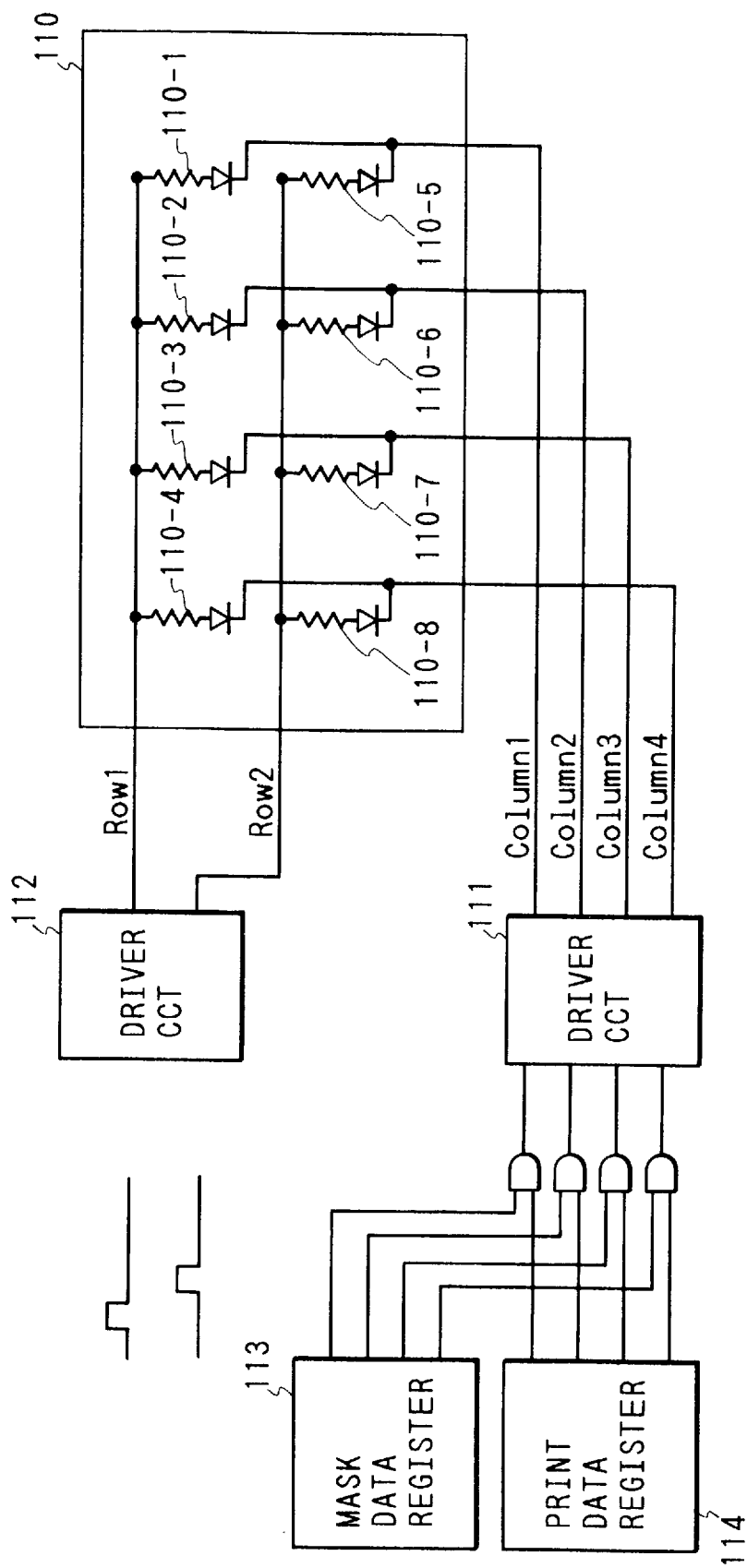
FIG. 43 is a block diagram showing the arrangement of an electric circuit for performing thinning printing according to the ninth embodiment.
Figure 44:
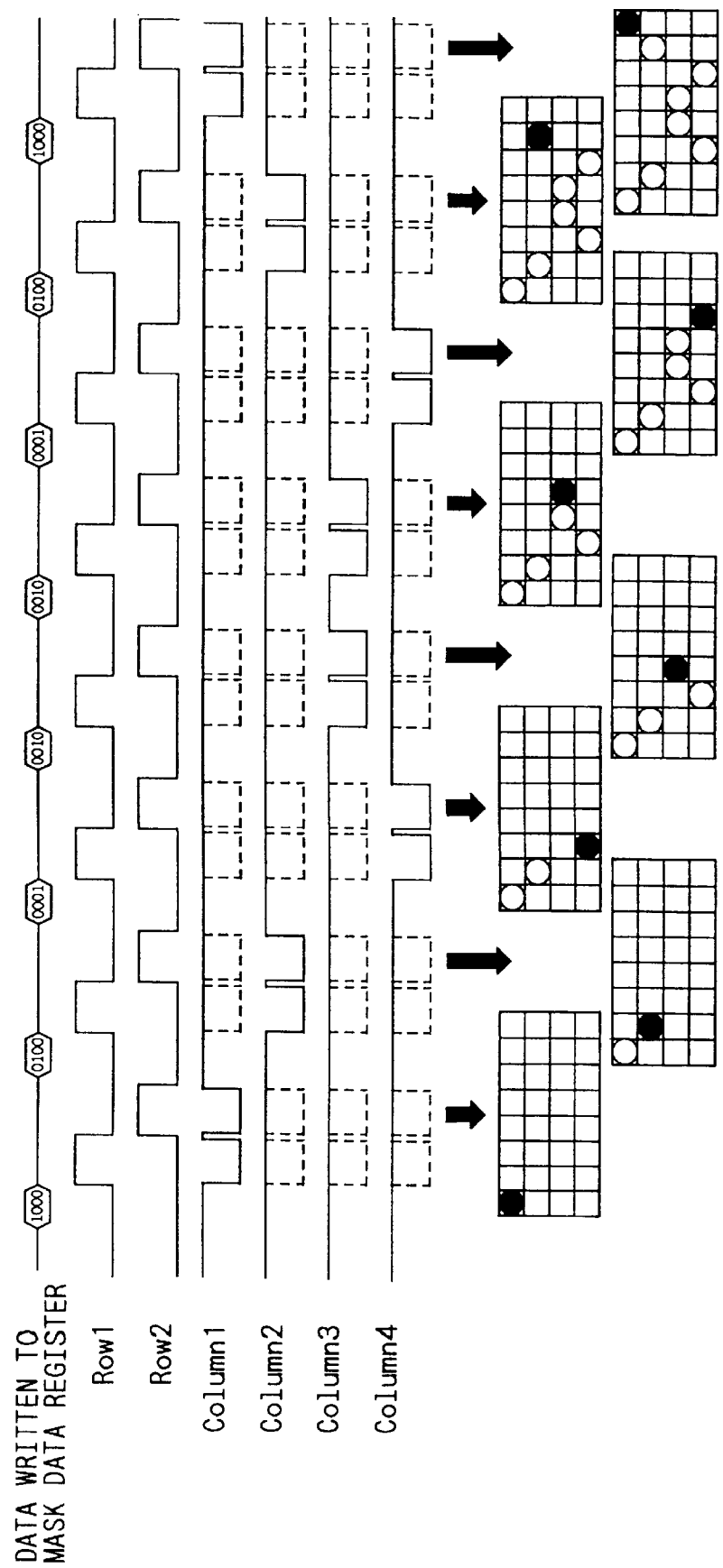
FIG. 44 is a timing chart showing signal waveforms of the circuit shown in FIG. 43.

FIG. 43 is a block diagram showing a main part of an electric circuit of a head driver and a head for realizing this embodiment. This circuit uses an eight-nozzle unit driven by a diode matrix of 2 rows × 4 columns diodes as a head unit. This head unit 110 is controlled by a combination of two row signals and four column signals. Eight heaters 110-1 to 110-8 are selectively heated in accordance with signal combinations to induce a state change in an ink, thereby performing printing by an ejected ink. For example, in order to heat all of the eight nozzles, print data (1111) is set in a print data register 114 and a mask data register 113, and a row1 signal is supplied. When heating of four nozzles of the heaters 110-1 to 110-4 is finished, a row2 signal is supplied without rewriting the data in the print data register 114. As a result, the heaters 110-5 to 110-8 are used in printing. In this case, given mask data can be set in the mask data register 113. The condition of masking at this time will be described with reference to a timing chart shown in FIG. 44. First, (1000) is written in the mask register 113. In this case, "1" represents data to be printed, and "0" represents data to be masked. After the data is written in the print register 114, the row1 and row2 signals are supplied at different timings. In order to apply different mask patterns to the row1 and row2 signals, the mask data is reset before the row2 signal is sent. Thereafter, write operations are sequentially performed for the mask data register in accordance with data to be masked, and heat operations are performed accordingly to obtain the print results indicated by arrows in FIG. 44. In this manner, the basic masks ① to ④ and the four types of mask blocks 1906 to 1909 shown in FIG. 42 are realized.

Figure 45:
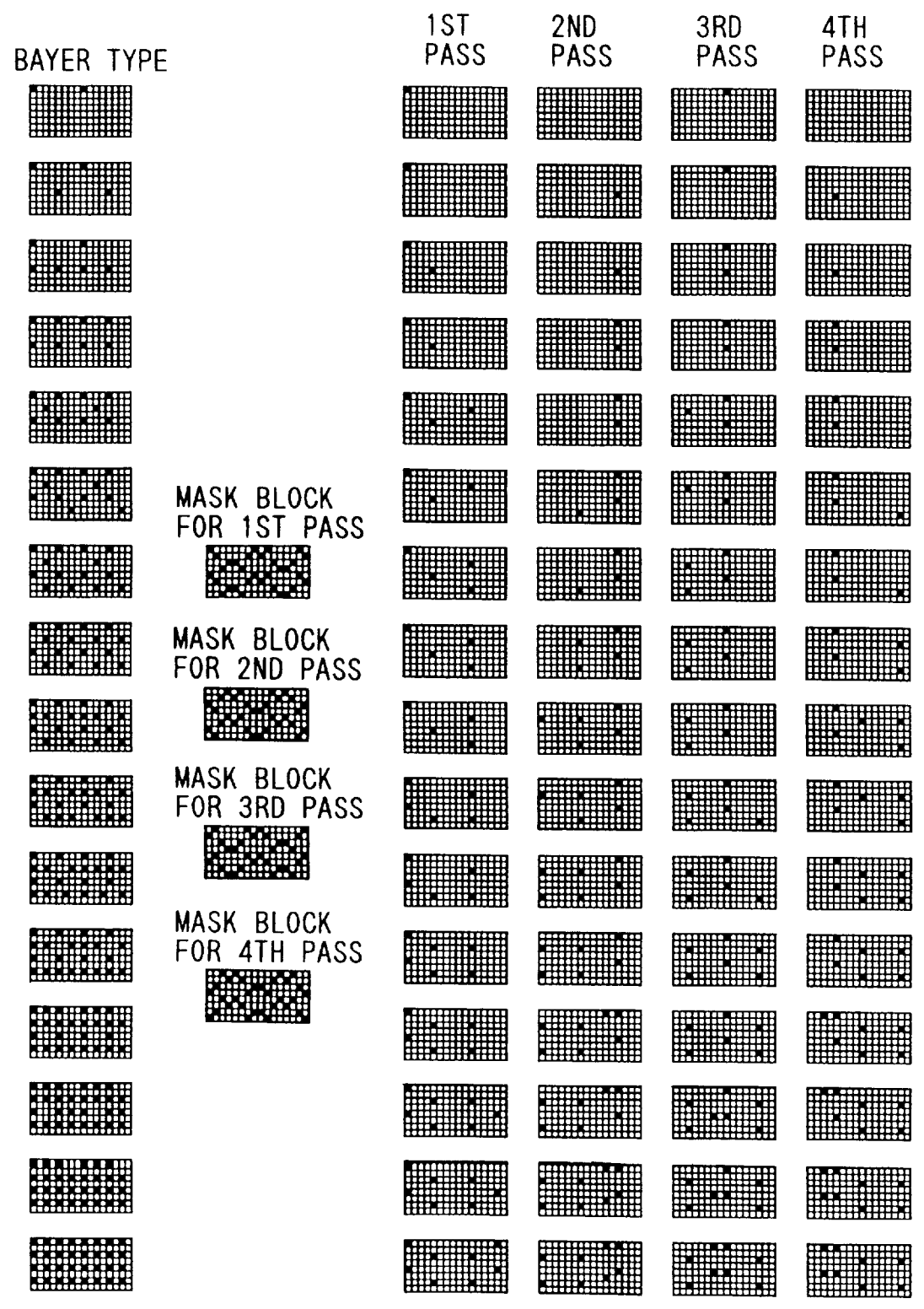

FIG. 45 shows the results of printing of 8×8 binarizing gradation patterns having various duties according to the Bayer type dither method obtained in the first to fourth passes when the patterns are printed by the thinning method of this embodiment through four passes. FIG. 45 illustrates patterns having duties from a 1/(8×8) duty which is the second lowest duty next to 0 to a 16/(8×8) duty of 64 gradation levels. In this embodiment, the problems described above can be solved even at lower duties which cannot be processed well in the sixth or seventh embodiment, and this effect is obtained throughout the 64 gradation levels.

(10th Embodiment)

The tenth embodiment of the present invention will be described below. In this embodiment, a plurality of thinning patterns of mask blocks to be described below are stored. A thinning pattern corresponding to a gradation pattern is selected by keys provided on a recording apparatus or in accordance with a command supplied from a host device, thereby performing multi-pass printing.

Figure 50:
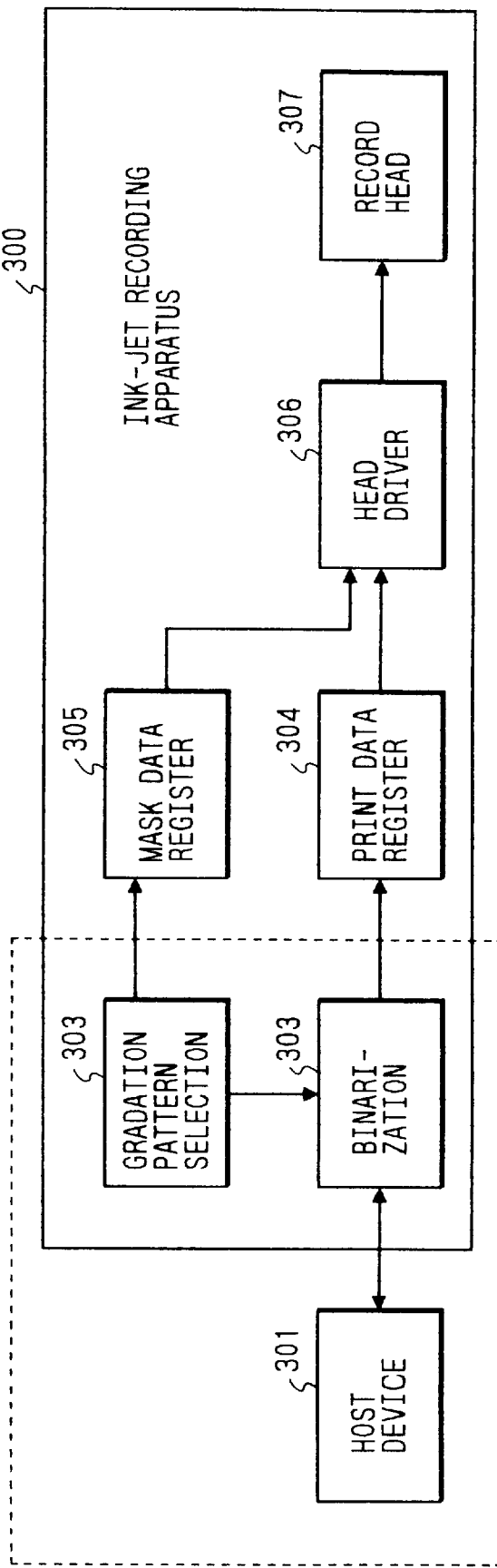
FIG. 50 is a block diagram showing the flow of image data in an ink jet recording apparatus according to the tenth embodiment of the present invention.

In this embodiment, assume that the pixel density of image data is equal to the recording density of a recording apparatus. FIG. 50 is a block diagram mainly showing the flow of image data in an ink jet recording apparatus according to this embodiment. An ink jet recording apparatus 300 of this embodiment receives gradation data in the form of values from a host device 301 and performs halftone recording for a designated area in accordance with a predetermined area gradation method such as a dither method or an error diffusion method. As shown in FIG. 50, in accordance with a gradation pattern selected by a gradation pattern selector 303 by a key operation or the like on a console, a binarizing circuit 303 binarizes a predetermined halftone image area into binary data and stores the binary data in a print data register 304. In addition, a thinning pattern (mask data) corresponding to the selected gradation pattern is selected from a mask data register 305 and used to drive a recording head 307 via a head driver 306.

FIGS. 46 to 49 show combinations of area gradation patterns and thinning patterns, in which 64 gradation levels are represented by a matrix of 8×8=64 pixels and dots are generated in an order of numbers 1 to 64 in accordance with designation of the gradation levels. For example, when the gradation level is 12, dots are generated at pixels 1 to 12; when it is 48, dots are generated at pixels 1 to 48. Each of FIGS. 46 to 49 illustrates recorded pixels obtained through two scan operations. FIGS. 46 and 47 show recording methods using two different thinning patterns (1 and 2) for a gradation pattern 1 in which pixels are comparatively scattered. The recording method shown in each of FIGS. 46 and 47 is similar to the recording method of the first embodiment in which each recording head is equally divided into two parts and each image area is subjected to recording through two scan operations while paper feed is performed by a length which is ½ the recording length of the recording head. In the method shown in FIG. 46, a maximum difference between the numbers of dots recorded in the first and second scan operations is one regardless of the gradation levels, and a difference between tones of color is very small as described above. In the method shown in FIG. 47, however, a difference between the numbers of recorded dots is two or more at particular gradation levels, and this sometimes produces a slight difference between tones of color. That is, the thinning pattern 1 is more preferable to the gradation pattern 1. FIGS. 48 and 49 illustrate recording methods using the above thinning patterns 1 and 2 for a gradation pattern 2 in which the number of dots is increased with reference to a certain pixel as the center with an increase in the gradation level. As is apparent from FIGS. 48 and 49, the thinning pattern 2 is more preferable to the gradation pattern 2 because a difference between the numbers of dots recorded in the first and second scan operations is smaller than that obtained by the thinning pattern 1.

As described above, a difference is introduced in color variations of images depending on the combinations of the gradation patterns and the thinning patterns. In this embodiment, therefore, thinning patterns are selectively used in accordance with a gradation pattern selected by a key operation or the like.

That is, the thinning pattern 1 is selected when the gradation pattern 1 is selected; the thinning pattern 2 is selected when the gradation pattern 2 is selected.

Note that in the above embodiment, the ink jet recording apparatus performs dot development of a gradation pattern. However, as indicated by a dotted line portion shown in FIG. 50, this processing may be performed by the host device. In this case, gradation pattern select information may be transmitted from the host device to the recording apparatus to automatically select a thinning pattern.

According to this embodiment as described above, multipass recording is performed by using a mask block formed by arranging a plurality of different basic masks. As a result, a difference between the numbers of printed dots in the two passes can be reduced to make it possible to obtain a high-quality image free from a density variation or a color variation.

Sill another embodiment of the present invention will be described below. In this embodiment, in order to eliminate positional deviations in recorded dots during divisional recording, a plurality of eject orifices of a recording head are grouped into N (four) blocks which can be driven simultaneously. When recording of an image corresponding to the length of an area obtained by equally dividing the recording head into n (two) parts is to be performed using n eject orifice arrays while scan recording is performed n times, the number of times of divisional driving for the blocks is set to be N/n (two), i.e., the blocks are divided into two pairs of the blocks 1 and 3 and the blocks 2 and 4.

As a result, since a divisional drive timing is generated for only the blocks 1 and 3 or the blocks 2 and 4 which are driven in one heat operation, a recording deviation caused by the divisional driving can be reduced.

(11th Embodiment)

Figure 51:
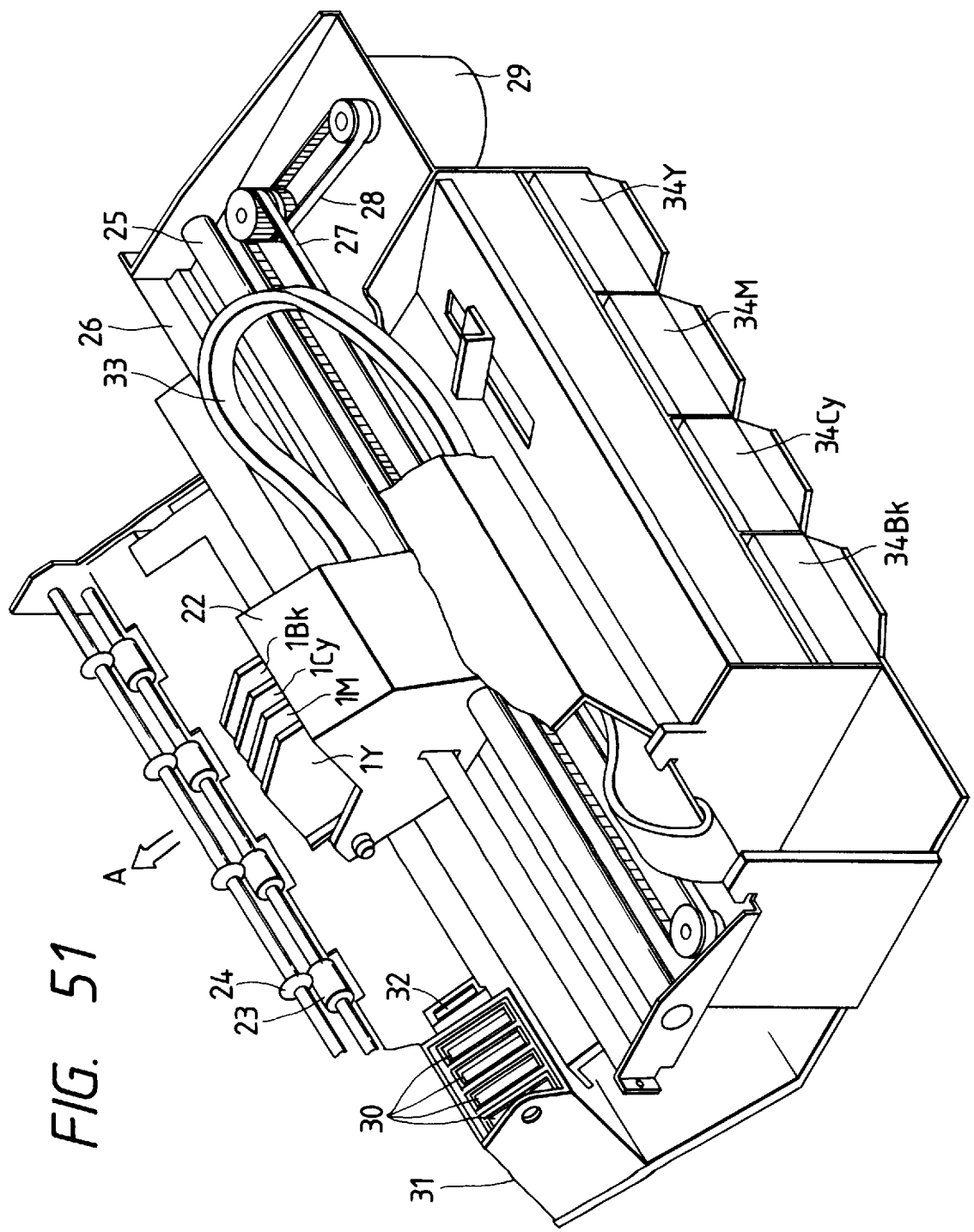
FIG. 51 is a perspective view showing a main part of a serial scan-type color ink jet recording apparatus to which the present invention is applicable.

FIG. 51 is a perspective view showing a main part of a serial-scan type color ink jet recording apparatus according to the eleventh embodiment of the present invention. Referring to FIG. 51, a recording head 1Y for ejecting a yellow ink, a recording head 1M for ejecting a magenta ink, a recording head 1C for ejecting a cyan ink, and a recording head 1K for ejecting a black ink are arranged on a carriage 22 with predetermined distances between them. A recording medium consisting of, e.g., paper or a thin plastic plate is clamped between paper-discharge rollers 23 and 24 through paper-feed rollers (not shown) and fed in a direction indicated by an arrow A by a paper-feed motor (not shown).

The carriage 22 is guided and supported by a guide shaft 25 and an encoder 26. The carriage 22 is reciprocated along the guide shaft 25 by a carriage motor 29 via drive belts 27 and 28. A plurality of eject orifices are formed in the surface (eject orifice formation surface) of the recording head 1 opposite to the recording medium. A heat generating element (electrothermal energy conversion element) for generating thermal energy for ink ejection is provided in the interior (liquid channel) of each eject orifice. In accordance with a read timing of the encoder 26, the heat generating elements are driven on the basis of a record signal to eject ink droplets onto the recording medium in an order of black, cyan, magenta, and yellow, thereby forming an image.

A recovery unit 31 is arranged outside a record area at the home position of the carriage 22. This recovery unit 31 has caps 30 and can perform an eject recovery operation. A cleaning blade 32 cleans the eject orifice formation surface of the recording head 1. Ink tanks 34 supply inks to the recording head 1 through an ink supply tube 33 and sub tanks (not shown) provided on the carriage 22.

Figure 52:
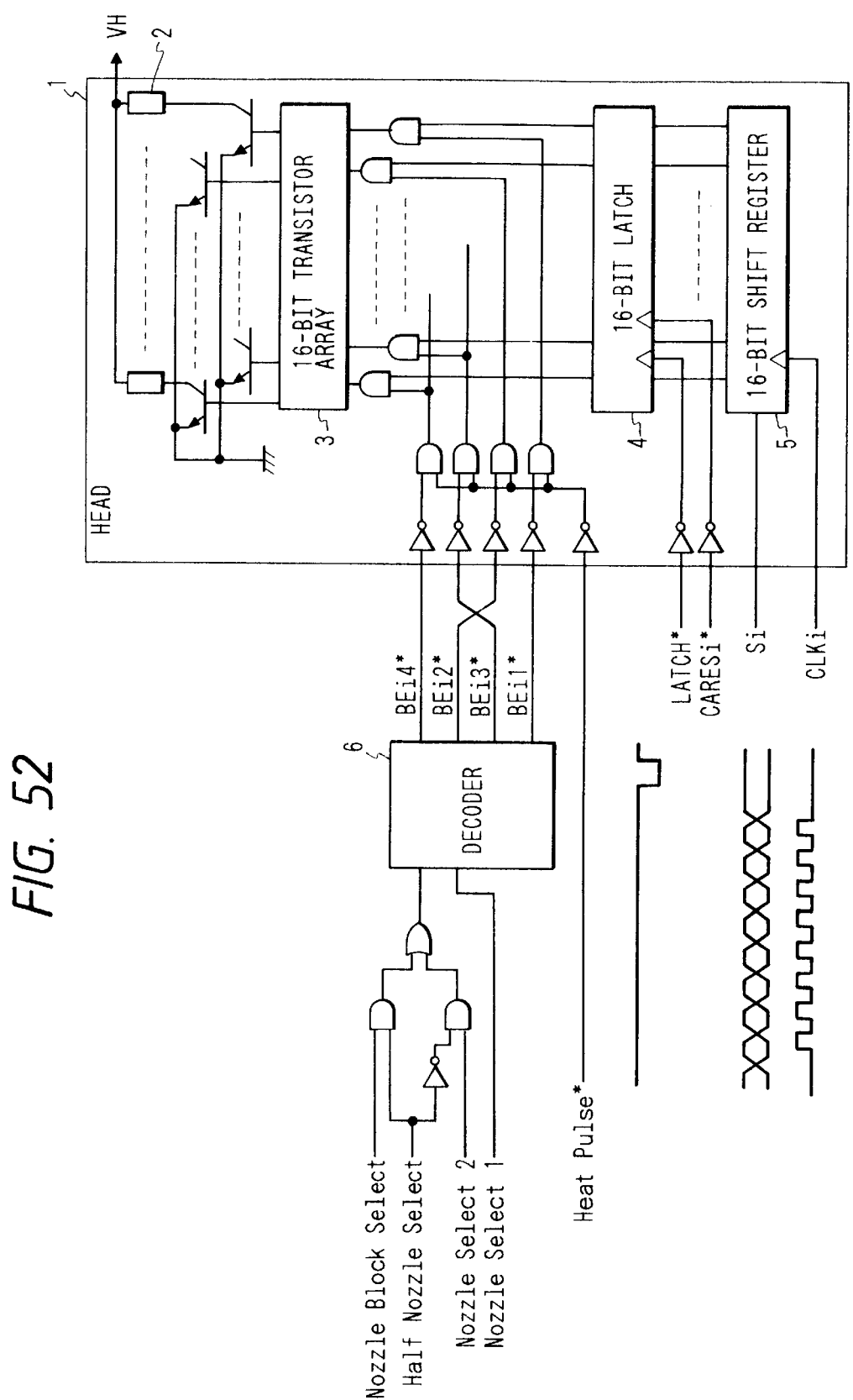
FIG. 52 is a block diagram showing the arrangement of an electric circuit including a head unit according to the eleventh embodiment of the present invention.
Figure 53:
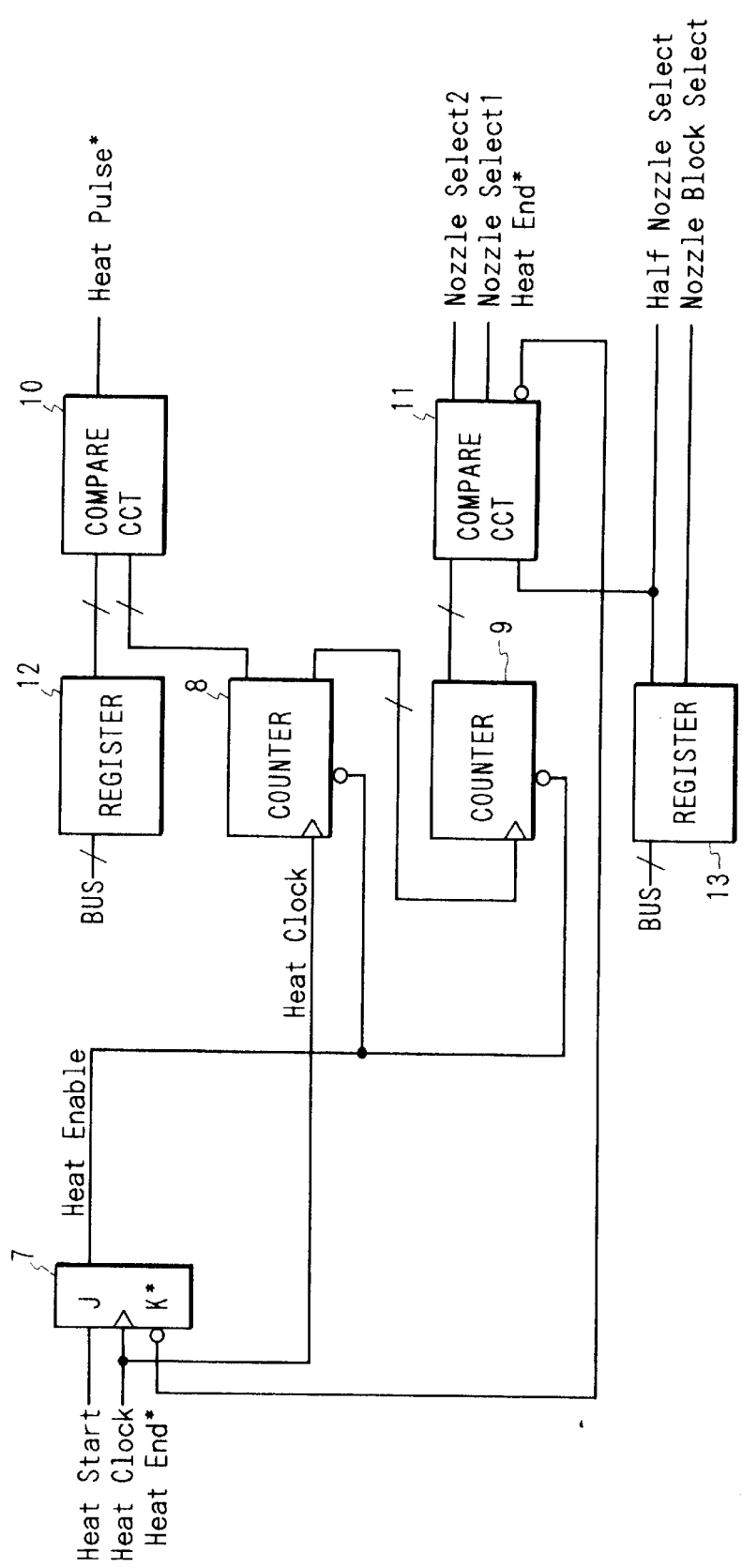
FIG. 53 is a block diagram showing the arrangement of an electric circuit including a signal processing system according to the eleventh embodiment.
Figure 54:
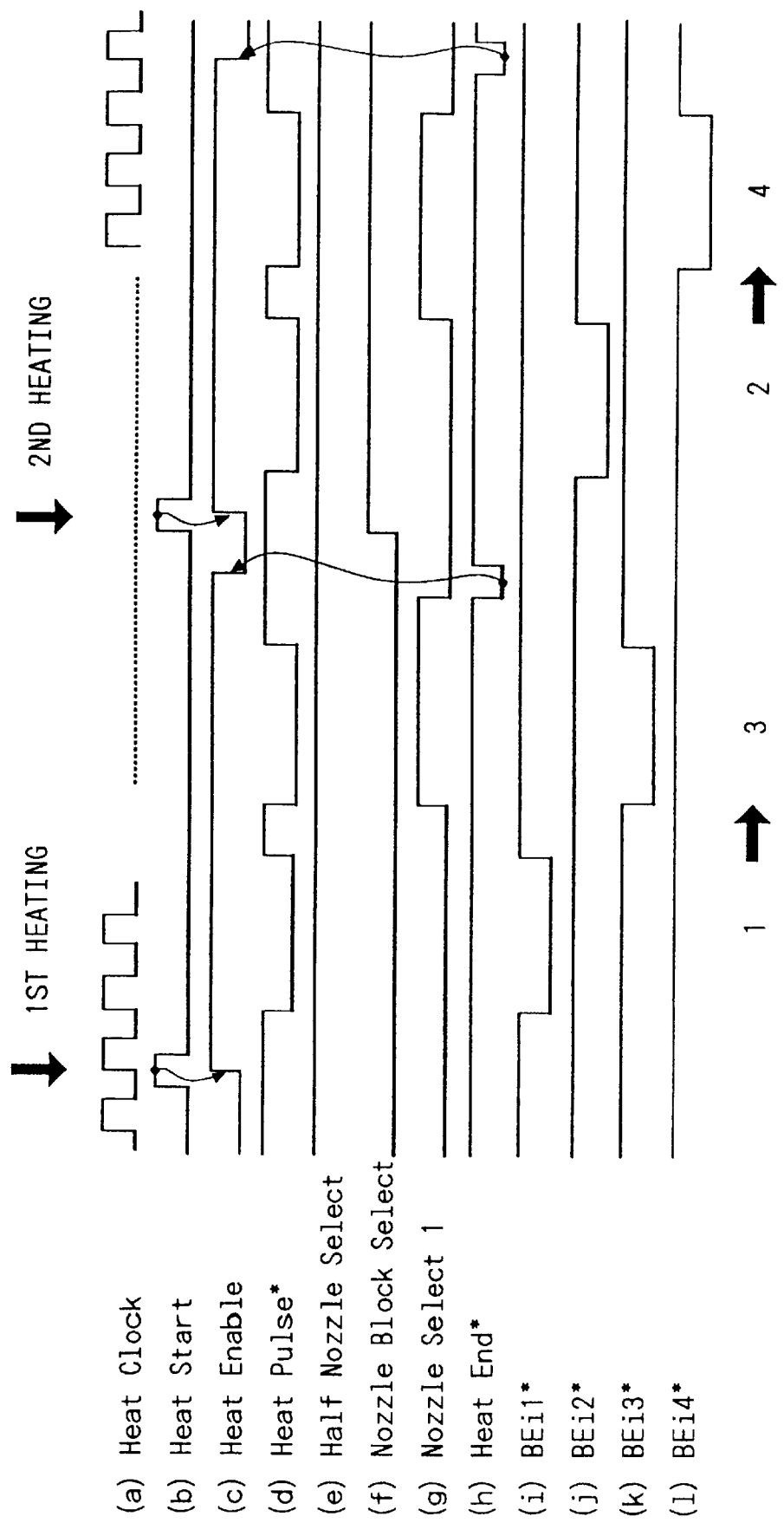
FIG. 54 is a timing chart according to the eleventh embodiment.
Figure 79:
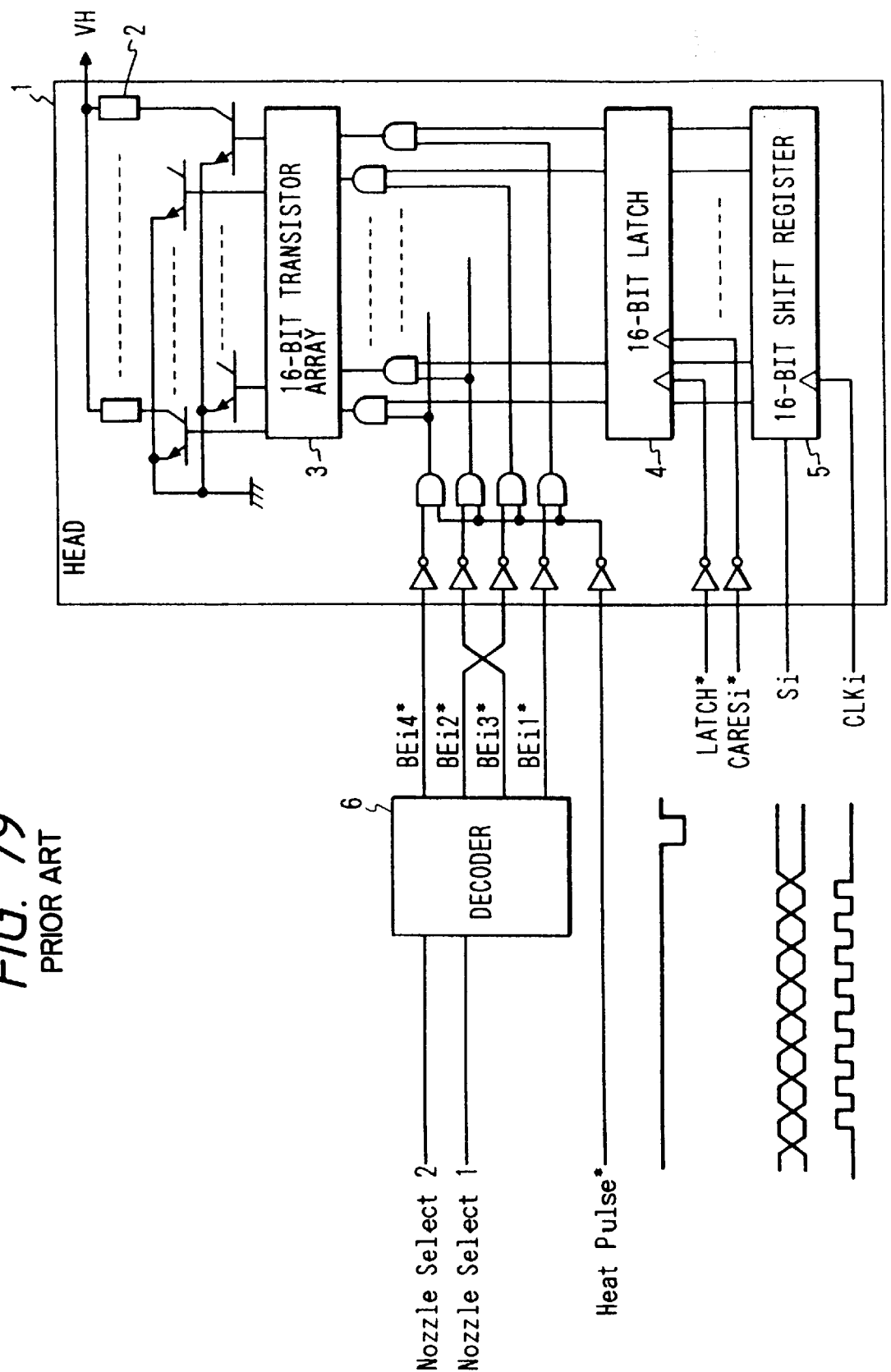
FIG. 79 is a block diagram showing the arrangement of a conventional electric circuit including a head unit.
Figure 80:
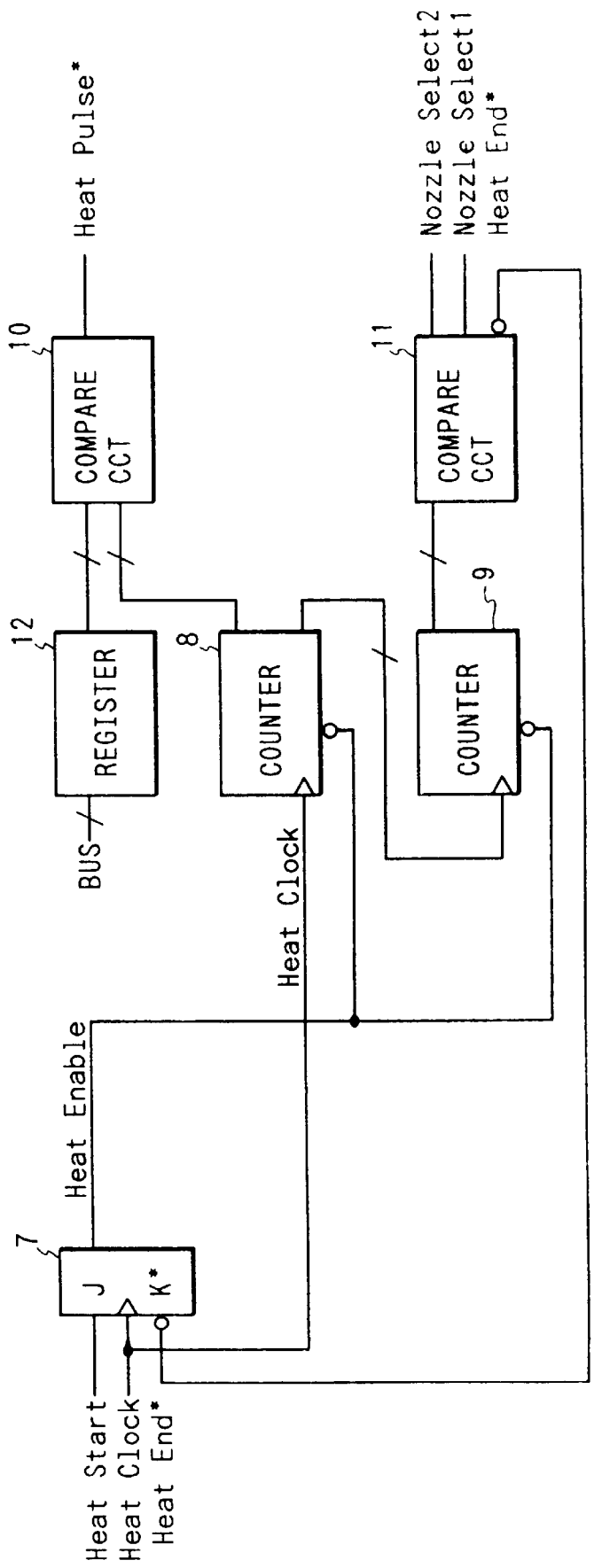
FIG. 80 is a block diagram showing the arrangement of a conventional electric circuit including a signal processing system.
Figure 81:
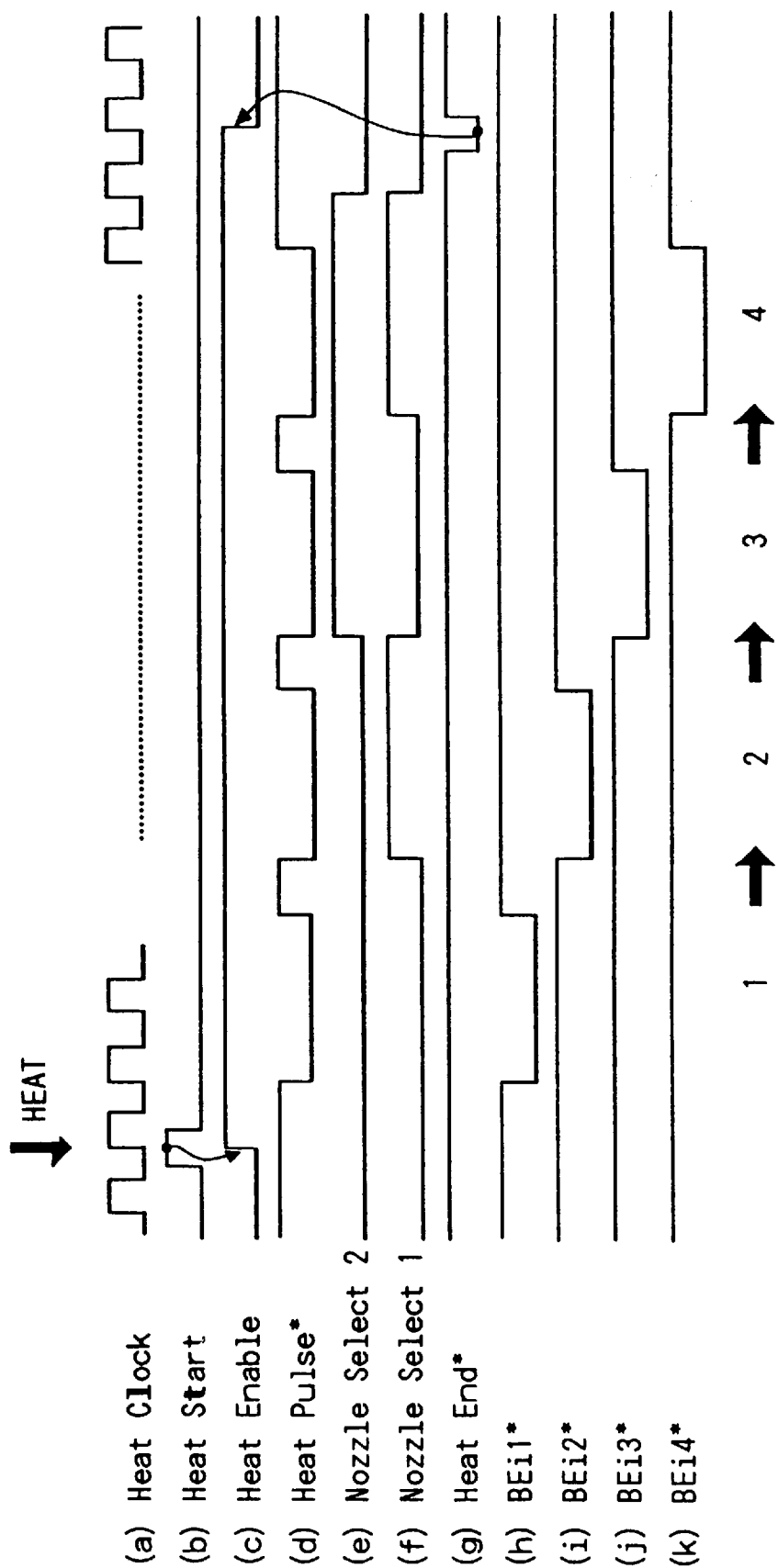
FIG. 81 is a timing chart according to a conventional electric circuit.

FIGS. 52 and 53 are block diagrams showing electric circuits for enabling the printing method of this embodiment, and FIG. 54 is a timing chart showing signal waveforms of the individual parts. Note that the same reference numerals as in FIGS. 79 to 81 denote the same parts in FIGS. 52 to 54. The head 1 sets print data Si in a 16-bit shift register 5 in accordance with a print data sync clock CLKi. Enable signals $BEi1^*$, $BEi2^*$, $BEi3^*$, and $BEi4^*$ are switched on to drive a transistor array 3 of the head 1, thereby causing 16 heaters to generate heat in units of four heaters to perform printing.

In this circuit, decoder outputs for selecting a divided block of the head 1 are connected in an order of $BEi1^*$, $BEi2^*$, $BEi3^*$, and $BEi4^*$, which is different from the order of the conventional circuit. That is, output timings of $BEi2^*$ and $BEi3^*$ are reversed from those of the conventional circuit.

A heat operation is started by a heat start signal ((b) in FIG. 54), and a heat enable signal ((c) in FIG. 54) is kept HIGH during a recording head drive period. During the period in which the heat enable signal is HIGH, counters 8 and 9 are counted up in accordance with a heat clock signal. The value of the counter 8 causes a comparator 10 to generate a heat pulse$^*$ signal for driving the head 1. The comparator 10 keeps generating the heat pulse$^*$ signal ((d) in FIG. 54) until a pulse width set in a register 12 coincides with the count. When the content coincides with the set value, the comparator 10 switches the heat pulse$^*$ signal to LOW.

The counter 9 is counted up for each cycle of the counter 8 to cause a comparator 11 to generate a nozzle select1 signal ((g) in FIG. 54) for selecting a divided block of the recording head. A half nozzle select signal ((e) in FIG. 54) is a control signal for obtaining two pulses as an output from the comparator 11 which generates four pulses during one heat operation in the conventional circuit. When the half nozzle select signal is at HIGH, the comparator 11 generates two pulses and then a heat end$^*$ signal ((h) in FIG. 54) to end the heat operation.

The half nozzle select signal also switches on/off a nozzle select2 signal supplied to a decoder 6 and selects a divided block by this signal, together with a nozzle block select signal ((f) in FIG. 54), such that $BEi1^*$ ((i) in FIG. 54) and $BEi3^*$ ((k) in FIG. 54) or $BEi2^*$ ((j) in FIG. 54) and $BEi4^*$ ((1) in FIG. 54) is output. Note that in order to perform normal recording, the half nozzle select signal is set at LOW. As a result, the nozzle select1 signal and the nozzle select2 signal are supplied to the decoder 6, and the enable signals $BEi1^*$, $BEi3^*$, $BEi2^*$, and $BEi4^*$ are output in this order.

In this embodiment, the half nozzle select signal is set at HIGH to perform the first heat operation. In the first heat operation, since the nozzle block select signal selects $BEi1^*$ and $BEi3^*$, heating is performed in an order of 1–3 with two pulses. In the second heat operation, the nozzle block select signal selects $BEi2^*$ and $BEi4^*$, so nozzles are heated in an order of 2–4.

Figure 55B:
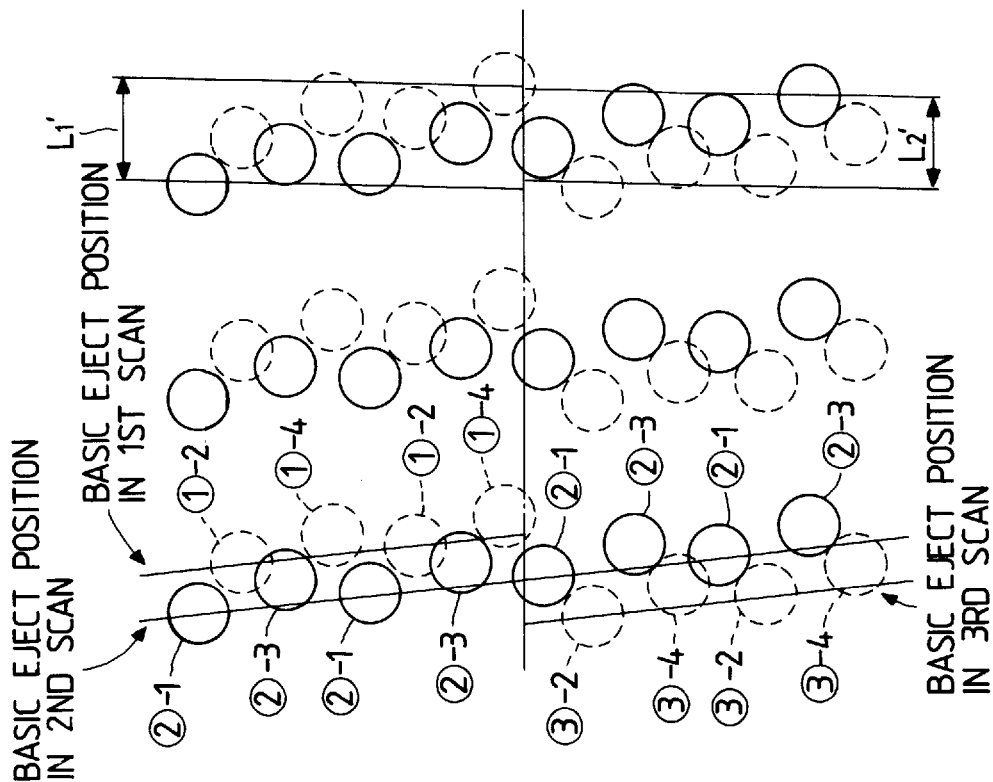
FIGS. 55A and 55B are views showing images recorded by the recording method shown in FIG. 83 according to the eleventh embodiment.
Figure 55A:
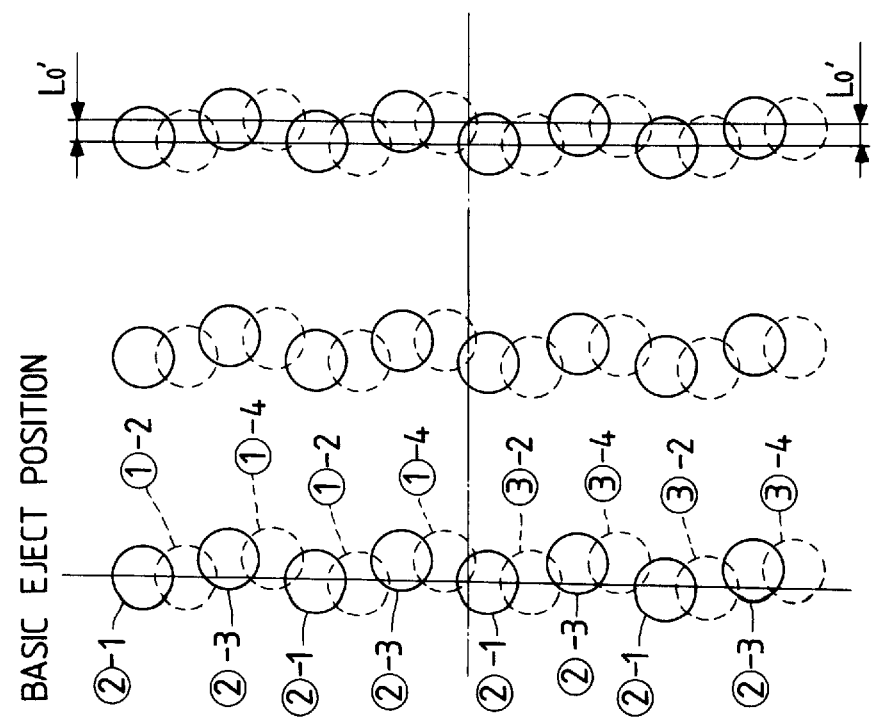
Figure 87B:
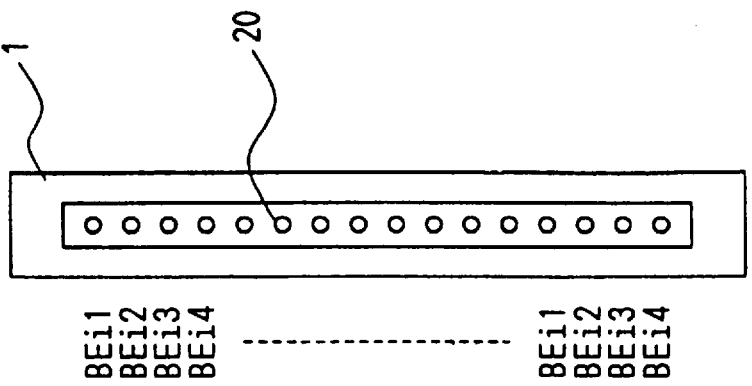
FIGS. 87A and 87B are views showing manners of grouping eject orifices of a recording head.
Figure 87A:
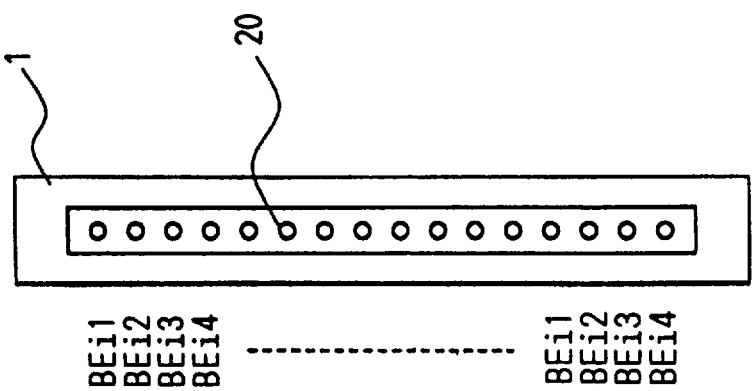
Figure 86:
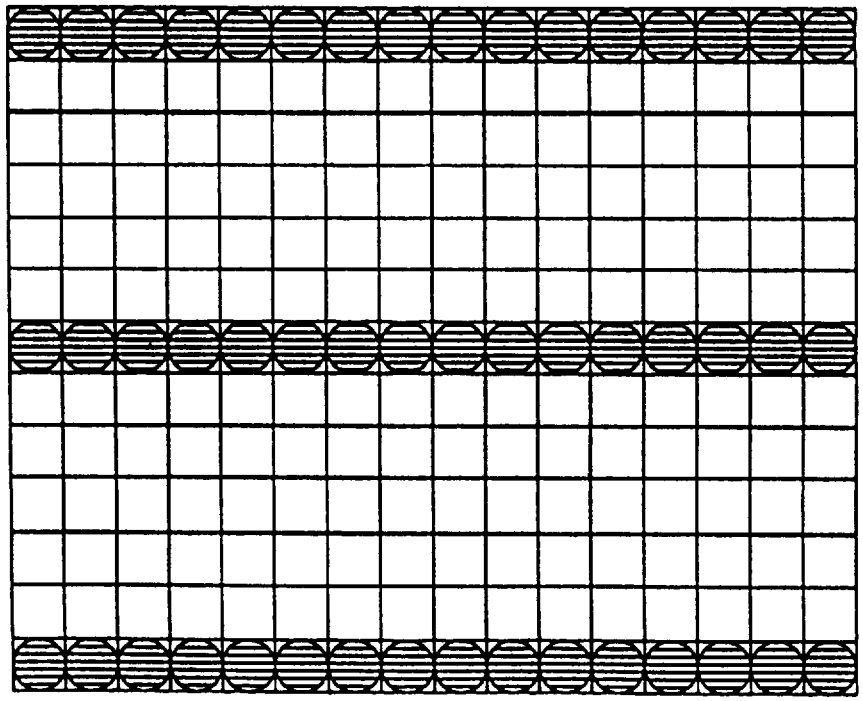
FIG. 86 is a view showing a pattern of an image to be recorded.
Figure 88A:
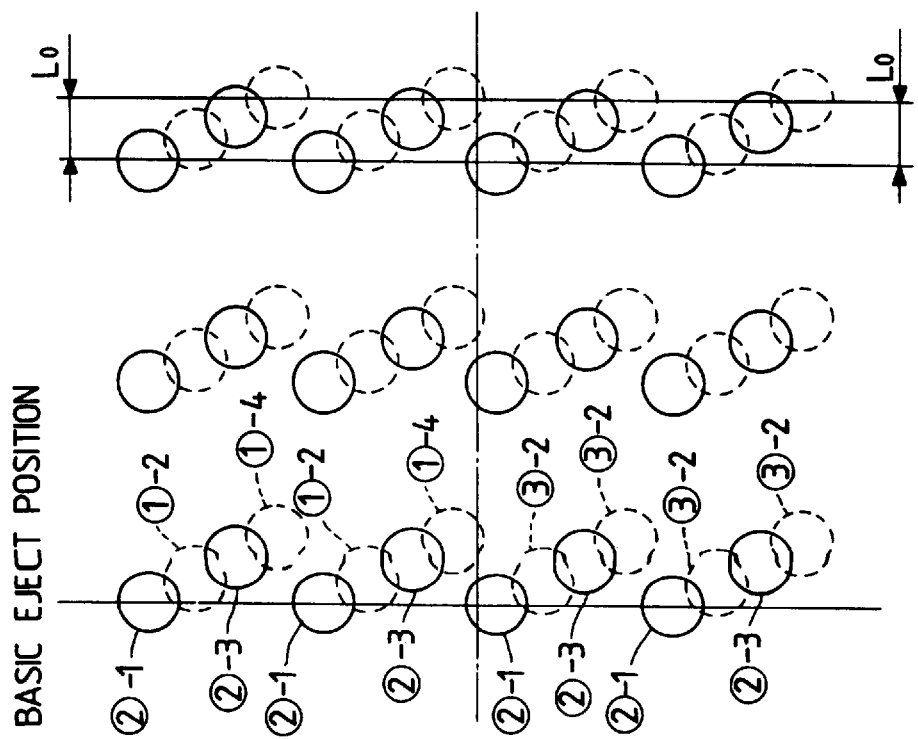
FIGS. 88A and 88B are views showing conventional images recorded by the recording method shown in FIG. 83.
Figure 88B:
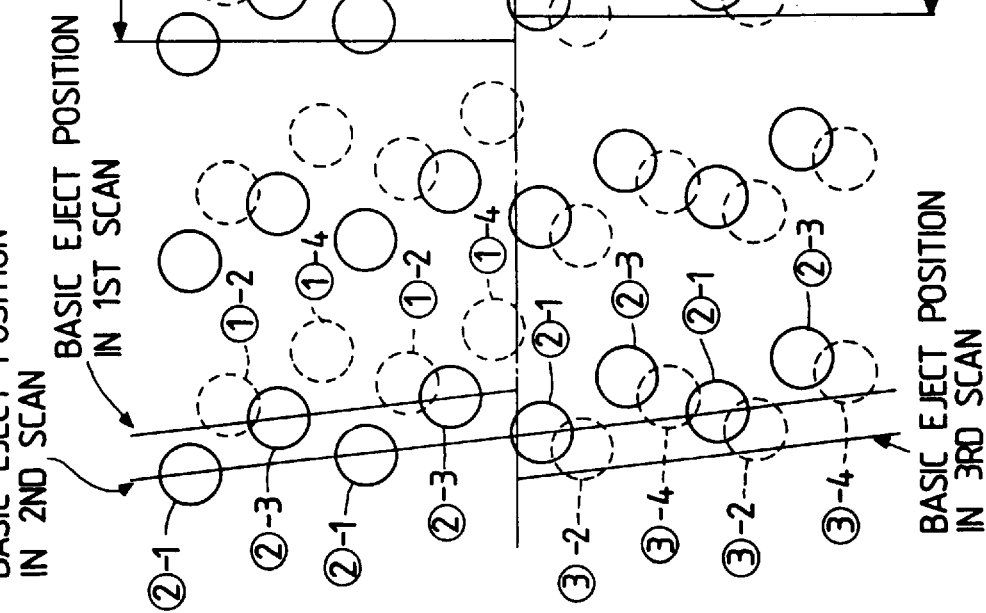
Figure 89B:
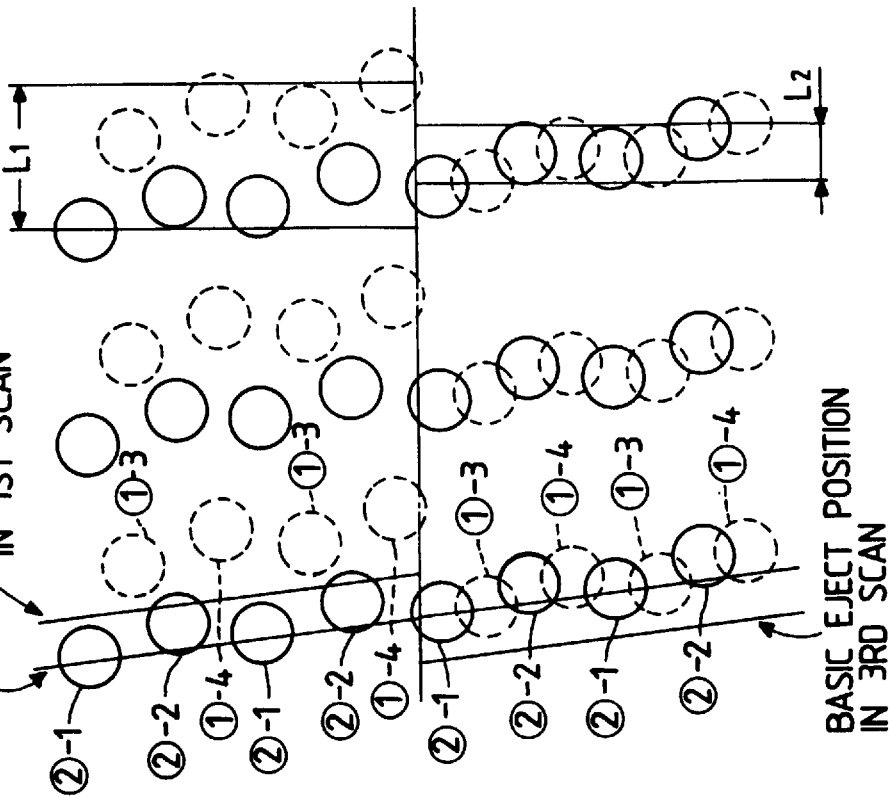
FIGS. 89A and 89B are views showing other conventional images recorded by the recording method shown in FIG. 83.
Figure 89A:
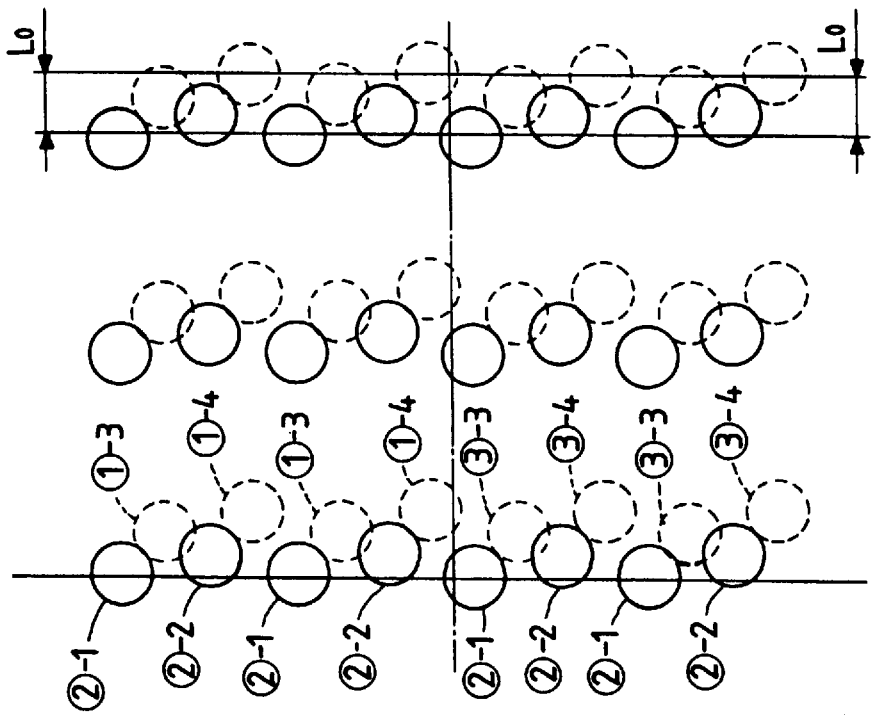
Figure 90B:
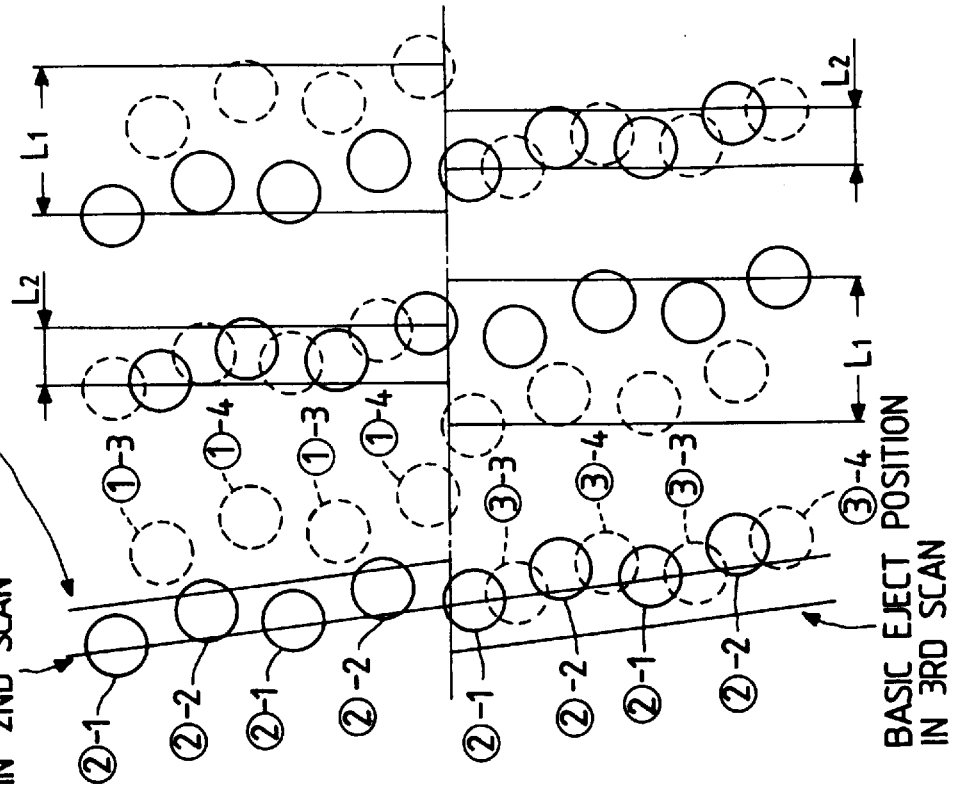
FIGS. 90A and 90B are views showing conventional images recorded by the recording method shown in FIG. 84.
Figure 90A:
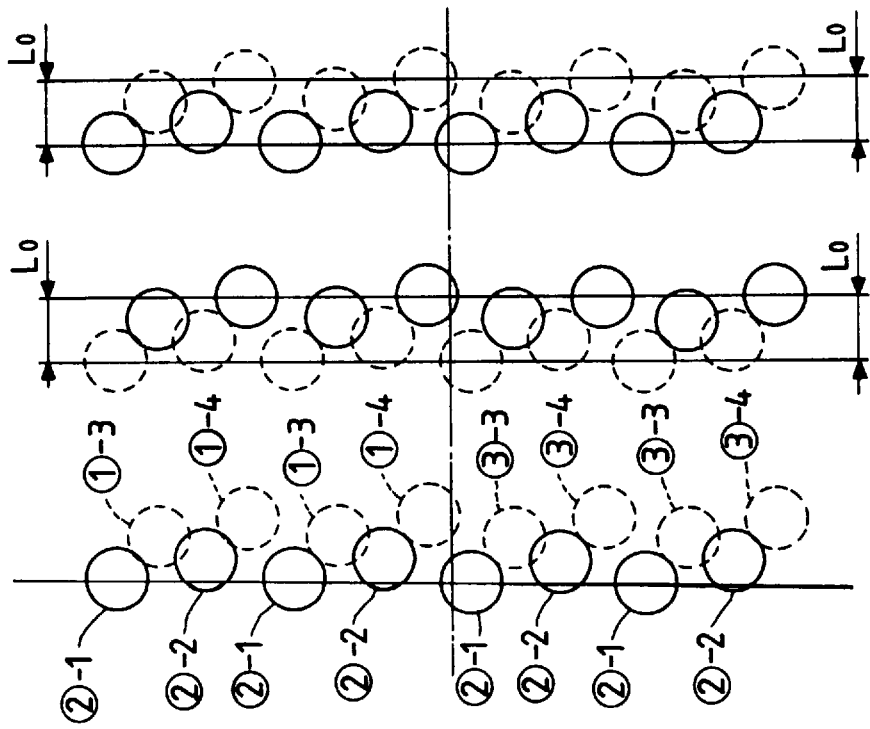

FIGS. 55A and 55B show the results of printing of the image shown in FIG. 86 according to the recording method shown in FIG. 83 at the time the eject orifices are divided as shown in FIG. 87A. FIG. 55A illustrates the result obtained when the head is not inclined, and FIG. 55B illustrates the result obtained when the head is inclined due to a mounting error or the like. Note that dots ①, ②, and ③ are formed in the first, second, and third scan operations, respectively, and each suffix indicates the number of a divided block. A deviation $L'_0$ is given by $L'_0 = \Delta T'v$ where $\Delta T'$ is the time difference between the heat signal generation timings of the divided block BEi1 or Bei2 and the divided block BEi3 or Bei4, and $v$ is the scan rate of the recording head.

In this embodiment, since the four blocks are subjected to two-divided driving in units of two blocks for ejecting inks, the difference between the heat timings is decreased to improve reproducibility of fine lines, as compared with four-divided driving of the conventional example. In addition, when the head is inclined as shown in FIG. 55B, deviations $L'_1$ and $L'_2$ are produced due to a time difference between the heat signal generation timings of the divided blocks and a variation in basic ejection positions caused by the inclination of the head. However, these deviations satisfy a relation $L'_2 \leq L'_1$, i.e., the difference is much smaller than that in the conventional example. Therefore, since dots are not scattered nor concentrated in the individual equally divided areas, no dense and sparse patterns are generated. This makes it possible to perform high-quality image recording free from stripe-like density variations.

Figure 56B:
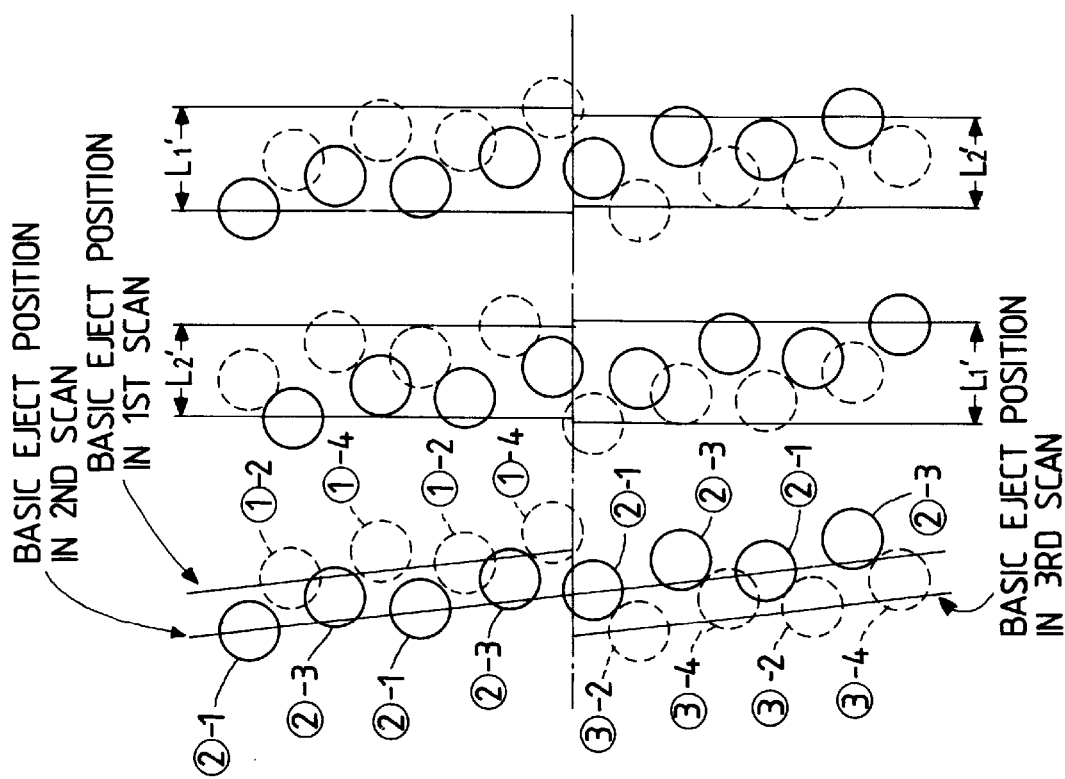
FIGS. 56A and 56B are views showing images recorded by the recording method shown in FIG. 84 according to the eleventh embodiment.
Figure 56A:
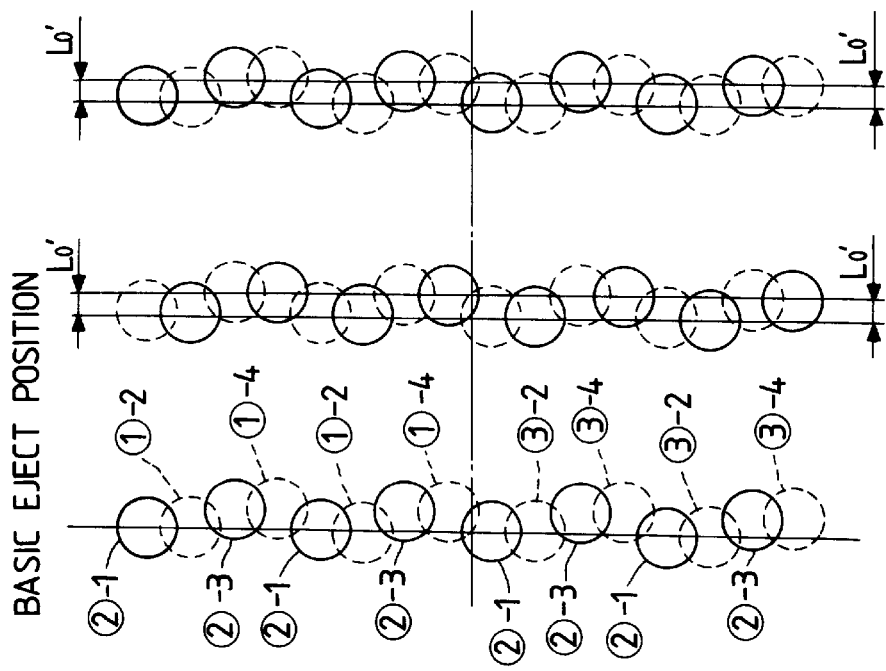

FIGS. 56A and 56B show the results of recording of the image shown in FIG. 86 according to the recording method shown in FIG. 84 at the time the eject orifices are divided as shown in FIG. 87A. FIG. 56A illustrates the result obtained when the head is not inclined, and FIG. 56B shows that obtained when the head is inclined.

When the head is not inclined as shown in FIG. 56A, the deviation $L'_0$ is small, and the reproducibility of fine lines is improved by two-divided driving as compared with the conventional example. Even when the head is inclined as shown in FIG. 56B, the deviations caused by the heat timing difference satisfy $L'_2 \leq L'_1$, i.e., the difference between them is very small. Therefore, an unpleasant texture which leads to degradation in image quality does not occur, and this enables high-quality image recording.

(12th Embodiment)

Figure 57:
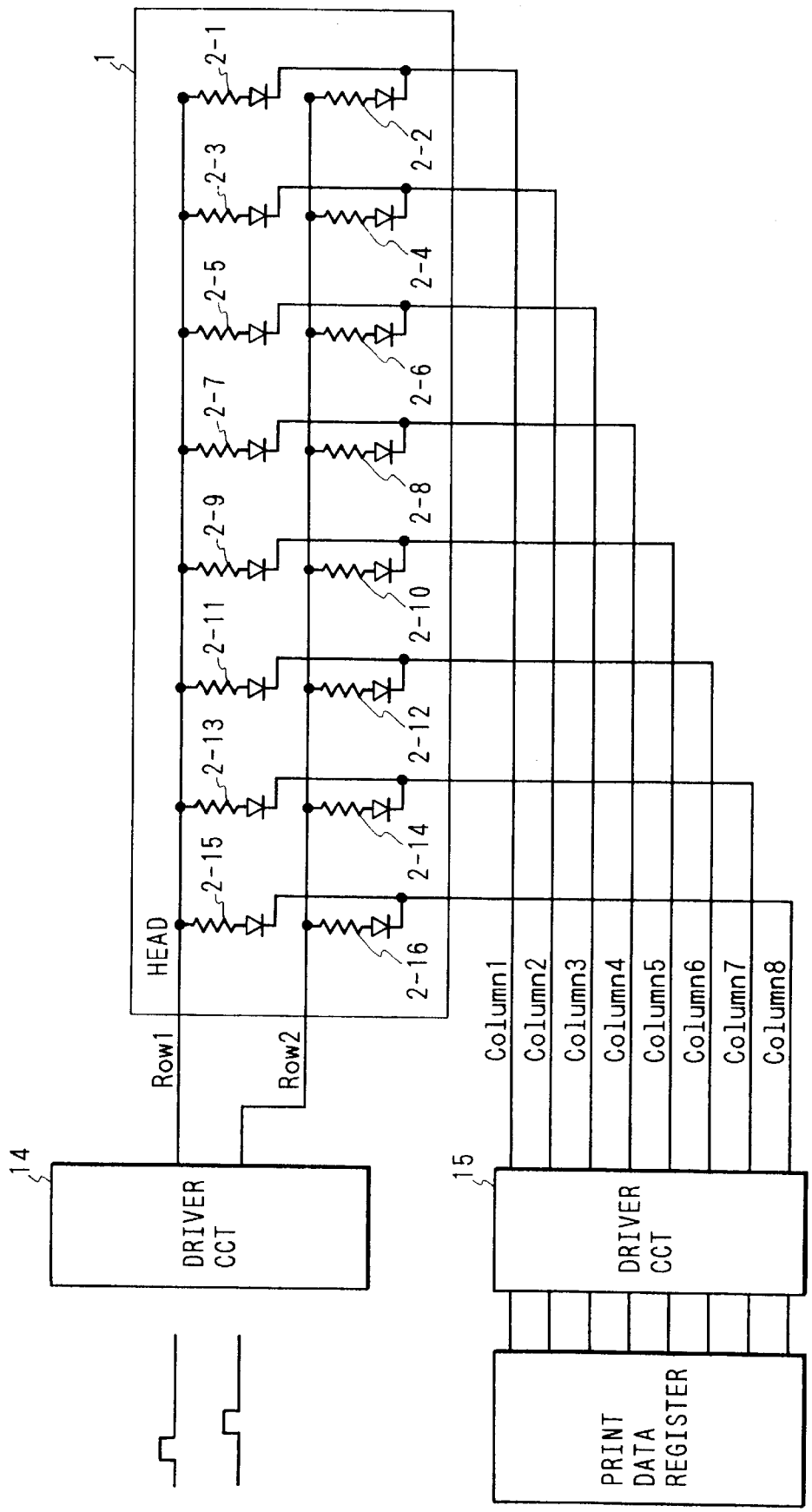
FIG. 57 is a block diagram showing the arrangement of an electric circuit according to the twelfth embodiment of the present invention.

FIG. 57 is a block diagram showing an electric circuit according to the twelfth embodiment of the present invention.

A head 1 shown in FIG. 57 is constituted by a diode matrix of 2 rows × 8 columns. In accordance with HIGH of row1 and row2 signals output from a driver circuit 14 and LOW of column1 to column8 signals output from a driver circuit 15, corresponding heaters 2-1 to 2-16 are heated. The driver circuit 15 receives a signal corresponding to record data from a print data register 16.

FIG. 58 is a timing chart according to this embodiment. Referring to FIG. 58, when the row1 signal ((a) in FIG. 58) is HIGH, the heaters 1, 3, 5, 7, 9, 11, 13, and 15 are heated simultaneously in accordance with the column1 to column8 signals ((c) to (j) in FIG. 58). When the row2 signal ((b) in FIG. 58) is HIGH, the heaters 2, 4, 6, 8, 10, 12, 14, and 16 are heated simultaneously in accordance with the column1 to column8 signals.

Figure 60B:
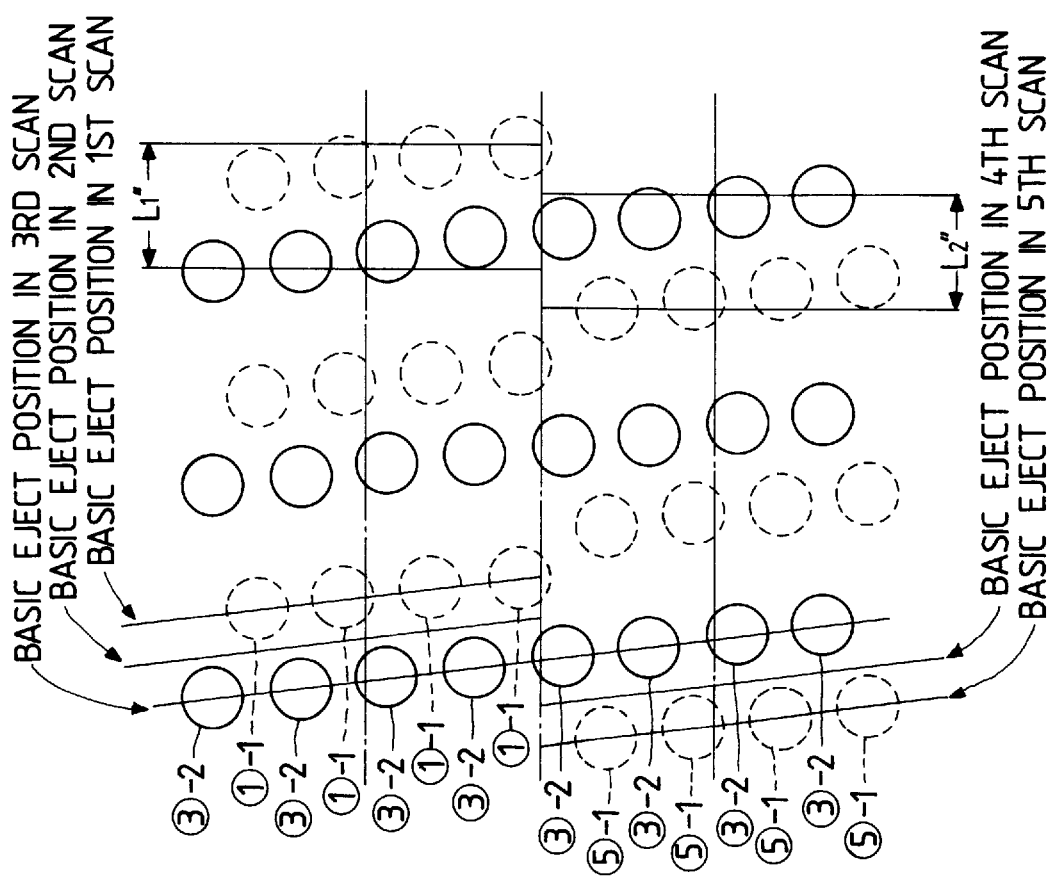
FIGS. 60A and 60B are views showing images recorded by the signal control shown in FIG. 59.
Figure 60A:
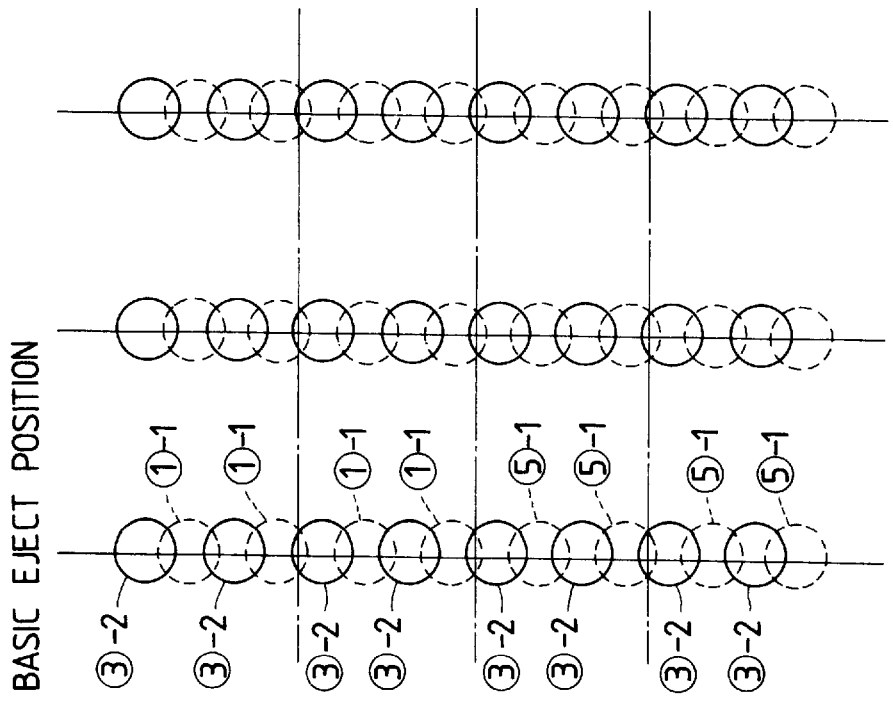
Figure 82A:
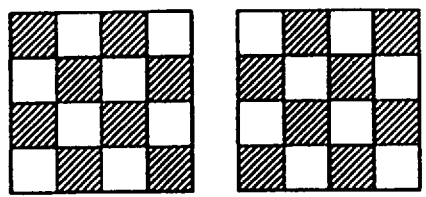
FIGS. 82A to 82C are views showing mask patterns for masking a signal to be recorded.
Figure 82B:
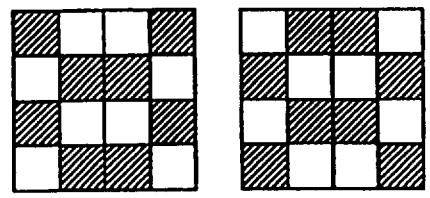
Figure 82C:
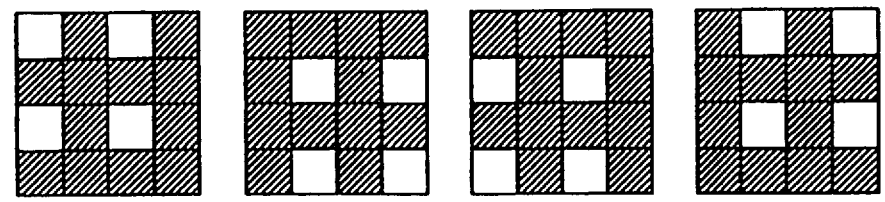

In the above arrangement, by controlling the row1 and row2 signals in each scan operation as shown in FIG. 59, it is possible to perform recording similar to that performed when record data is masked through the mask patterns shown in FIG. 82C. FIGS. 60A and 60B show the results of printing of the image shown in FIG. 86 according to the recording method shown in FIG. 85. In this case, a 16-nozzle recording head is controlled in accordance with the signal control shown in FIG. 59, a recording medium is conveyed in units of lengths of four nozzles, and the image is recorded in units of four-nozzle-long areas while a scan operation is preformed four times.

In this embodiment, no time difference is present between the heat timings of the eject orifices. Therefore, when the recording head is not inclined as shown in FIG. 60A, the recorded dots are aligned straight. Even if the head is inclined, on the other hand, $L''_1 = L''_2$ is satisfied, i.e., no difference is present between the two deviations. Therefore, neither dense and sparse patterns which lead to image quality degradation nor an unpleasant texture occur, and this enables high-quality image recording.

Figure 61:
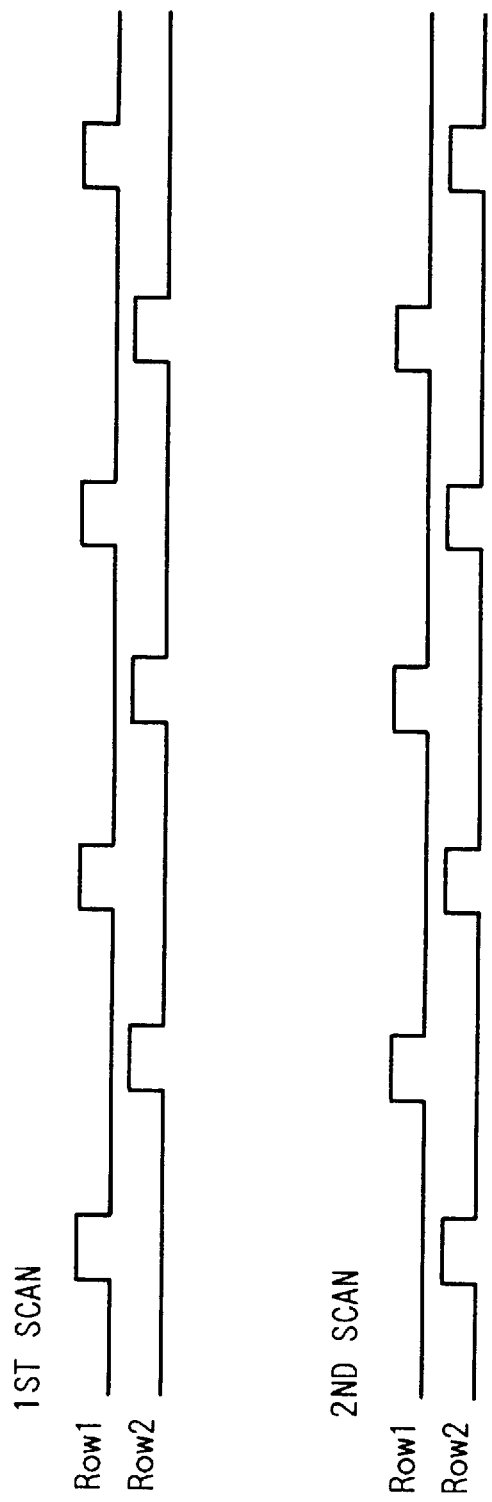
FIG. 61 is another timing chart for controlling the electric circuit shown in FIG. 57.
Figures 63A, 63B, 63C, 63D:
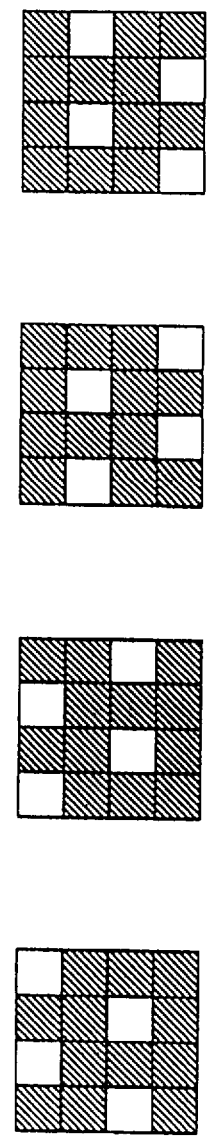
FIGS. 63A to 63D are views showing mask patterns for masking signals to be recorded.

Note that in this embodiment, recording similar to that performed when record data is masked by the mask patterns shown in FIG. 82A can be performed by controlling the row1 and row2 signals as shown in FIG. 61. As a result, an effect equal or superior to that obtained in the previous embodiment can be obtained.

(13th Embodiment)

In this embodiment, an image is recorded in units of lengths of areas obtained by equally dividing an eject orifice array of each recording head into four parts while a scan operation is performed four times by using different eject orifice arrays.

In this embodiment, a heat enable signal is set at HIGH so that only one pulse of a heat pulse* signal shown in FIGS. 52 and 53 is generated in one heat operation. In addition, a half nozzle select signal for switching on/off a nozzle select2 signal and a nozzle block select signal for selecting a divided block are similarly applied to a nozzle select1 signal, thereby selecting and heating one of divided blocks $BEi1^*$, $BEi2^*$, $BEi3^*$, and $BEi4^*$.

Figure 62B:
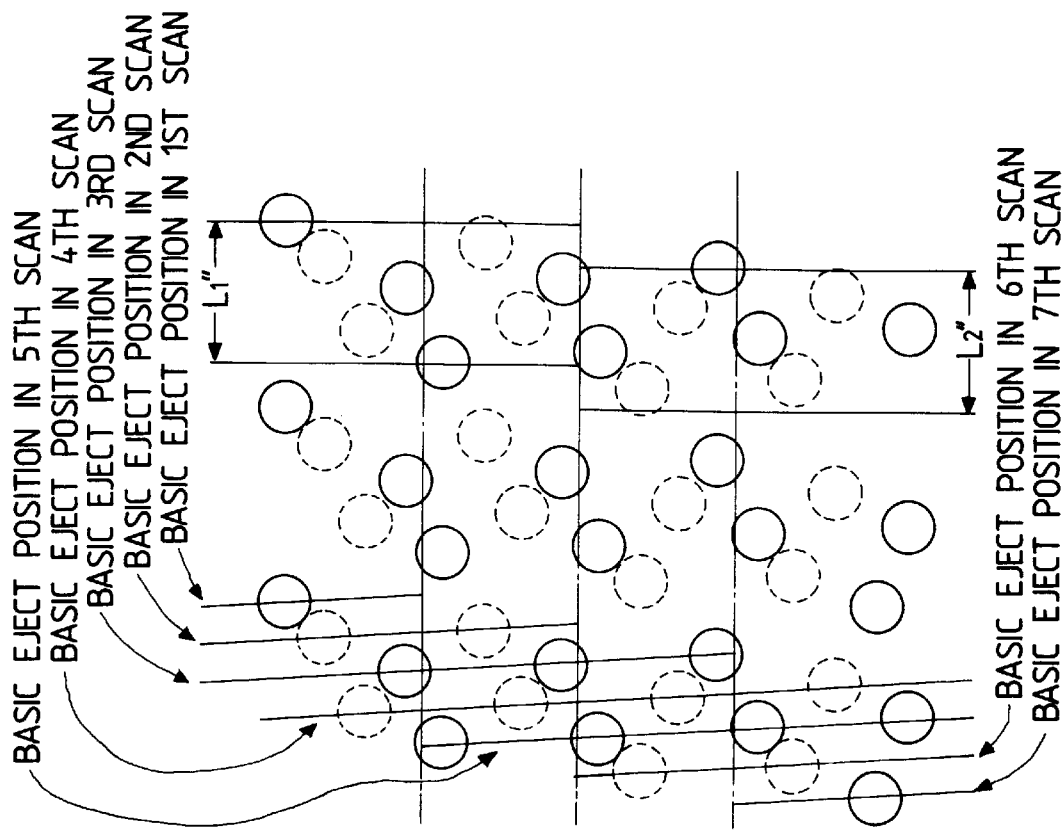
FIGS. 62A and 62B are views showing images recorded by the signal control according to the thirteenth embodiment.
Figure 62A:
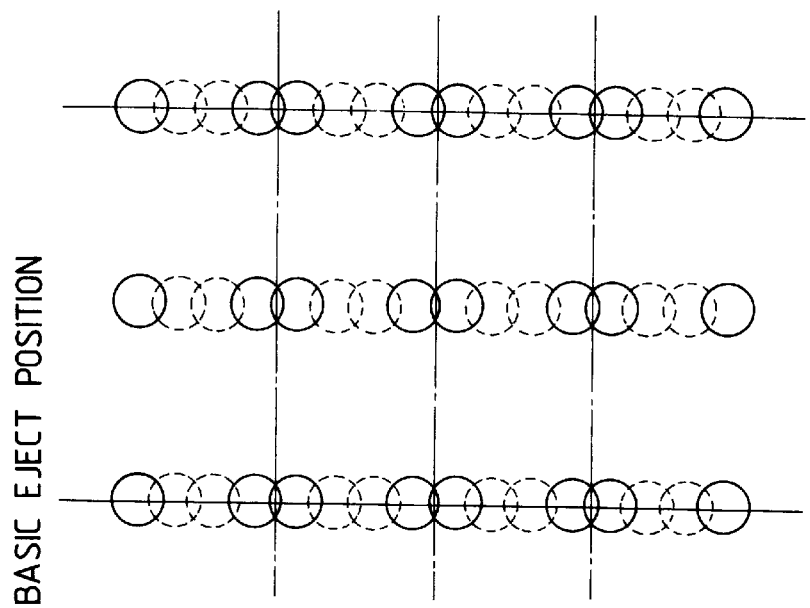
Figure 64:
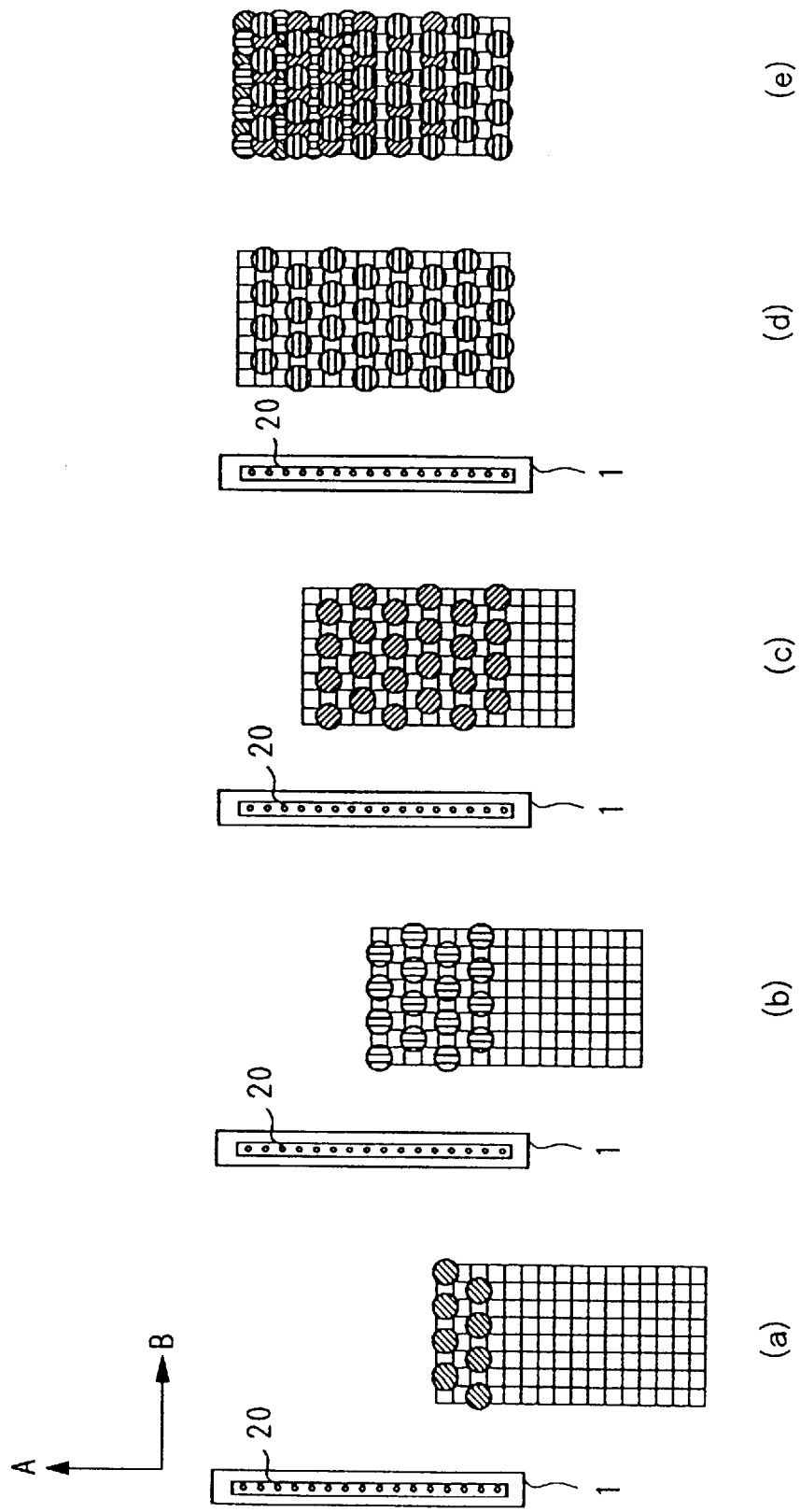
FIG. 64 is a view showing a method of performing recording by equally dividing an eject orifice array of a recording head into four parts.
Figure 66:
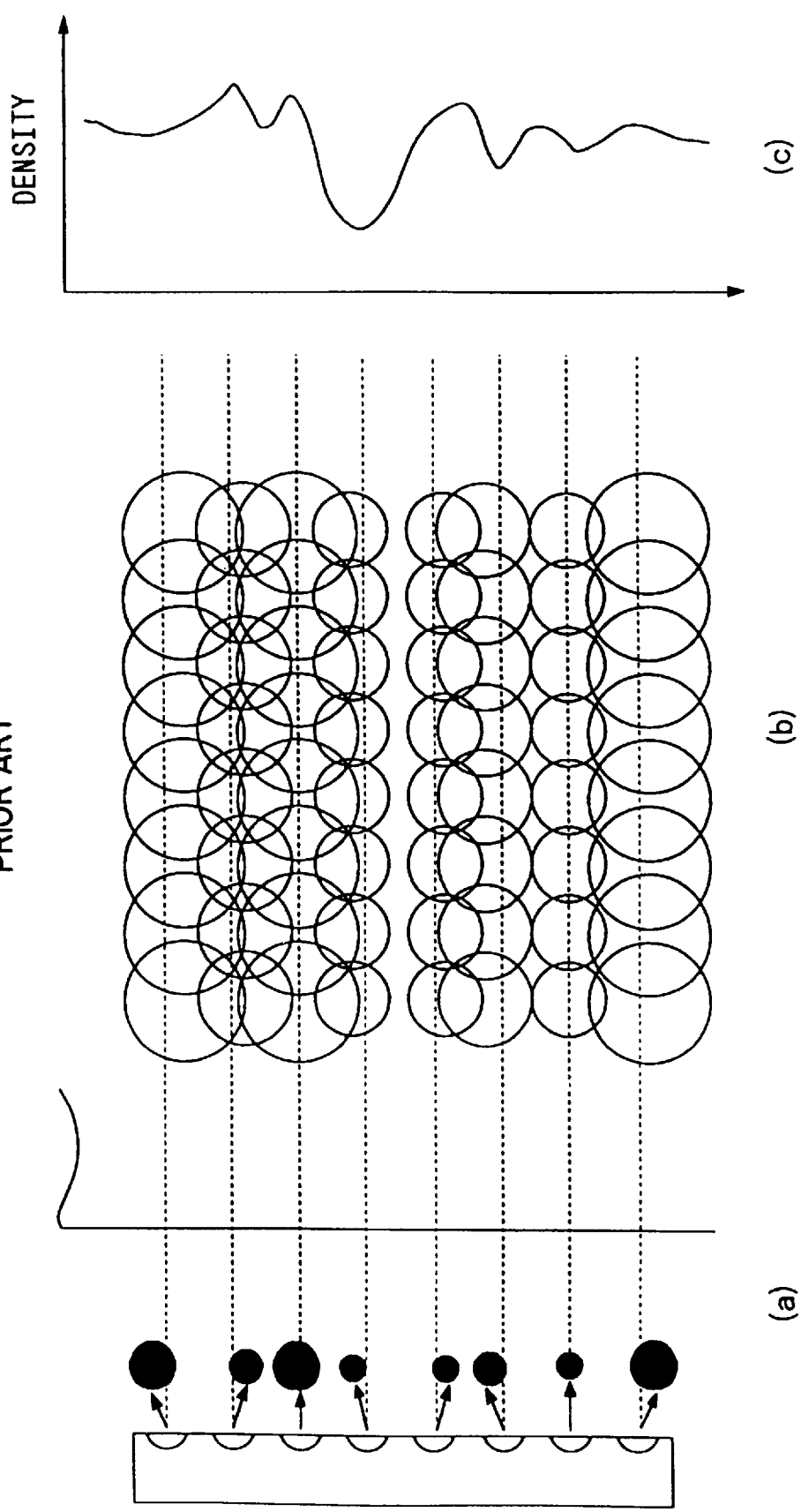
FIG. 66 is a view showing a condition of printing of an ink jet printer, in which a density variation occurs.
Figure 70:
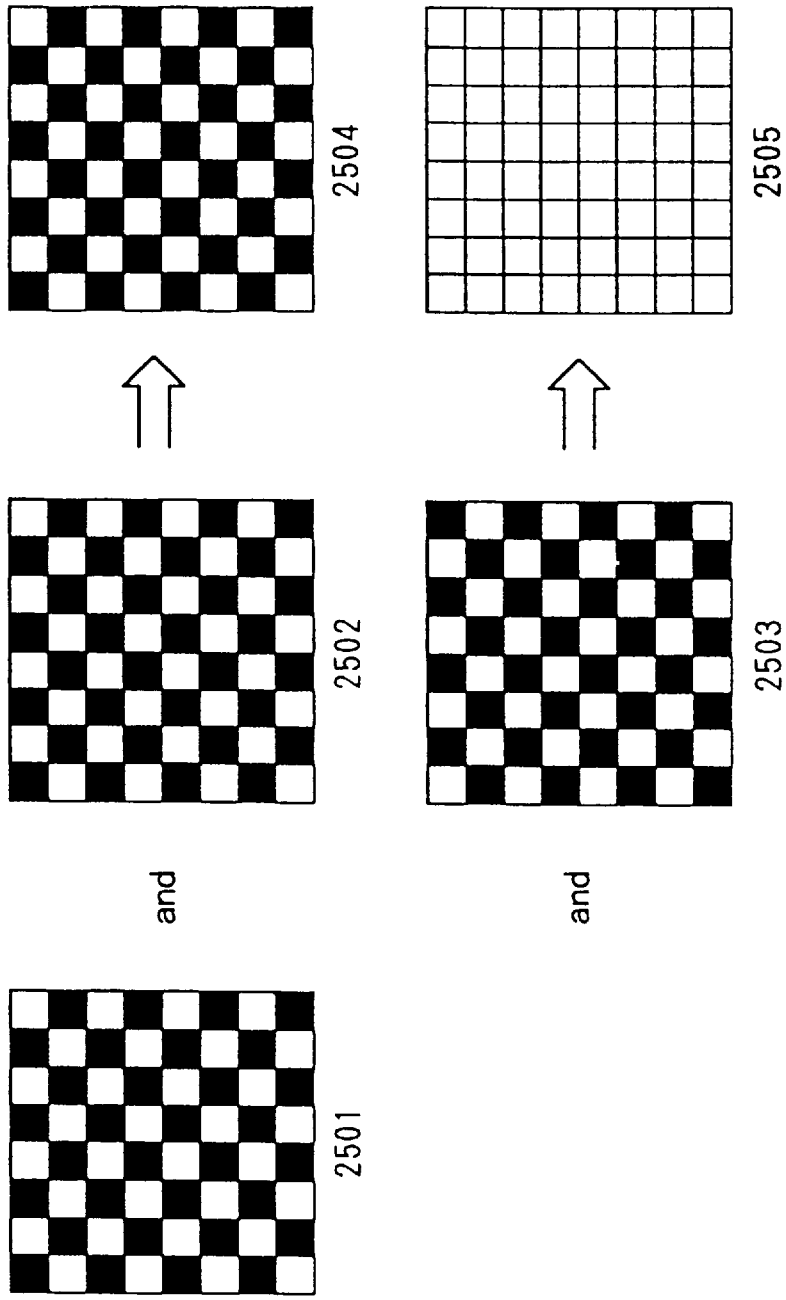
FIG. 70 is a view showing 50% data and printed dots obtained by conventional divisional printing.
Figure 71:
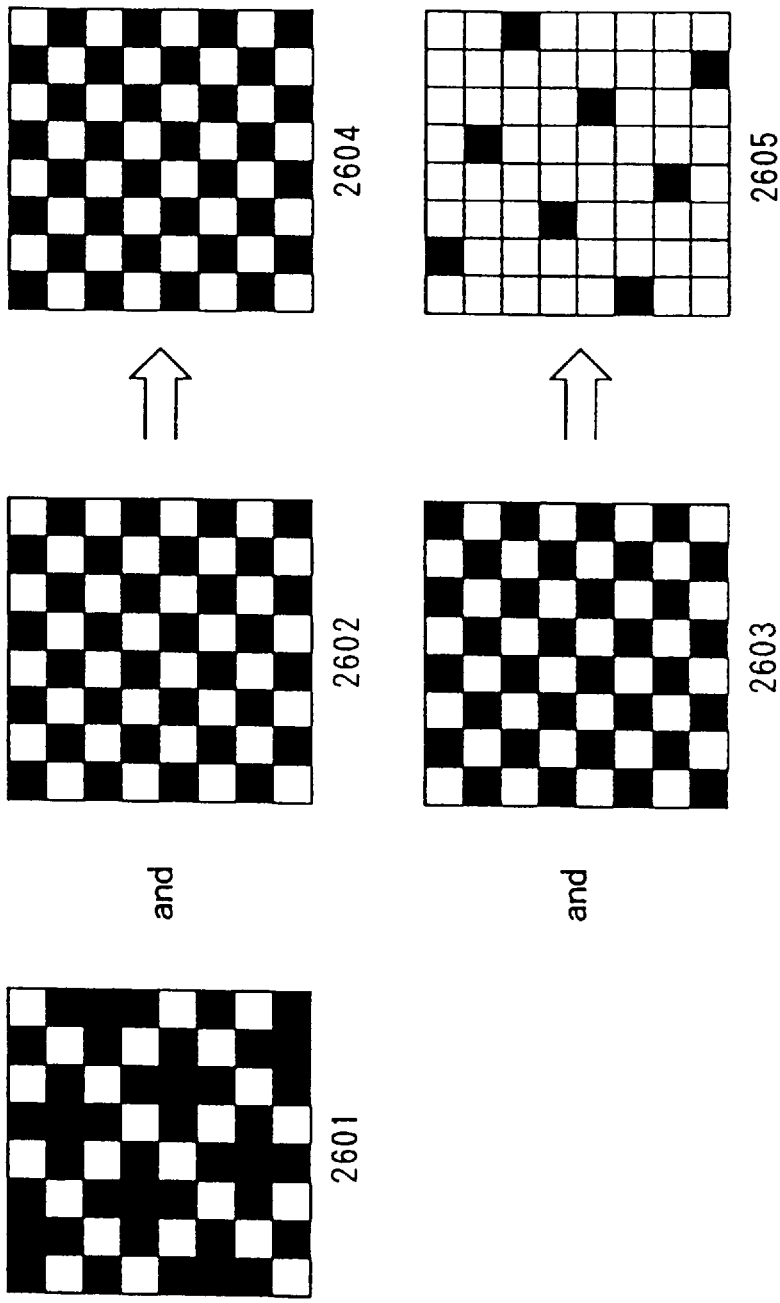
FIG. 71 is a view showing 63% data and printed dots obtained by conventional divisional printing.
Figure 72:
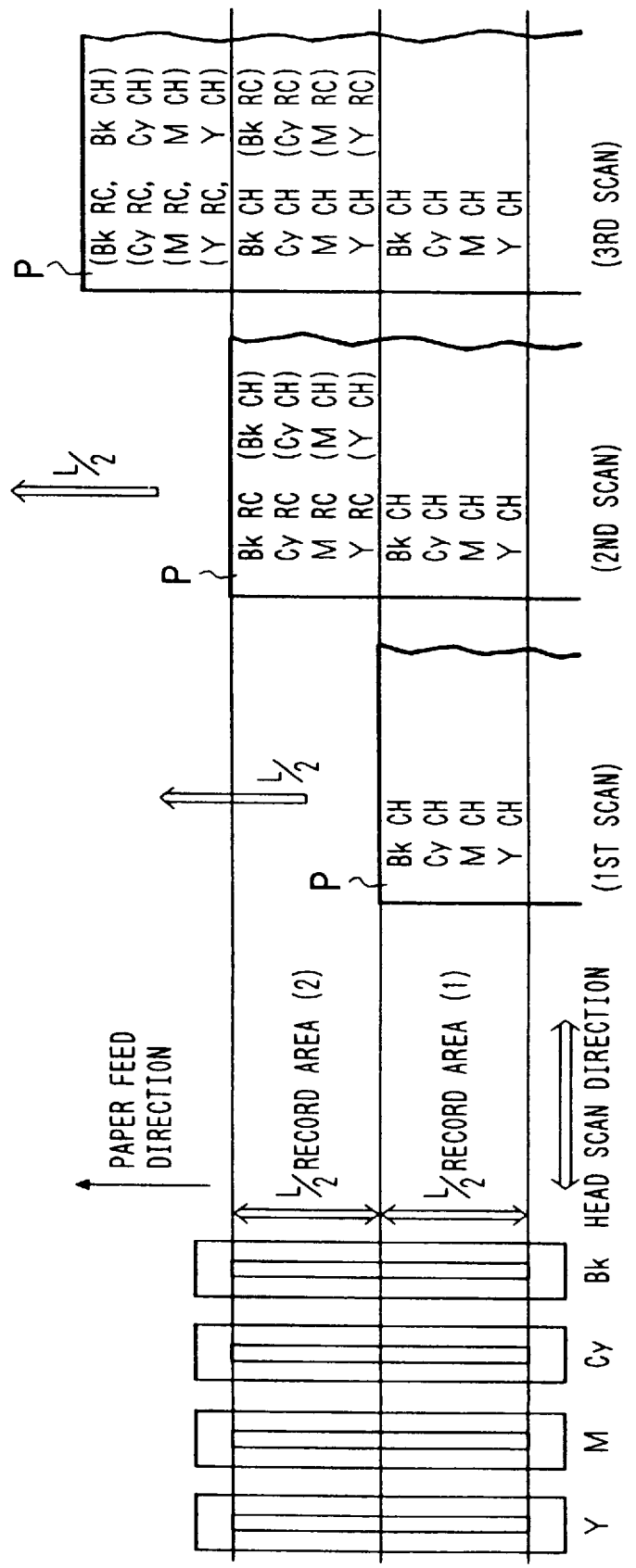
FIG. 72 is a view for explaining conventional divisional printing.

FIGS. 62A and 62B show the results of recording of the image shown in FIG. 86 performed in accordance with a recording method shown in FIG. 64 by using mask patterns shown in FIGS. 63A to 63D. In this recording method, no time difference is present between the heat timings of the eject orifices. Therefore, when the recording head is not inclined as shown in FIG. 62A, the recorded dots are aligned straight. Even if the head is inclined, on the other hand, $L''_1 = L''_2$ is satisfied as shown in FIG. 62B, i.e., there is no difference between the two deviations. Therefore, an unpleasant texture which leads to degradation in image quality does not occur, and this makes it possible to perform high-quality image recording.

The present invention achieves its significant effects in ink jet recording systems, particularly recording heads or recording apparatuses using thermal energy to eject an ink.

As the representative arrangement or principle of the apparatus, it is preferred to use the basic principle disclosed in, e.g., U.S. Pat. No. 4,723,129 or 4,740,796. This system can be applied to either a so-called on-demand type or continuous type. At least one drive signal which corresponds to information to be recorded and can cause a rapid temperature rise exceeding nucleate boiling is applied to electrothermal energy conversion elements arranged in correspondence with sheets or liquid channels containing a liquid (ink), thereby causing at least one electrothermal energy conversion element to generate thermal energy. This induces film boiling on the heat acting surface of the recording head to form a bubble in the liquid (ink) in a one-to-one correspondence with the drive signal. The liquid (ink) is ejected by growth and contraction of the bubble through the opening of an eject orifice, thereby forming at least one droplet. The use of a pulsed drive signal is more preferable because growth and contraction of a bubble are performed instantaneously and properly, and this achieves ejection of a liquid (ink) with excellent response characteristics. Proper examples of this pulsed drive signal are described in U.S. Pat. Nos. 4,463,359 and 4,345,262. Note that further excellent recording can be performed by using the conditions described in U.S. Pat. No. 4,313,124 which is the invention about a temperature rise rate on the heat acting surface described above.

The arrangement of the recording head is not limited to the combination (linear liquid channel or right-angle liquid channel) of an eject orifice, a liquid channel, and an electrothermal energy conversion element as disclosed in each of the specifications cited above. For example, the present invention includes an arrangement disclosed in U.S. Pat. No. 4,558,333 or 4,459,600, in which a heat acting portion is arranged in a flexible area. In addition, the present invention is also effective when using an arrangement disclosed in Japanese Laid-Open Patent Application No. 59-123670 in which a single slit is shared as an eject orifice by a plurality of electrothermal energy conversion elements, or an arrangement disclosed in Japanese Laid-Open Patent Application No. 59-138461 in which an opening for absorbing a pressure wave of thermal energy is formed opposite to an eject orifice.

What is claimed is:

1. An ink jet recording method for performing a first relative movement of a recording means for recording, the recording means having a plurality of recording elements for discharging ink droplets, relative to a recording medium in a main scan direction, the recording means recording an image corresponding to image data on the recording medium during the first relative movement, and thereafter performing a second relative movement of the recording medium relative to the recording means in a second direction that is different from the main scan direction, said method comprising the steps of:

selecting a set of thinning patterns which are complementary to each other, the thinning patterns corresponding to an area gradation pattern for processing the image data;

recording on a predetermined area of the recording medium a first thinned image corresponding to the image data which is processed based on the area gradation pattern, using a first thinning pattern of the set of thinning patterns selected in said selecting step, during the first relative movement of the recording means in the main scan direction; and recording on the predetermined area of the recording medium a second thinned image corresponding to the image data which is processed based on the area gradation pattern, using a second thinning pattern of the set of thinning patterns selected in said selecting step, the second thinned image being complementary to the first thinned image, wherein in said selecting step, the set of thinning patterns is selected from a plurality of thinning patterns to reduce a difference between a first number of dots recorded for the first thinned image and a second number of dots recorded for the second thinned image with regard to a gradation level reproducible by the area gradation pattern, without regard to the image data.

2. A method according to claim 1, wherein in said step of recording the first thinned image, the first thinned image is recorded using a first recording section of the recording means, and in said step of recording the second thinned image, the second thinned image is recorded using a second recording section of the recording means.

3. A method according to claim 2, further comprising a step of moving the recording medium relative to the recording means in a sub-scan direction by a distance that corresponds to the first recording section before starting recording of the second thinned image following recording of the first thinned image.

4. A method according to claim 1, wherein the recording means comprises a plurality of recording heads each having a plurality of recording elements, the recording heads respectively discharging different color ink droplets.

5. A method according to claim 1, wherein the area gradation pattern is based upon a dither method.

6. A method according to claim 1, wherein the recording means causes a change in ink conditions by using thermal energy to discharge ink droplets.

7. An ink jet recording apparatus for recording a color image on a recording medium using recording means for recording, the recording means having a plurality of recording elements for discharging ink droplets, said apparatus comprising:

input means for inputting a signal indicating an area gradation pattern for processing image data;

supply means for supplying a set of thinning patterns which are complementary to each other in response to the signal indicating the area gradation pattern inputted by said input means;

moving means for reciprocatingly moving the recording means relative to the recording medium in a main scan direction; and drive means for driving the recording means in accordance with the image data which is processed based on the area gradation pattern and the set of thinning patterns supplied by said supply means, wherein said drive means drives the recording means using a first thinning pattern of the set of thinning patterns during a first relative movement of the recording means by said moving means, and drives the recording means using a second thinning pattern of the set of thinning patterns, during a second relative movement of the recording means by said moving means, whereby a first thinned image is recorded on a predetermined area of the recording medium during the first relative movement and a second thinned image complementary to the first thinned image is recorded on the predetermined area of the recording medium during the second relative movement, and the first thinning pattern and the second thinning pattern are complementary to each other, and wherein said supply means selects from plural sets of thinning patterns such set of thinning patterns that reduce a difference between a first number of dots recorded during the first relative movement and a second number of dots recorded during the second relative movement with regard to a gradation level reproducible by the area gradation pattern without regard to the image data and supplies the selected set of thinning patterns.

8. An apparatus according to claim 7, wherein the first thinned image is recorded using a first recording section of the recording means, and the second thinned image is recorded using a second recording section of the recording means.

9. An apparatus according to claim 8, further comprising conveying means for conveying the recording medium relative to the recording means in a sub-scan direction by a distance that corresponds to the first recording section before starting recording of the second thinned image following recording of the first thinned image.

10. An apparatus according to claim 7, further comprising the recording means, wherein said recording means comprises a plurality of recording heads each having a plurality of recording elements, said recording heads respectively discharging different color ink droplets.

11. An apparatus according to claim 7, wherein the area gradation pattern is based upon a dither method.

12. An apparatus according to Claim 7, further comprising the recording means, wherein said recording means causes change in ink conditions by using thermal energy to discharge ink droplets.

13. An ink jet recording method for performing a first relative movement of a recording means for recording, the recording means having a plurality of recording elements for discharging ink droplets, relative to a recording medium in a main scan direction, the recording means recording an image corresponding to image data on the recording medium during the first relative movement, and thereafter performing a second relative movement of the recording medium relative to the recording means in a second direction that is different from the main scan direction, said method comprising the steps of:
   selecting a set of thinning patterns which have respective pixel arrays not overlapping each other, the thinning patterns corresponding to an area gradation pattern for processing the image data;
   recording on a predetermined area of the recording medium a first thinned image corresponding to the image data which is processed based on the area gradation pattern, using a first thinning pattern of the set of thinning patterns selected in said selecting step, during the first relative movement of the recording means in the main scan direction; and
   recording on the predetermined area of the recording medium a second thinned image corresponding to the image data which is processed based on the area gradation pattern, using a second thinning pattern of the set of thinning patterns selected in said selecting step, the second thinned image not overlapping the first thinned image,
   wherein in said selecting step, the set of thinning patterns is selected from a plurality of thinning patterns to reduce a difference between a first number of dots recorded for the first thinned image and a second number of dots recorded for the second thinned image with regard to a gradation level reproducible by the area gradation pattern, without regard to the image data.

14. A method according to claim 13, wherein in said step of recording the first thinned image, the first thinned image is recorded using a first recording section of the recording means, and in said step of recording the second thinned image, the second thinned image is recorded using a second recording section of the recording means.

15. A method according to claim 14, further comprising a step of moving the recording medium relative to the recording means in a sub-scan direction by a distance that corresponds to the first recording section before starting recording of the second thinned image following recording of the first thinned image.

16. A method according to claim 13, wherein the recording means comprises a plurality of recording heads each having a plurality of recording elements, the recording heads respectively discharging different color ink droplets.

17. A method according to claim 13, wherein the area gradation pattern is based upon a dither method.

18. A method according to claim 13, wherein the recording means causes a change in ink conditions by using thermal energy to discharge ink droplets.

19. An ink jet recording apparatus for recording a color image on a recording medium using recording means for recording, the recording means having a plurality of recording elements for discharging ink droplets, said apparatus comprising:
   input means for inputting a signal indicating an area gradation pattern for processing image data;
   supply means for supplying a set of thinning patterns which have respective pixel arrays not overlapping each other, in response to the signal indicating the area gradation pattern inputted by said input means;
   moving means for reciprocatingly moving the recording means relative to the recording medium in a main scan direction; and
   drive means for driving the recording means in accordance with the image data which is processed based on the area gradation pattern and the set of thinning patterns supplied by said supply means,
   wherein said drive means drives the recording means using a first thinning pattern of the set of thinning patterns during a first relative movement of the recording means by said moving means, and drives the recording means using a second thinning pattern of the set of thinning patterns, during a second relative movement of the recording means by said moving means, whereby a first thinned image is recorded on a predetermined area of the recording medium during the first relative movement and a second thinned image is recorded on the predetermined area of the recording medium during the second relative movement, and the first thinning pattern and the second thinning pattern have respective pixel arrays not overlapping each other, and
   wherein said supply means selects from plural sets of thinning patterns such set of thinning patterns that reduce a difference between a first number of dots recorded during the first relative movement and a second number of dots recorded during the second relative movement with regard to a gradation level reproducible by the area gradation pattern without regard to the image data and supplies the selected set of thinning patterns.

20. An apparatus according to claim 19, wherein the first thinned image is recorded using a first recording section of the recording means, and the second thinned image is recorded using a second recording section of the recording means.

21. An apparatus according to claim 20, further comprising conveying means for conveying the recording medium relative to the recording means in a sub-scan direction by a distance that corresponds to the first recording section before starting recording of the second thinned image following recording of the first thinned image.

22. An apparatus according to claim 19, further comprising the recording means, wherein said recording means comprises a plurality of recording heads each having a plurality of recording elements, said recording heads respectively discharging different color ink droplets.

23. An apparatus according to claim 19, wherein the area gradation pattern is based upon a dither method.

24. An apparatus according to claim 19, further comprising the recording means, wherein said recording means causes change in ink conditions by using thermal energy to discharge ink droplets.

25. An ink jet recording method for performing a first relative movement of recording means for recording, the recording means having a plurality of recording elements for discharging ink droplets, relative to a recording medium in a main scan direction, the recording means recording an image corresponding to image data on the recording medium during the first relative movement, and thereafter performing a second relative movement of the recording medium relative to the recording means in a second direction that is different from the main scan direction, said method comprising the steps of:

provevening a set of thinning patterns that have respective pixel arrays complementary to each other, the thinning patterns corresponding to an area gradation pattern for processing the image data; and recording on a predetermined area of the recording medium a thinned image corresponding to the image data which is processed based on the area gradation pattern, using a thinning pattern of the set of thinning patterns provided in said providing step, during a first relative movement of the recording means in the main scan direction, repeating said recording step a number of times corresponding to a number of thinning patterns contained in the set of thinning patterns, using respective ones of the set of thinning patterns in an order, whereby recording on the predetermined area of the recording medium is completed, and wherein in said providing step, the set of thinning patterns is provided from a plurality of thinning patterns to reduce a difference between numbers of dots of thinned images recorded in respective recording steps with regard to a gradation level reproducible by the area gradation pattern, without regard to the image data.

26. A method according to claim 25, wherein the recording means has a plurality of recording sections, and the thinned image is recorded on the predetermined area of the recording medium using respective recording sections of the recording means during respective recording steps.

27. A method according to claim 26, wherein a second relative movement is performed between recording steps through a distance corresponding to a recording section of the recording means.

28. A method according to claim 25, wherein the number of the thinning patterns contained in the set of thinning patterns is two.

29. A method according to claim 25, wherein the number of the thinning patterns contained in the set of thinning patterns is four.

30. A method according to claim 25, wherein the recording means comprises a plurality of recording heads each having a plurality of recording elements, the recording heads respectively discharging different colored ink droplets.

31. A method according to claim 25, wherein the area gradation pattern is based upon a dither method.

32. A method according to claim 25, wherein the recording means causes a change in phase of ink by using thermal energy to discharge ink droplets.

33. An ink jet recording apparatus for recording a color image on a recording medium using recording means for recording, the recording means having a plurality of recording elements for discharging ink droplets, said apparatus comprising:

input means for inputting a signal indicating an area gradation pattern for processing image data;

supply means for supplying a set of thinning patterns which have respective pixel arrays complementary to each other, in response to the signal indicating the area gradation pattern input by said input means;

moving means for reciprocatingly moving the recording means relative to the recording medium in a main scan direction; and drive means for driving the recording means in accordance with the image data which is processed based on the area gradation pattern and the set of thinning patterns supplied by said supply means, said drive means driving the recording means using a thinning pattern from the set of thinning patterns during movement of the recording means by said moving means;

wherein said moving means moves the recording means a number of times corresponding to a number of thinning patterns contained in the set of thinning patterns, and said drive means drives the recording means using a respective thinning pattern of the set of thinning patterns in an order during a respective movement of the recording head, whereby a thinned image corresponding to the respective thinning pattern of the set of thinning patterns is recorded on a predetermined area of the recording medium during respective movements of the recording head, and wherein said supply means selects from plural sets of thinning patterns such set of thinning patterns that reduce a difference between numbers of dots of thinned images recorded in respective relative movements with regard to a gradation level reproducible by the area gradation pattern and without regard to the image data and supplies the selected set of thinning patterns.

34. An apparatus according to claim 33, wherein said recording means has a plurality of recording sections, and the thinned image is recorded on the predetermined area of the recording medium using respective recording sections of the recording means during respective relative movements of the recording means.

35. An apparatus according to claim 33, further comprising conveying means for conveying the recording medium relative to said recording means between relative movements of the recording means by a distance corresponding to a recording section.

36. An apparatus according to claim 33, wherein the number of the thinning patterns contained in the set of thinning patterns is two.

37. An apparatus according to claim 33, wherein the number of the thinning patterns contained in the set of thinning patterns is four.

38. An apparatus according to claim 33, further comprising the recording means, wherein said recording means comprises a plurality of recording heads each having a plurality of recording elements, the recording heads respectively discharging different color ink droplets.

39. An apparatus according to claim 33, wherein the area gradation pattern is based upon a dither method.

40. An apparatus according to claim 33, further comprising recording means, wherein said recording means causes a change in ink conditions by using thermal energy to discharge ink droplets.

41. An ink jet recording method of recording an image, which corresponds to image data formed in accordance with an area gradation method using predetermined dot arrays defining a range of print duties, on a recording medium, while performing main and subscan operations in two substantially orthogonal directions (x,y) by using a recording head having a plurality of ink eject orifices, said method comprising the steps of:

dividing a recording area of the recording head into a plurality (n) of blocks; and performing a main scan operation a plurality of number of times for the recording medium while performing a subscan operation by a distance (1/n) corresponding to a length (L) of each block in a subscan direction (y) each time the main scan operation is performed, thereby sequentially recording images thinned out in accordance with different thinning patterns on predetermined areas of the recording medium by using the plurality of blocks, wherein the thinning patterns are patterns having dot arrays which are not congruent with the dot array of an area gradation method having the same print duty as that defined by the thinning patterns.

42. A method as claimed in claim 41, wherein the area gradation method is a dither method.

43. A method as claimed in claim 42, wherein the dither method is of the Bayer type and wherein the thinning patterns comprise checkered and reverse checkered patterns of 50% print duty defined by dot units each constituted by two contiguous dots.

44. A method as claimed in claim 41, wherein (i) the image is a color image and the image data comprises color image data, the recording heading head comprises a first recording head having a plurality of ink eject orifices for ejecting ink of a first color and a second recording head having a plurality of ink eject orifices for ejecting ink of a second color, (ii) said step of dividing the recording area comprises dividing first and second recording areas of each of the first and second recording heads into a respective plurality of blocks, and (iii) said steps of performing the main scan and subscan operations thereby sequentially recording images of the first and second colors thinned out in accordance with the different thinning patterns on predetermined areas of the recording medium comprise using the plurality of blocks of the first and second recording heads.

45. A method as claimed in claim 42, wherein (i) the image is a color image and the image data comprises color image data, the recording heading head comprises a first recording head having a plurality of ink eject orifices for ejecting ink of a first color and a second recording head having a plurality of ink eject orifices for ejecting ink of a second color, (ii) said step of dividing the recording area comprises dividing first and second recording areas of each of the first and second recording heads into a respective plurality of blocks, and (iii) said steps of performing the main scan and subscan operations thereby sequentially recording images of the first and second colors thinned out in accordance with the different thinning patterns on predetermined areas of the recording medium comprise using the plurality of blocks of the first and second recording heads.

46. A method as claimed in claim 43, wherein (i) the image is a color image and the image data comprises color image data, the recording heading head comprises a first recording head having a plurality of ink eject orifices for ejecting ink of a first color and a second recording head having a plurality of ink eject orifices for ejecting ink of a second color, (ii) said step of dividing the recording area comprises dividing first and second recording areas of each of the first and second recording heads into a respective plurality of blocks, and (iii) said steps of performing the main scan and subscan operations thereby sequentially recording images of the first and second colors thinned out in accordance with the different thinning patterns on predetermined areas of the recording medium comprise using the plurality of blocks of the first and second recording heads.

47. A method as claimed in claim 41, wherein the main scan operation is performed four times with respect to each area of the recording medium to sequentially record images thinned with thinning patterns having a print duty of 25%.

48. A method as claimed in claim 42, wherein the main scan operation is performed four times with respect to each area of the recording medium to sequentially record images thinned with thinning patterns having a print duty of 25%.

49. A method as claimed in claim 43, wherein the main scan operation is performed four times with respect to each area of the recording medium to sequentially record images thinned with thinning patterns having a print duty of 25%.

50. A method as claimed in claim 47, wherein the recording head defines four sets of ink eject orifices for ejecting ink of four respective colors and wherein the thinning patterns are each defined by dot arrays of non-contiguous dots.

51. A method as claimed in claim 48, wherein the recording head defines four sets of ink eject orifices for ejecting ink of four respective colors and wherein the thinning patterns are each defined by dot arrays of non-contiguous dots.

52. A method as claimed in claim 49, wherein the recording head defines four sets of ink eject orifices for ejecting ink of four respective colors and wherein the thinning patterns are each defined by dot arrays of non-contiguous dots.

53. A method as claimed in claim 50, wherein the respective dot arrays are constituted by a dot matrix which is common to each of the dot arrays.

54. A method as claimed in claim 51, wherein the respective dot arrays are constituted by a dot matrix which is common to each of the dot arrays.

55. A method as claimed in claim 52, wherein the respective dot arrays are constituted by a dot matrix which is common to each of the dot arrays.

56. A method as claimed in claim 41, further comprising a step of selecting the thinning patterns from a plurality of sets of thinning patterns in accordance with the area gradation method.

57. A method as claimed in claim 42, further comprising a step of selecting the thinning patterns from a plurality of sets of thinning patterns in accordance with the area gradation method.

58. A method as claimed in claim 43, further comprising a step of selecting the thinning patterns from a plurality of sets of thinning patterns in accordance with the area gradation method.

59. A method as claimed in claim 41, wherein the thinning patterns are selected such that substantially equal numbers of dots are printed in successive main scan operations at each print duty required.

60. A method as claimed in claim 42, wherein the thinning patterns are selected such that substantially equal numbers of dots are printed in successive main scan operations at each print duty required.

61. A method as claimed in claim 43, wherein the thinning patterns are selected such that substantially equal numbers of dots are printed in successive main scan operations at each print duty required.

62. A method as claimed in claim 41, wherein the recording head induces a state change in an ink by using thermal energy to eject the ink from the eject orifices.

63. A method as claimed in claim 42, wherein the recording head induces a state change in an ink by using thermal energy to eject the ink from the eject orifices.

64. A method as claimed in claim 43, wherein the recording head induces a state change in an ink by using thermal energy to eject the ink from the eject orifices.

65. An ink jet recording apparatus for recording an image, which corresponds to image data formed in accordance with an area gradation method using predetermined dot arrays defining a range of print duties, on a recording medium, while performing main and subscan operations in two substantially orthogonal directions (x,y) by using a recording head having a plurality of ink eject orifices, said apparatus comprising:

a recording head, having a plurality of ink eject orifices, for performing main and subscan operations in two substantially orthogonal directions (x, y), a recording area of said recording head being divided into a plurality (n) of blocks;

scanning means for effecting a main scan operation a plurality of number of times for the recording medium while performing a subscan operation by a distance (1/n) corresponding to a length (L) of each block in the subscan direction (y) each time the main scan operation is performed; and control means for effecting thinning of images, thereby sequentially recording images in accordance with different thinning patterns on predetermined areas of the recording medium by using the plurality of blocks, wherein the thinning patterns are patterns having dot arrays which are not congruent with the dot array of an area gradation method having the same print duty as that defined by the thinning patterns.

66. An apparatus as claimed in claim 65, wherein the area gradation method is a dither method.

67. An apparatus as claimed in claim 66, wherein the dither method is of the Bayer type wherein the thinning patterns comprise checkered and reverse checkered patterns of 50% print duty defined by dot units each constituted by two contiguous dots.

68. An apparatus as claimed in claim 65, wherein (i) the image is a color image and the image data comprises color image data, (ii) said recording heading head comprises a first recording head having a plurality of ink eject orifices for ejecting ink of a first color and a second recording head having a plurality of ink eject orifices for ejecting ink of a second color, (iii) the recording area is divided by dividing first and second recording areas of each of the first and second recording heads into a respective plurality of blocks, and (iv) the main scan and subscan operations thereby sequentially recording images of the first and second colors thinned out in accordance with the different thinning patterns on predetermined areas of the recording medium are performed using the plurality of blocks of said first and second recording heads.

69. An apparatus as claimed in claim 65, wherein the main scan operation is performed four times with respect to each area of the recording medium to sequentially record images thinned with thinning patterns having a print duty of 25%.

70. An apparatus as claimed in claim 69, wherein the recording head defines four sets of ink eject orifices for ejecting ink of four respective colors and wherein the thinning patterns are each defined by dot arrays of non-contiguous dots.

71. An apparatus as claimed in claim 65, wherein the respective dot arrays are constituted by a dot matrix which is common to each of the dot arrays.

72. An apparatus as claimed in claim 65, further comprising a step of selecting the thinning patterns from a plurality of sets of thinning patterns in accordance with the area gradation method.

73. An apparatus as claimed in claim 65, wherein the thinning patterns are selected such that substantially equal numbers of dots are printed in successive main scan operations at each print duty required.

74. An apparatus as claimed in claim 65, wherein the recording head induces a state change in an ink by using thermal energy to eject the ink from the eject orifices.

* * * * *

UNITED STATES PATENT AND TRADEMARK OFFICE
CERTIFICATE OF CORRECTION

PATENT NO. : 5,831,642

DATED : November 3, 1998

INVENTOR(S) : MIYUKI MATSUBARA, ET AL.

It is certified that error appears in the above-identified patent and that said Letters Patent is hereby corrected as shown below:

COLUMN 14,
Line 34, "areas" should read --different record areas--; and
Line 35, "record areas of a recording" should read --recording--.

COLUMN 15,
Line 25, "(X)," should read --(M),--.

COLUMN 19,
Line 6, "b y" should read --by--;
Line 20, "t hereby" should read --thereby--; and
Line 24, "a n" should read --an--.

COLUMN 20,
Line 57, "BEil$^8$," should read --BEil*,--.

COLUMN 22,
Line 32, "convention al" should read --conventional--.

COLUMN 28,
Line 60, "1-3" should read --1→3--; and
Line 63, "2-4" should read --2→4--.

UNITED STATES PATENT AND TRADEMARK OFFICE
CERTIFICATE OF CORRECTION

PATENT NO. : 5,831,642
DATED : November 3, 1998
INVENTOR(S) : MIYUKI MATSUBARA, ET AL.

It is certified that error appears in the above-identified patent and that said Letters Patent is hereby corrected as shown below:

COLUMN 40,
Line 19, "claim 65," should read --claim 70,--.

Signed and Sealed this

Third Day of August, 1999

Attest:

Q. TODD DICKINSON

Attesting Officer

Acting Commissioner of Patents and Trademarks